US005545297A

United States Patent [19]
Andersen et al.

[11] Patent Number: 5,545,297
[45] Date of Patent: Aug. 13, 1996

[54] METHODS FOR CONTINUOUSLY PLACING FILAMENTS WITHIN HYDRAULICALLY SETTABLE COMPOSITIONS BEING EXTRUDED INTO ARTICLES OF MANUFACTURE

[75] Inventors: Per J. Andersen; Simon K. Hodson, both of Santa Barbara, Calif.

[73] Assignee: E. Khashoggi Industries, Santa Barbara, Calif.

[21] Appl. No.: 318,913

[22] Filed: Oct. 4, 1994

Related U.S. Application Data

[63] Continuation-in-part of Ser. No. 255,344, Jun. 7, 1994, Ser. No. 19,151, Feb. 17, 1993, Pat. No. 5,453,310, Ser. No. 95,662, Jul. 21, 1993, Pat. No. 5,385,764, Ser. No. 101,500, Aug. 3, 1993, and Ser. No. 109,100, Aug. 18, 1993, abandoned, each is a continuation-in-part of Ser. No.929,898, Aug. 11, 1992, abandoned.

[51] Int. Cl.⁶ .............. B28B 1/00; B28B 21/52; B29C 47/00; B29C 65/00
[52] U.S. Cl. .......... 264/102; 264/149; 264/150; 264/177.11; 264/211; 264/211.11; 264/333
[58] Field of Search .............. 264/148, 177.11, 264/333, 241, 211.11, 211.2, 211, 150, 152, 210.1, 210.2, 210.5, 210.6, 177.12, 177.17, 177.2, 209.1, 209.3, 209.4, 102, 149, 163, 177.16, 280

[56] References Cited

U.S. PATENT DOCUMENTS

| | | |
|---|---|---|
| 3,219,467 | 11/1965 | Redican et al. . |
| 3,753,749 | 8/1973 | Nutt . |
| 3,754,954 | 8/1973 | Gabriel et al. . |
| 3,770,859 | 11/1973 | Bevan . |
| 3,857,715 | 12/1974 | Humphrey . |
| 3,904,341 | 9/1975 | Putti . |

(List continued on next page.)

FOREIGN PATENT DOCUMENTS

| | | |
|---|---|---|
| 0340765A2 | 11/1989 | European Pat. Off. . |
| 3011330 | 3/1980 | Germany . |
| 53-16730 | 2/1978 | Japan . |
| 55-37407 | 3/1980 | Japan . |
| 56-17965 | 2/1981 | Japan . |
| 58-120555 | 7/1983 | Japan . |
| 60-161381 | 8/1985 | Japan . |
| 60-264375 | 12/1985 | Japan . |

(List continued on next page.)

OTHER PUBLICATIONS

Ferretti, *Distributed Reinforcement Concrete Pipes: An Innovative Product*.
*Filament Winding Overview*.
ACBM, *Cementing the Future: A New Extrusion Technology*, vol. 6, No. 1, (Spring 1994).

(List continued on next page.)

*Primary Examiner*—Karen Aftergut
*Attorney, Agent, or Firm*—Workman, Nydegger & Seeley

[57] ABSTRACT

Methods and apparatus for continuously extruding a hydraulically settable mixture and simultaneously placing continuous filaments within the extruding mixture to yield articles having a filament-reinforced, hydraulically settable matrix. The filaments can be placed within the mixtures in a parallel configuration, a helical configuration, or combinations thereof, in order to yield an article having the desired properties of, e.g., tensile strength, flexural strength, hoop strength, burst strength, toughness, and elongation ability. The desired properties of the hydraulically settable mixture, as well as of the cured hydraulically settable matrix of the hardened article, may also be adjusted by including varying amounts and types of aggregates, discontinuous fibers, binders, rheology-modifying agents, dispersants, or other admixtures within the hydraulically settable mixture. Optimizing the particle packing density while including a deficiency of water yields a hydraulically settable mixture which will flow when an extrusion pressure is applied but be form stable upon being extruded.

100 Claims, 23 Drawing Sheets

U.S. PATENT DOCUMENTS

| | | |
|---|---|---|
| 3,917,781 | 11/1975 | Gabriel et al. . |
| 3,927,163 | 12/1975 | Gabriel et al. . |
| 3,954,490 | 5/1976 | Cockram . |
| 4,133,619 | 1/1979 | Wise . |
| 4,353,748 | 10/1982 | Birchall et al. . |
| 4,410,366 | 10/1983 | Birchall et al. . |
| 4,522,772 | 6/1985 | Bevan . |
| 4,524,042 | 6/1985 | Genba et al. . |
| 4,588,443 | 5/1986 | Bache . |
| 4,636,345 | 1/1987 | Jensen et al. . |
| 4,655,981 | 4/1987 | Nielsen et al. . |
| 4,943,219 | 7/1990 | Nash . |
| 4,944,595 | 7/1990 | Hodson . |
| 4,968,236 | 11/1990 | Martens . |
| 5,030,282 | 7/1991 | Matsuhashi et al. . |
| 5,047,086 | 9/1991 | Hayakawa et al. . |
| 5,108,679 | 4/1992 | Rirsch et al. . |
| 5,154,771 | 10/1992 | Wada et al. . |
| 5,160,676 | 11/1992 | Singh et al. . |

FOREIGN PATENT DOCUMENTS

| | | |
|---|---|---|
| 62-36055 | 2/1987 | Japan . |
| 62-36056 | 2/1987 | Japan . |
| 62-39204 | 2/1987 | Japan . |
| 62-46941 | 2/1987 | Japan . |
| 62-151304 | 7/1987 | Japan . |
| 62-253407 | 11/1987 | Japan . |
| 63-123851 | 5/1988 | Japan . |
| 63-210082 | 8/1988 | Japan . |
| 63-218589 | 9/1988 | Japan . |
| 63-248759 | 10/1988 | Japan . |
| 64-37478 | 2/1989 | Japan . |
| 2-51460 | 2/1990 | Japan . |
| 2-141484 | 5/1990 | Japan . |
| 3-80141 | 4/1991 | Japan . |
| 3-153551 | 7/1991 | Japan . |
| 3-187962 | 8/1991 | Japan . |
| 3-202313 | 9/1991 | Japan . |
| 3-208847 | 9/1991 | Japan . |
| 3-202310 | 9/1991 | Japan . |
| WO87/00828 | 2/1987 | WIPO . |
| 20990 | 10/1993 | WIPO . |

OTHER PUBLICATIONS

Laenger, *Designing an Extruder with Allowance for the Properties of Ceramic Extrusion Compounds–Part 1*, cfi/Ber. DKG 67, No. 4 (1990).

Laenger, *Extruderauslegung unter Berucksichtigung . . . English Translation–Designing an Extruder with Allowance for the Properties of Ceramic . . . Part 2a*, cfi/Ber. DKG 68, No. 9 (1991).

Laenger, *Extruderauslegung unter Berucksichtigung . . . English Translation–Designing an Extruder with Allowance for the Properties of Ceramic . . . Part 2b*, cfi/Ber. DKG 68 No. 10/11 (1991).

Laenger, *Extruderauslegung unter Berucksichtigung . . . English Translation–Designing an Extruder with Allowance for the Properties of Ceramic . . . Part 3*, cfi/Ber. DKG 69, No. 3 (1992).

Laenger, *Extruderauslegung unter Berucksichtigung . . . English Translation–Designing an Extruder with Allowance for the Properties of Ceramic . . . Part 4a*, cfi/Ber. DKG 69, No. 7/8 (1992).

Laenger, *Extruderauslegung unter Berucksichtigung . . . English Translation–Designing an Extruder with Allowance for the Properties of Ceramic . . . 4b*, cfi/Ber. DKG 69, No. 9 (1992).

Laenger, *Extruderauslegung unter Berucksichtigung . . . English Translation–Designing an Extruder with Allowance for the Properties of Ceramic . . . Part 5a*, cfi/Ber. DKG 69, 10 (1992).

Laenger, *Extruderauslegung unter Berucksichtigung . . . English Translation–Designing an Extruder with Allowance for the Properties of Ceramic . . . Part 5b*, cfi/Ber. DKG 70, No. 3 (1993).

Robinson, *Extrusion Defects*, pp. 391–407, (no date).

Benbow et al., *The Extrusion Mechanics of Pastes–The Influence of Paste Formulation on Extrusion Parameters*, Chemical Engineering Science, vol. 42, No. 9, pp. 2151–2162, (1987).

*Plastic–Forming Processes*, Corning Glass Works, pp. 357–361, (no date given).

*Fiberbeton–nyt*, Teknologisk Institut, Byggeteknik, Blad No. 1 (Oktober 1987). English Translation–Fiber Concrete News, Technological Institute of Denmark, Dept. of Building Technology, Pamphlet No. 1 (Oct. 1987).

Finn Strabo et al., *Ekstrudering af Fiberbeton*, Teknologisk Institut, Byggeteknik (Oktober 1987). English Translation––Finn Strabo et al., *Extrusion of Fiber Concrete*, Technological Institute of Denmark, Dept. of Building Technology (Oct. 1987).

Finn Strabo et al., *Nye Formgivningsmetoder til Fiberbeton*, Teknologisk Institut, Byggeteknik, Apr. 1987. English Translation–New Design Methods for Fiber Concrete, Technological Institute of Denmark, Dept. of Building Technology, Apr. 1987.

Clauson–Kaas et al., *Ekstrudering af Fiberbeton–delrapport*, Byggeteknik, Teknologisk Institut (Jan. 1987). (English Translation–Extrusion of Fiber Concrete–Interim Report, Dept. of Building Technology, Technological Institute of Denmark.)

Andersen, *Tailoring of Concrete Materials*, Rambøll & Hennemann, Annual Review, 1988, particularly p. 3.

Ashby, *Materials Selection in Engineering Design*, Indian J. of Technology, vol. 28, pp. 217–225, Jun.–Aug. 1990.

Steven H. Kosmatka & William C. Panarese, *Design and Control of Concrete Mixtures*, 77–93 (13th ed. 1988).

W. Vom Berg, *Influence of Specific Surface and Concentration of Solids Upon the Flow Behavior of Cement Pastes*, Magazine of Concrete Research, Dec. 1979, at 211–216.

Purton, *The Effect of Sand Grading on the Calcium Silicate Brick Reaction*, Cement and Concrete Research vol. 4, pp. 13–29 (1974).

Bache, *Densified Cement/Ultra–Fine Particle–Based Materials*, Presented at the Second International Conference on Superplasticizers in Concrete, (Jun. 10–12, 1991) in Ottawa, Canada.

Knudsen, *On Particule Size Distribu6tion in Cement Hydration*, presented to the 7th International Congress on the Chemistry of Cement, Paris (1980).

Andersen, *Effects of W/C–Ration and Dispersion on the Pore Size Distribution of Cement Paste and Concrete*, Paper prepared for MRL by Per Just Andersen, Aug. (1988).

Sun, Lu, Touse, and Young, *The Composition of Hydrated DSP Cement Pastes*.

Roy, *New Strong Cement Materials: Chemically Bonded Ceramics*, Science, vol. 235, 6 (Feb. 1987).

*Doing More With Less: Optimizing Concrete Mix*, Better Roads (Aug. (1990).

Westman and Hugill, *The Packing of Particles*, (1930).

Arioglu, *Analysis of the Concrete Strength versus Water-Cement Ratio Relationship*, ACI Materials Journal (Sep.-Oct. 1991).

Bailey and Higgins, *Flexural Strength of Cements*, Nature, vol. 292, 2 (Jul. 1981).

Jennings, Bhatty, and Hodson, *Towards Establishing Relationships Between Microstructure and Properties of Cement-Based Materials.*

Effects of Water Reducers and Retarders on the Microstructure of Cement Paste and Concrete.

Dragicevic, *Prognosis of the Physical-Mechanical Characteristics of Portland Cement* The Highway Institute, Belgrade.

Studt, *New Advances Revive Interest In Cement-Based Materials*, R&D Magazine (Nov. 1992).

Shilstone, Sr., *Mix Temperature and $$$$$*, Concrete Producer News (Oct. 1989).

Shilstone, Sr., *Concrete Mixture Optimization by Coarseness Factor, Mortar Factor & Particle Distribution*, Concrete International (Dec. 1989).

Shilstone, Sr., *Mixture Optimization for Fast-Track*, Report for American Concrete Institution Convention, San Diego, CA.

*Packing Program*, G.M. Idorn Consult A/S.

Stovall, De Larrard, and Buil, *Linear Packing Density Model of Grain Mixtures*, Powder Technology, 48, 1–12 (1986).

Furnas, *Grading Aggregates. 1–Mathematical Relations for Beds of Broken Solids of Maximum Density*, Industrial and Engineering Chemistry (Sep. 1931).

Ridgway and Tarbuck, *Particulate Mixture Bulk Densities*, Chemical and Process Engineering (Feb. 1968).

Osbaeck and Johansen, *Particle Size Distribution and Rate of Strength Development*, Paper for the 89th Annual Meeting of the American Ceramic Society, Inc., Pittsburgh, PA, Apr. 26–30 (1987).

McGeary, *Mechanical Packing of Spherical Particles*, Journal of the American Ceramic Society, vol. 44, No. 10 (Oct. 1961).

Patankar and Mandal, *The Packing of Some Non-Spherical Solid Particles*, Trans. J. Brit. Ceram. Soc., 79, 59–66 (1980).

Gebler, *The Effects of High-Range Water Reducers on the Properties of Freshly Mixed and Hardened Flowing Concrete*, Portland Cement Association Research and Development Bulletin RD081.01T (1982).

Saglik and Jennings, *An Improved Mathematical Model for the Kinetics of Portland Cement Hydration. Part 1. Theory.*

Knudsen, *Modelling Hydration of Portland Cement: The Effect of Particle Size Distribution*, Paper presented at the Engineering Foundation Conference, Jul. 25–30, Henniker, N.H (1982).

Young, *Macro-Defect-Free Cement: A Review*, Mat. Res. Soc. Symp. Proc. vol. 179 (1991).

Idorn and Henriksen, *State of the Art for Fly Ash Uses in Concrete*, Cement and Concrete Research, vol. 14, pp. 463–470 (1984).

Fedors and Landel, *An Empirical Method of Estimating the Void Fraction in Mixtures of Uniform Particles of Different Size*, Powder Technology, 23, 225–231 (1979).

Shilstone, *A Hard Look At Concrete*, Civil Engineering (Jan. 1989).

Bach and Eternit, *Development of Structure in Hydrating Particulate Systems and Influence on Rheology and Final Properties*, Paper presented at a Conference on Advances in Cementitious Materials, Jul. 22–26, Gaithersburg, MA (1990).

Andersen, et al., *Tailoring of Cement-Bound Materials By the Use of Packing and Rheological Models*, American Ceramic Society (1988).

Johansen, Vagn and Andersen, *Particle Packing and Concrete Properties*, Materials Science of Concrete II, pp. 111–147.

Lewis and Kriven, *Microstructure–Property Relationships in Macro-Defect-Free Cement*, MRS Bulletin (Mar. 1993).

Roy, et al., *Processing of Optimized Cements and Concretes Via Particle Packing*, MRS Bulletin (March 1993).

Young and Berg, *Introduction to MDF Cement Composites*, ACBM vol. 1, No.2 (Fall 1989).

Zukoswski and Struble, *Rheology of Cementitious Systems*, MRS Bulletin (March 1993).

Andersen, *Effect of Organic Superplasticizing Admixtures and Their Components on Zeta Potential and Related Properties of Cement Materials*, Thesis in Concrete Technology submitted in fulfillment of degree requirements (May 1987).

Andersen, *Evaluation of the Potential Alkali–Silica Reactivity of Sand and Coarse Aggregates by the Use of a New Zeta Potential Method*, GM Idorn Consult A/S (Aug. 1988).

Andersen, *Control and Monitoring of Concrete Production: a Study of Particle Packing and Rheology*, Danish Academy of Technical Sciences (1990).

J. Murata, *Flow and Deformation of Fresh Concrete*, Materials and Structures, pp. 117–129 (Mar.–Apr. 1984).

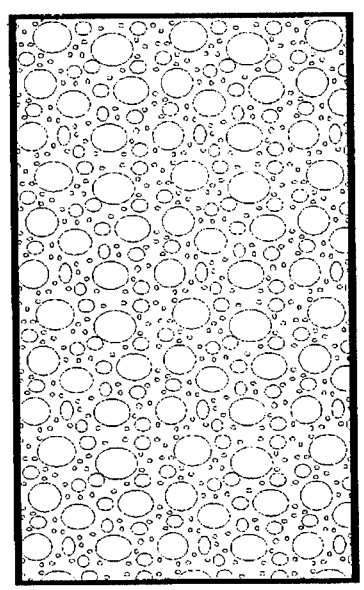
Fig. 1
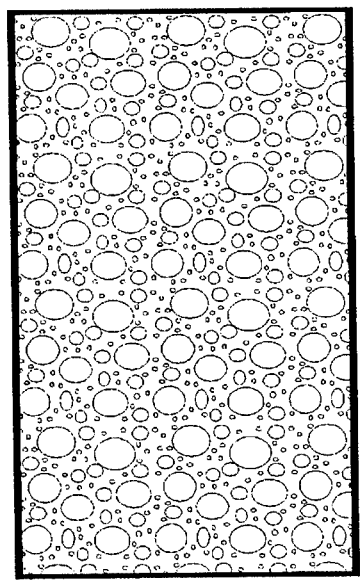 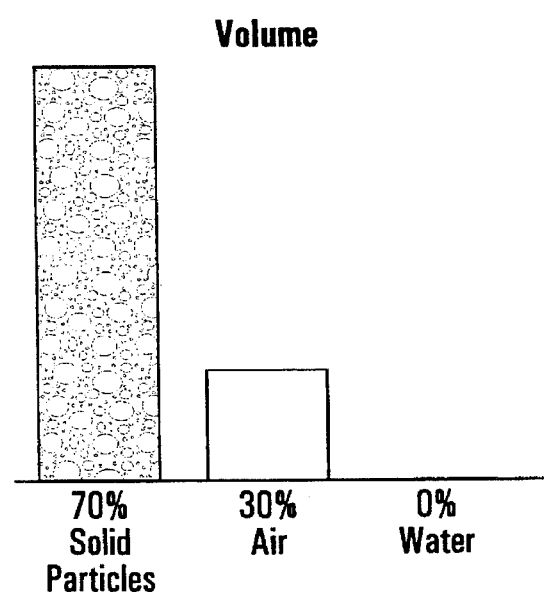
Fig. 2

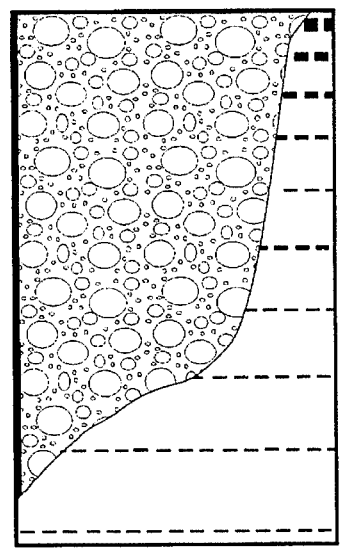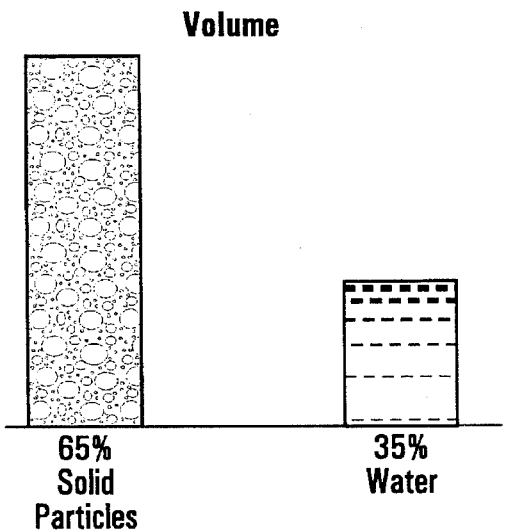
65% Solid Particles 35% Water
Fig. 3A
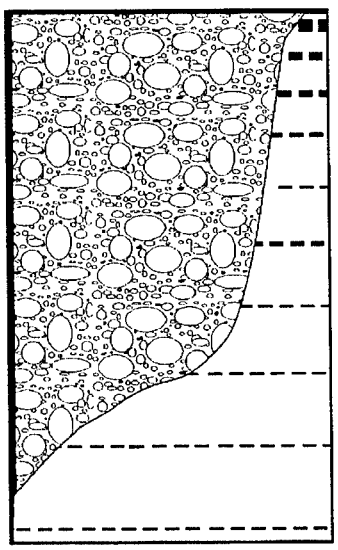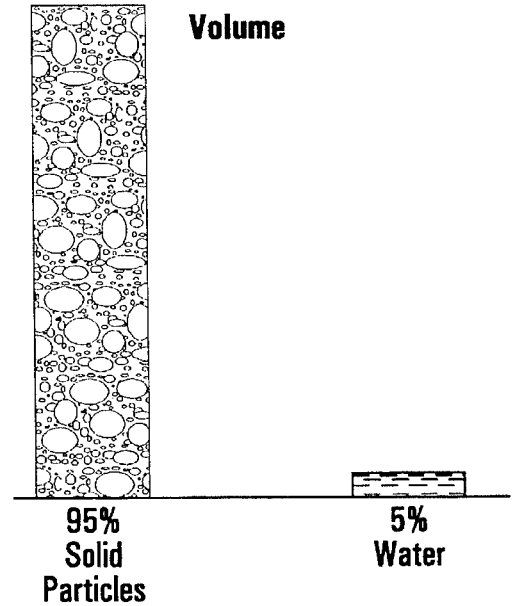
95% Solid Particles 5% Water
Fig. 3B

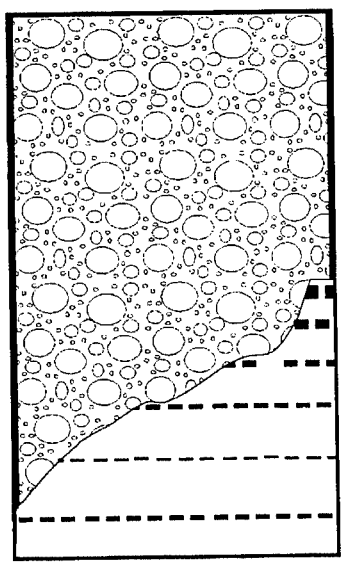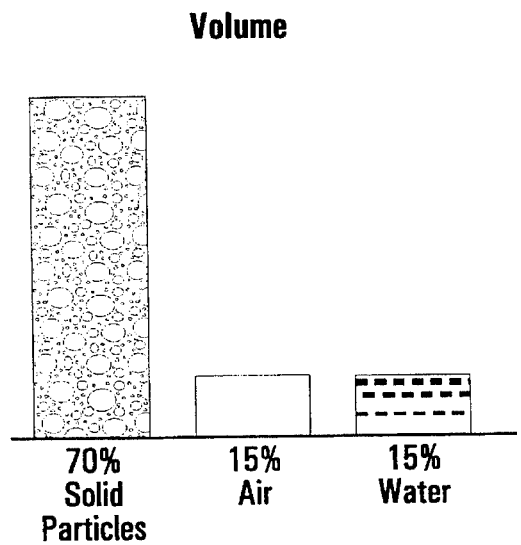
Fig. 4
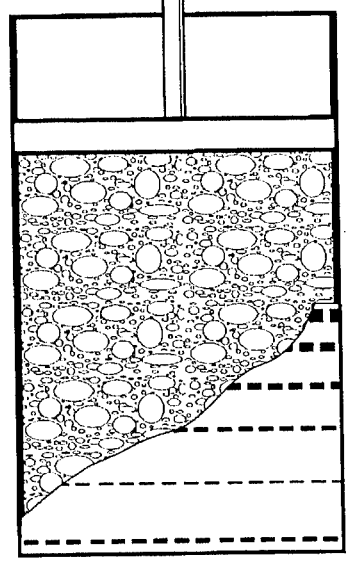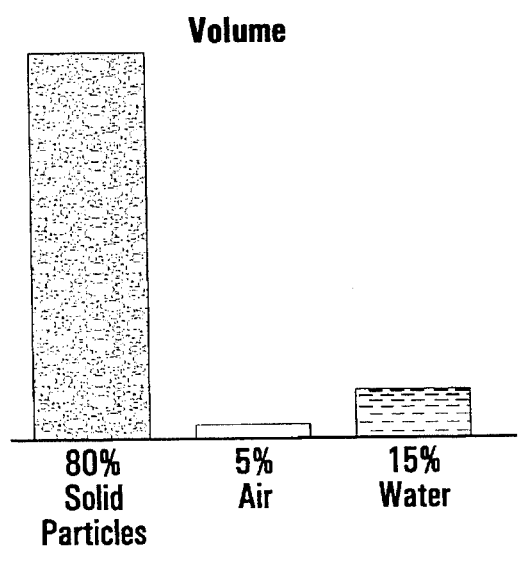
Fig. 5

METHODS FOR CONTINUOUSLY PLACING FILAMENTS WITHIN HYDRAULICALLY SETTABLE COMPOSITIONS BEING EXTRUDED INTO ARTICLES OF MANUFACTURE

RELATED APPLICATIONS

This application is a continuation-in-part of co-pending U.S. patent application Ser. No. 08/255,344, entitled "Methods For The Extrusion Of Novel, Highly Plastic And Moldable Hydraulically Settable Compositions," and filed Jun. 7, 1994, in the names of Per Just Andersen, Ph.D., and Simon K. Hodson. This application is also a continuation-in-part of co-pending U.S. patent application Ser. No. 08/019,151, entitled "Cementitious Materials For Use in Packaging Containers and Their Methods Of Manufacture," and filed Feb. 17, 1993, in the names of Per Just Andersen, Ph.D., and Simon K. Hodson, now issued as U.S. Pat. No. 5,453,310. This application is also a continuation-in-part of co-pending U.S. patent application Ser. No. 08/095,662, entitled "Hydraulically Settable Containers And Other Articles For Storing, Dispensing, And Packaging Food And Beverages And Methods For Their Manufacture," and filed Jul. 21, 1993, in the names of Per Just Andersen, Ph.D., and Simon K. Hodson, now issued as U.S. Pat. No. 5,385,764. This application is also a continuation-in-part of co-pending U.S. patent application Ser. No. 08/101,500, entitled "Methods And Apparatus For Manufacturing Moldable Hydraulically Settable Sheets Used In Making Containers, Printed Materials, And Other Objects," and filed Aug. 3, 1993, in the names of Per Just Andersen, Ph.D., and Simon K. Hodson. This application is also a continuation-in-part of co-pending U.S. patent application Ser. No. 08/109,100, entitled "Design Optimized Compositions And Processes For Microstructurally Engineering Cementitious Mixtures," and filed Aug. 18, 1993, in the names of Per Just Andersen, Ph.D. and Simon K. Hodson (now abandoned). Each of these applications is also a continuation-in-part of co-pending U.S. patent application Ser. No. 07/929,898, entitled "Cementitious Food And Beverage Storage, Dispensing, And Packaging Containers And The Methods Of Manufacturing Same," and filed Aug. 11, 1992, in the names of Per Just Andersen, Ph.D., and Simon K. Hodson (now abandoned). For purposes of disclosure, each of the foregoing applications is incorporated herein by specific reference.

BACKGROUND OF THE INVENTION

The Field of the Invention

The present invention relates to methods and systems for manufacturing articles of manufacture from hydraulically settable mixtures containing filaments (i.e., continuous fibers). More particularly, the invention relates to methods and systems for extruding hydraulically settable mixtures into desired shapes or articles while simultaneously placing filaments within the structural matrix of the extruded articles. The hydraulically settable mixtures are microstructurally engineered to have theological properties that render the mixtures highly extrudable under pressure and then form stable immediately after they have been extruded, even while in the green or unhardened state. The filaments within the hydraulically settable matrix of the extruded articles increase the, e.g., tensile strength, flexural strength, burst strength (in the case of pipes or other hollow articles), elasticity modulus, and elongation and deflection before rupture of the extruded articles.

THE RELEVANT TECHNOLOGY

Hydraulically settable materials, such as those that contain a hydraulically settable binder like hydraulic cement or gypsum (hereinafter "hydraulically settable," "hydraulic," or "cementitious" compositions, materials, or mixtures), have been used for thousands of years to create useful, generally large, bulky structures that are durable, strong, and relatively inexpensive. Hydraulic cement is a hydraulically settable binder derived from clay and limestone, while gypsum is a naturally occurring mineral. Both are essentially nondepletable.

Hydraulically settable materials are generally formed by mixing a hydraulically settable binder with water and usually some type of aggregate to form a hydraulically settable mixture, which hardens into, e.g., concrete. Typically, a freshly mixed hydraulically settable mixture is fairly nonviscous, semi-fluid slurry, capable of being mixed and formed by hand. Because of its fluid-like nature, a hydraulically settable mixture is generally shaped by being poured into a mold, worked to eliminate large air pockets, and allowed to harden.

Due to the high level of fluidity required for typical hydraulically settable mixtures to have adequate workability, the uses of concrete and other hydraulically settable materials have been limited to mainly simple shapes which are generally large, heavy, and bulky, and which require mechanical forces to retain their shape for an extended period of time until sufficient hardening of the material has occurred. Another aspect of traditional hydraulically settable mixtures or slurries is that they have little or no form-stability and are usually molded into the final form by pouring the mixture into a space having externally supported boundaries or walls. The problem of low form-stability is exacerbated by the lengthy curing and hardening times of most concretes. It may take days for most cementitious mixtures to have enough strength to be demolded without being harmed, and weeks of wet curing to avoid defects in the structural matrix.

The uses of hydraulically settable materials have also been limited by the strength properties of concrete, namely, the high ratio of compressive strength to tensile strength, which is usually about 10:1. Nevertheless, the strength limitations of concrete can often be overcome by simply molding massive structures of concrete having enormous size. This is possible because of the extremely low cost of most concretes. The tensile and flexural strengths of such massive structures can be improved by extensive use of large metal reinforcing bars, or "rebar". Similarly, on a more "microscopic" level, the incorporation of relatively small, chopped or discontinuous fibers within the hydraulically settable structural matrix can greatly increase the, e.g., strength and elongation properties and toughness of the hardened hydraulically settable article. Through thorough mixing of the fibers within the green hydraulically settable mixture it is possible to obtain good fiber to hydraulically settable matrix interaction with a minimum of interior defects within the matrix.

Others have attempted to introduce continuous fibers into the cementitious structural matrix in the form of mats, cords, wire forms, yarns, or filaments, but with only moderate success in producing significantly stronger and tougher articles. One such method is the "lay-up technique" in which the appropriate source of continuous fibers (such as mats, or cords) are placed into the desired configuration, usually within a mold or form, after which an appropriate hydraulically settable mixture is poured into the mold or form and worked to permeate and encapsulate the continuous fibers. However, because of the general inability to fully consolidate the hydraulically settable mixture within the spaces defined by the continuous fibers, particularly those in which the continuous fibers or filaments are relatively close together, the hardened hydraulically settable structure will usually have a significant quantity or volume of unwanted voids or defects within the hydraulically settable matrix. In many cases, it has proven to be impossible to fully remove the unwanted voids and consolidate the hydraulically settable mixture even by applying pressure to or vibrating the continuous fiber-filled hydraulically settable material. The generally poor condition and low strength of the cementitious mixtures impregnated with continuous fibers by means of the lay-up method often offsets whatever strength properties the continuous fibers were intended to impart to the cementitious mixture.

In an effort to improve the placement of continuous filaments within a cementitious mixture, some have used conventional filament winding techniques in which continuous filaments are wrapped around and into a previously molded, green cementitious mixture supported and rotated by a mandrel. See F. Strabo et al., "Nye Formgivningsmetoder til Fiberbeton," Byggeteknik Institut, April 1987 (F. Strabo et al., "New Design Methods for Fiber Concrete," Danish Technological Institute, April 1987). One advantage of this method was that it allowed for the placement of greatly varying concentrations of continuous filaments within a cementitious material, and also along a variety of desired angles relative to the longitudinal axis of the pipe or cylinder being filament wound. It was even possible to place helically oriented and criss-crossed filaments using the conventional filament winding technique. Varying the concentration and/or orientation of the continuous filaments would be expected to greatly affect the strength, toughness, and other desired properties of the final cured cementitious article.

In general, filament winding is used to increase the hoop or burst strength of hollow tubes or pipes, which greatly increases the amount of internal pressure that such tubes or pipes can withstand before rupture or failure. The effect of filament winding on burst strength is enhanced if the filaments are placed in a manner so that they criss-cross or overlap, have a relatively large angle of offset relative to the longitudinal axis of the pipe or tube, and have a larger relative concentration vis-a-vis the material into which they are placed.

While the filament winding method set forth in Strabo et al. significantly improved the quality of the final cementitious product, the method was time consuming and costly, and did not provide an economically viable method for manufacturing filament wound cementitious materials on a grand scale. In addition, the surface quality of such filament wound cementitious materials tended to be rather poor due to the effect of the filament's cutting through the surface and interior of the green cementitious material. Effective consolidation of the cementitious material into which filaments had been placed often required smoothing over the surface by hand or through other time consuming procedures.

It is readily apparent that neither the lay-up technique nor the traditional filament winding processes provide a method for the continuous formation of hydraulically settable materials into inexpensive, mass-producible articles. As set forth more fully in co-pending U.S. patent application Ser. No. 08/255,344, entitled "Methods For The Extrusion Of Novel, Highly Plastic And Moldable Hydraulically Settable Compositions," and filed Jun. 7, 1994, in the names of Per Just Andersen, Ph.D., and Simon K. Hodson (hereinafter the "Andersen-Hodson Extrusion Technology"), some have attempted to extrude cementitious materials in an effort to continuously produce cementitious articles such as, e.g., pipes or rods. See U.S. Pat. Nos. 3,857,715 to Humphrey and 5,588,443 to Bache et al. Nevertheless, although such patents claim that the cementitious materials disclosed therein can be extruded using traditional extruder and die apparatus, such extrusion efforts were performed in the laboratory and only under experimental conditions. To date, there are no workable processes or materials for continuously extruding a cementitious mixture except into flat slabs or board-like sheets. See, e.g., U.S. Pat. Nos. 5,047,086 to Hayakawa et al., 4,613,627 to Sherman et al., and 4,655,981 to Nielsen et al. Moreover, the materials set forth in the foregoing patents lack form stability and are, therefore, suitable only for extrusion into flat slabs or thick sheets that are supported by a conveyer belt or platform until sufficiently cured.

Because of the tradeoff between workability (and extrudability) and form-stability, cementitious materials which are "extruded" horizontally according to conventional methods generally must have a wall thickness of about 25% of the cavity cross-section in the case of hollow objects (e.g., pipe), although vertically extruded objects can have a wall thickness to cavity cross-section up to about 1:16.

Even when fully cured, typical cementitious materials, even those disclosed in the previously mentioned extrusion patents, have relatively low tensile and flexural strengths compared to other materials such as paper, metal, or plastic. Moreover, these patents do not teach how one might continuously reinforce the extruded cementitious articles with either parallel or wound filaments. Consequently, even such extrudable materials have limited use in mainly large, bulky, heavy-weight objects. Therefore, it would be a tremendous advancement in the art if a wider variety of articles having complex shapes or highly critical tolerances could be manufactured from hydraulically settable materials, particularly in light of the extremely low cost of hydraulically settable materials compared to most other materials. It would be an even greater improvement in the art if such hydraulically settable articles could be manufactured with continuous filaments to increase the strength and toughness of the articles so that they could substitute for conventional materials such as plastic, metal, wood, or clay presently used to manufacture, e.g., pipes, window frames, two-by-fours, moldings, rods, etc.

Due to a growing awareness of the environmental harm caused by the massive use of plastic, metal, and wood to manufacture enormous quantities of both long-lasting structural components, as well as disposable items, there has been an acute need to find environmentally sound substitutes for such materials. One such environmentally sound substitute would be hydraulically settable materials. In spite of such pressures and long-felt need, the technology simply has not previously existed for the economically feasible mass-production of hydraulically settable materials which could be substituted for plastic, metal, or wood in making a huge variety of articles.

Hydraulically settable materials are environmentally sound because they essentially include aggregates consisting of natural geologic materials, such as sand and clay, which are bound together by the reaction products of a hydraulically settable binder and water, which is also essentially "rocklike" from a structural and, especially, chemical, viewpoint. Hydraulically settable materials have essentially the same chemical and structural composition as the earth into which such materials might eventually be disposed.

In addition, plastic, metal, and wood are far more expensive than typical hydraulically settable (including cementitious) materials. Because no rational business would ignore the economic benefit which would necessarily accrue from the substitution of radically cheaper hydraulically settable materials for plastic, metal, or wood materials, the failure to do so can only be explained by a marked absence of available technology to make the substitution.

Based on the foregoing, it would be an advancement in the art to provide compositions, methods, and apparatus that would allow for the simultaneous placement of filaments during the extrusion of hydraulically settable materials into articles and shapes which have heretofore been impossible because of the inherent strength and moldability limitations of presently known hydraulically settable compositions.

It would yet be an advancement in the art to provide compositions, methods, and apparatus for the extrusion of and placement of filaments within hydraulically settable articles having an increased tensile strength to compressive strength ratio compared to conventional hydraulically settable materials.

It would yet be a tremendous advancement in the art to provide compositions, methods, and apparatus which would result in the ability to continuously extrude, and simultaneously place filaments within, a hydraulically settable mixture such that the extruded article or shape would be immediately form stable (i.e., be strong enough to maintain its shape without external support) in the green state upon exiting the extruder die.

It would be a further improvement in the art if such composition, methods, and apparatus allowed for the continuous placement of filaments having a variety of desired concentrations within an extruding hydraulically settable mixture.

In addition, it would be a tremendous advancement in the art to provide for the placement of continuous filaments within an extruding hydraulically settable mixture at a variety of different orientations or angles relative to the longitudinal axis of the extruded article.

It would yet be a major improvement in the art if such compositions, methods, and apparatus provided for the ability to extrude form stable pipes and tubes having substantially increased hoop or burst strength.

It would further be a significant improvement in the art if such compositions, methods, and apparatus provided for the effective consolidation or compaction of the hydraulically settable mixture around and through the continuously placed filaments in order to minimize the amount and volume of internal voids or defects and thereby yield a hardened hydraulically settable structure matrix that is substantially uniform and of consistently high strength.

It would yet be an improvement in the art if such compositions, methods, and apparatus provided for extruded hydraulically settable articles into which filaments could be continuously placed that had superior surface properties and greatly reduced surface defects compared to prior art methods for filament winding cementitious materials.

Still, it would be an advancement in the art if such compositions, methods, and apparatus yielded a variety of thin-walled hydraulically settable articles, including articles that require highly critical tolerances or dimensional preciseness.

It would be a tremendous advancement in the art to provide compositions, methods, and apparatus which could be used to extrude, and place continuous filaments within, hydraulically settable articles that could substitute for articles presently manufactured from conventional materials such as plastic, clay, metal, or wood.

It would be an advancement in the art if such hydraulically settable compositions had a rheology and a plastic-like behavior similar to clay such that such compositions could be extruded using a clay extruder.

From a practical point of view, it would be a significant improvement if such compositions, methods, and apparatus could be used to continuously manufacture a large variety of hydraulically settable articles at a cost and at production rates (i.e., high volume or quantity) comparable or even superior to the cost of manufacturing such articles from plastic, clay, metal, or wood.

Such compositions, methods, and apparatus are disclosed and claimed herein.

SUMMARY AND OBJECTS OF THE INVENTION

The present invention encompasses novel hydraulically settable compositions, methods, and apparatus used in the extrusion of and the simultaneous placement of continuous filaments within hydraulically settable compositions to form a large variety of articles. Such filaments can be longitudinally oriented, wound at an angle relative to the longitudinal axis, or a combination of the two. The preferred hydraulically settable compositions can generally be described as multi-component, multi-scale, fiber-reinforced, micro-composites. By carefully incorporating a variety of different materials (including hydraulically settable binders, inorganic aggregates, rheology-modifying agents, and fibers) capable of imparting discrete yet synergistically related properties, a unique class or range of micro-composites having remarkable properties of strength, toughness, environmental soundness, mass-producibility, and low cost can be created.

Such compositions can be extruded into a variety of shapes, ranging from the very simple to articles having highly critical tolerances and thin walls. Because of the continuous nature of both the extrusion and filament placement processes, such articles can be produced in a very cost-effective and economical manner. Moreover, the hydraulically settable materials of the present invention are environmentally neutral and comprise materials that have essentially the same qualities and characteristics as the earth.

Using a microstructural engineering approach, one can design into a hydraulically settable mixture the desired properties of rheology (including workability, yield stress, viscosity, and green strength) and final cured strength. In addition, properties such as high particle packing density, toughness, tensile strength, and elongation can also be designed into the mixture beforehand. In addition, by placing filaments having the desired properties of strength and flexibility into an almost endless variety of orientations and concentrations one can continuously manufacture reinforced articles having even greater strength, durability, flexibility, and toughness.

The usual problems inherent in typical hydraulically settable mixtures, namely the tradeoff between good workability and high green strength, are solved by creating a hydraulically settable mixture having a relatively high yield stress and an apparently low viscosity, particularly when exposed to higher pressure and shear during the extrusion process. By this means the present invention makes possible the ability to have a high degree of workability during the extrusion process and then immediate form-stability thereafter.

The extrudability and high green strength (i.e., form-stability) of the hydraulically settable mixtures of the present invention are attained through a combination of the heretofore perceived nonanalogous properties of particle packing optimization and water deficiency to create a relatively stiff material with high yield stress, but which has high workability when subjected to the increased pressures and shear rates associated with extrusion. By choosing aggregates selected to have varying but carefully chosen diameters, particle size distribution ("PSD"), and packing density, it is possible to reduce the amount of interstitial space between the particles by filling the spaces between the larger particles with smaller particles, and in turn filling the spaces formed by the smaller particles by yet smaller particles. In this way, it is possible to achieve particle packing densities in the range from about 65% to even as high as about 99%. That is, the volume of the dry hydraulically settable mixture will include from about 65% to about 99% solid material, and only from about 35% to as low as about 1% interstitial space or voids.

By carefully controlling how much water is added to the hydraulically settable mixture, one can create a mixture having a carefully chosen degree of "water deficiency." (As discussed in greater detail below, it should be understood that water is added to a hydraulically settable mixture for essentially two reasons: (1) to chemically react with (or "hydrate") the hydraulically settable binder and (2) to fill the voids between the particles in order to reduce the friction between the particles and lubricate them in order to give the mixture adequate plasticity and cohesion. If the amount of water is deficient, there will be greater friction between the particles, thereby resulting in a stiffer material. Depending on the amount of water or other additives (such as dispersants, which can be added to lubricate or disperse the particles), one skilled in the art can carefully control the rheology in order to create the desired level of workability under pressure.

It should be understood that a mixture having greater packing density will require much less water to fill the interstitial voids. Consequently, the amount of water added to create a desired level of water deficiency is preferably determined before the water is added, the amount of water being based primarily upon the particle packing efficiency and the anticipated compression of the extrusion process.

Once a suitable hydraulically settable mixture has been created, it is placed in an extruder and then subjected to pressure. The resulting compression increases the packing density by forcing the particles together, which in turn decreases the volume of interstitial space between the individual particles of the mixture. This decreases the "effective" level of water deficiency, which increases the amount of water available to lubricate the particles (as well as to lubricate the movement of the hydraulically settable mixture through the extruder die), whereupon the hydraulically settable mixture has greater workability and is able to flow. In addition, compressing the mixture during extrusion also creates a thin film of water between the extruder die and the mixture, which lubricates the surface between the die and mixture. The extruder die may also be heated in order to create a steam "cushion" or barrier between the extruded hydraulically settable mixture and the extruder die, thereby reducing the friction and increasing the ease of extrusion. Thereafter, the internally formed capillaries or menisci caused by compressing the mixture creates internal cohesion forces that give the mixture improved form-stability after extrusion.

The high level of workability and flowability of the mixture while under pressure allows it to be extruded through an orifice of an extruder die into the desired article or shape. The ability of the hydraulically settable mixture to be extruded and have good form-stability may be accomplished in one of two ways. First, because most of the hydraulically settable mixtures of the present invention approximately behave as a Bingham fluid, or pseudoplastic body, the viscosity of the mixture will decrease as the critical shear rate in the form of applied pressure is exceeded. In other words, the hydraulically settable mixtures of the present invention usually experience "shear thinning" as the pressure (and hence the shear) is increased, such as by using an extruder capable of applying high pressure. Hence, by applying high pressures (and creating the attendant shear), most hydraulically settable mixtures of the present invention can be extruded.

Instead of, or in addition to the application of high pressure, it may also be advantageous to design a hydraulically settable mixture that has the lowest possible ratio of viscosity to yield stress. As the viscosity is lowered, the amount of stress above the yield stress of the materials necessary to cause the mixture to flow decreases. This strategy is especially useful where lower pressure extrusion is desired.

Upon being extruded, the hydraulically settable mixture will no longer be exposed to the compressive and shear forces of the extruder, and the mixture will then attain greater stiffness, viscosity, cohesion, form stability, and green strength. The amount of green strength achieved by the compositions, methods, and apparatus of the present invention far exceeds that which has been obtained using previous cementitious compositions, methods, and apparatus.

The hydraulically settable compositions of the present invention may also include other components besides a hydraulically settable binder, water, and aggregates such as rheology-modifying agents, dispersants, and fibers. Rheology-modifying agents can be added to increase the yield stress, cohesive strength, and plastic-like behavior of the hydraulically settable mixture, while dispersants can be added in order to obtain a mixture having similar flow properties while including less water. Fibers are usually added to increase the toughness and tensile, flexural and, sometimes, even the compressive strength of the final cured product.

More particularly, rheology-modifying agents increase the "plastic-like" behavior, or the ability of the mixture to retain its shape when molded or extruded. Suitable rheology-modifying agents include a variety of cellulose-, starch-, and protein-based materials, which can be ionic or nonionic, and which act by gelating the water and by bridging the individual hydraulically settable binder particles and other particles within the hydraulically settable mixture together. By increasing the "plastic-like" consistency of the hydraulically settable mixture, the rheology-modifying agent also increases the ability to extrude an article having high form-stability. (Gypsum hemihydrate may also be added in order to increase the form-stability due to its rapid reaction with water, thereby reducing the amount of capillary water present in the hydraulically settable mixture in a short period of time. In this way, gypsum hemihydrate may act as a rheology-modifying agent in some cases.)

Dispersants, on the other hand, act to decrease the viscosity and yield stress of the mixture by dispersing the individual hydraulically settable binder particles. This allows for the use of less water while maintaining adequate levels of workability, which allows for greater water deficiency. Suitable dispersants include any material which can be adsorbed onto the surface of the hydraulically settable binder particles and which act to disperse the particles, usually by creating a negative electrical charge on the particle surface or into the near colloid double layer. Fillers such as kaolin, mica, calcium carbonate, or bentonite also become highly dispersed by the use of dispersants.

However, in the case where both a dispersant and a rheology-modifying agent are used, it will usually be advantageous to add the dispersant first and the rheology-modifying agent second in order to obtain the beneficial effects of each. Otherwise, if the rheology-modifying agent is first adsorbed by the binder particles, it will form a protective colloid, which will greatly inhibit the adsorption of the dispersant by the particles, thereby limiting the dispersing effect of the dispersant within the hydraulically settable mixture.

In addition to adding aggregates having various diameters, shapes, sizes, and properties (e.g., specific gravity, bulk density, morphology), it might be desired to include aggregates having different strength and insulation properties. In this way, the hydraulically settable mixture can be optimized both from the standpoint of the desired rheology or flow properties useful in the extrusion process as well as the final properties of the cured material.

Finally, the primary novel feature of the present invention is the ability to introduce filaments or continuous fibers into the structural matrix of the extruded article during the extrusion process. Introduction of filaments during the extrusion process involves placing the filaments into the mixture, which encases and draws the filaments in the hydraulically settable mixture along in the extrusion direction. The hydraulically settable mixture becomes consolidated or compacted as a result of the internal pressure applied to the mixture during the extrusion process, thereby minimizing the amount and volume of internal voids or defects within the mixture and maximizing the interface between the filaments and the hydraulically settable mixture. Increasing the interface between the filaments and matrix helps to more securely anchor the filaments within the hydraulically settable structural matrix.

Different embodiments of the apparatus for continuously placing filaments within the extruding hydraulically settable mixture permit the filaments to be placed in a variety of configurations or orientations. These include parallel configuration, helical configuration, criss-cross configuration, or combinations of these configurations. In a "parallel configuration" the filaments are generally coaxial to the longitudinal axis, or extrusion direction, of the hydraulically settable article. Conversely, in the "helical configuration" and "criss-cross configuration" (which is merely a variation of the helical configuration), the filaments are offset from the longitudinal axis, usually at an angle $\alpha$ of at least about 5° up to a maximum of about 90°, which may be referred to herein as the "offset angle", "winding angle" or "spiral angle". (Depending on the direction of rotation of the filament placing means, i.e., clockwise or counterclockwise, angle $\alpha$ can either be positive or negative but will not have a magnitude greater than 90°, an angle of 91° being identical to an angle of −89°.)

By varying the concentration and/or angle of orientation of the filaments placed within the extruded hydraulically settable articles of the present invention, a wide variety of strength, elongation, and toughness properties can be attained. Filaments having a lower winding angle will generally define an elliptical cross section of the pipe or cylinder into which they are placed. As the winding angle increases to 90°, the filaments will tend to define an ellipse of diminishing cross-width. At an angle of 90°, the filaments will define a circular cross section. Assuming that the article being extruded is a pipe, cylinder, or other article having a generally circular cross-section, it will have a radius that is generally perpendicular to the longitudinal axis. For purposes of defining the direction and magnitude of the strength imparted by the filaments, it would be useful to define the strength imparted by the filaments as having vector components corresponding to the longitudinal axis and radius, respectively. Whenever a filament has an angle of offset greater than 0° but less than 90°, the filament will have both a longitudinal vector component and a radial vector component. In filaments having a winding angle less than 45°, the longitudinal strength vector would be expected to generally exceed the radial strength vector. Similarly, in filaments having a winding angle greater than 45°, the radial strength vector would be expected to generally exceed the longitudinal strength vector.

In general, more longitudinally oriented filaments having a greater longitudinal strength vector will tend to increase the tensile strength of the hydraulically settable article in the longitudinal, or length-wise, direction. Conversely, filaments having a greater angle of offset relative to the longitudinal axis, i.e., those having a greater radial strength vector, will instead tend to increase the circumferential strength (otherwise known as hoop or burst strength in the case of a pipe or other hollow structure). A mixture of filaments having both higher and lower angles of offset can be used in order to impart each of these properties.

The apparatus comprises means for continuously placing filaments within an extruding hydraulically settable mixture which are in direct communication with a filament placement chamber, which is an interior chamber of an extruder. The apparatus further comprises means for storing and continuously providing filaments to at least one placing means.

The placing means place the filaments at or below the surface of the hydraulically settable structural matrix and the hydraulically settable mixture draws the filaments forward as the mixture advances. The placing means can be a rotatable placing means which rotate either clockwise or counterclockwise around the filament placement chamber by means for rotating the placing means, thereby winding the filaments in a helical configuration extending within the article along the same axis as the extrusion direction. The placing means can also be a fixed placing means which remains stationary to place the filaments in a parallel configuration. Operation of at least two placing means at different speeds or direction will yield an article having filaments of varying angles of offset from the longitudinal axis.

Each placing means comprises means for receiving at least one filament into the placing means, means for channeling the received filament through the placing means and means for inserting the filament into the filament placement chamber. The means for inserting can have any shape capable of positioning the filaments at or below the surface of the hydraulically settable structural matrix and can have varying cross-sectional shapes. Example of a means for inserting include a nib end, a scoop end or a hollow needle which extend into the filament placement chamber from a channeling means.

The means for storing and continuously providing filaments to at least one placing means comprises a filament dispenser, such as a spool. The means for storing and continuously providing filaments to at least one placing means further comprises at least one feeder ring which supports at least one filament dispenser. The means for storing and continuously providing filaments can rotate with the rotatable placing means or remain stationary for use with the fixed placing means. The filament dispenser may also comprise tensioners to provide tension on the filaments.

The placement level of the filaments within the hydraulically settable structural matrix can be varied by varying the position of the placing means. The placement level can also be altered by selectively adjusting the tension on the fibers by tensioners. In general, the greater the tension, the greater the depth of placement of the filament. In addition, the extrusion pressure and mixture rheology also affect the placement of the filaments to some degree.

The angle $\alpha$ at which the filament is placed is a function of both the forward extrusion speed ("$V_e$"), as well as the rotational velocity ("$V_r$") of the placing means. In fact, the tangent of angle $\alpha$ is proportional to the ratio of the rotational velocity to the extrusion speed ($V_r/V_e$). Therefore, all things being equal, the faster the extrusion speed, the lower the winding angle of the filaments. Conversely, the greater the magnitude of the rotational velocity of the placing means the greater the magnitude of the winding angle of the filaments. The concentration of filaments within the hydraulically settable matrix of the extruded article is directly proportional to both the number of filaments, as well as the average angle $\alpha$ of the filaments. As both the number and average angle $\alpha$ of the filaments increases, so does the concentration. The greater the concentration of filaments, the less space there is between the individual filament strands. This results in a greater and more uniform effect imparted by the filaments to the hydraulically settable matrix of the extruded article. In general, smaller diameter fibers more closely spaced together will tend to more uniformly impart the desired properties of, e.g., strength, flexibility, and toughness compared to larger diameter fibers.

Finally, depending on their chemical makeup, the filaments themselves can have greatly varying tensile and shear strengths, as well as flexibility and the ability to elongate. Such properties are also affected by the diameter of the filaments, or whether they consist of a single strand or a groups of strands twisted or otherwise joined together to form a single filament unit.

Using the compositions, methods, and apparatus described above, it is possible to extrude a wide variety of differently shaped articles having continuous filaments dispersed within the hydraulically settable matrix of the articles. Such extruded articles include generally square, rectangular, cylindrical, or elliptical rods or bars, boards, "I-beams," "two-by-fours," simple multicellular structures, pipes, tubes, or other hollow structures, window frames, bricks, or roofing tiles. Such articles benefit from the internal placement of continuous filaments within a highly consolidated and compacted hydraulically settable matrix, while maintaining highly critical tolerances where needed.

Such articles have properties which are similar, and even superior, to similar articles made from other materials such as plastic, wood, clay, or metal. However, hydraulically settable materials have the advantage in that they usually cost far less compared to these other materials. In addition, the hydraulically settable articles made according to the present invention are generally more environmentally neutral compared to conventional materials in present production.

From the foregoing, it will be appreciated that an important object and feature of the present invention is to provide compositions, methods, and apparatus that allow for the simultaneous placement of filaments during the extrusion of hydraulically settable materials into articles and shapes which have heretofore been impossible because of the inherent strength and moldability limitations of presently known hydraulically settable compositions.

It is another object and feature to provide compositions, methods, and apparatus for the extrusion of and placement of filaments within hydraulically settable articles having an increased tensile strength to compressive strength ratio compared to conventional hydraulically settable materials.

Another object and feature is that such compositions, methods, and apparatus result in the ability to continuously extrude, and simultaneously place filaments within, a hydraulically settable mixture such that the extruded article or shape is immediately form stable (i.e., is strong enough to maintain its shape without external support) in the green state upon exiting the extruder die.

Yet a further object and feature is that such composition, methods, and apparatus allow for the continuous placement of filaments having a wide variety of concentrations within an extruding hydraulically settable mixture.

Another object and feature is to provide for the placement of continuous filaments within an extruding hydraulically settable mixture at a variety of different orientations or angles relative to the longitudinal axis of the extruded article.

Yet another object and feature is that such compositions, methods, and apparatus yield extruded, form stable pipes and tubes having substantially increased hoop or burst strength.

Still, a further object and feature of the present invention is to provide compositions, methods, and apparatus which result in the effective consolidation or compaction of the hydraulically settable mixture around and through the continuously placed filaments in order to minimize the amount and volume of internal voids or defects and thereby yield a hardened hydraulically settable structure matrix that is substantially uniform and of consistently high strength.

In addition, an object and feature is that such compositions, methods, and apparatus yield extruded hydraulically settable articles into which filaments have been continuously placed that have superior surface properties and greatly reduced surface defects compared to prior art methods for filament winding cementitious materials.

Yet another object and feature is that such compositions, methods, and apparatus yield a variety of thin-walled hydraulically settable articles, including articles that require highly critical tolerances or dimensional preciseness.

A further object and feature is to provide compositions, methods, and apparatus that can be used to extrude, and place continuous filaments within, hydraulically settable articles that can be substituted for articles presently manufactured from conventional materials such as plastic, clay, metal, or wood.

Another object and feature of the present invention is to provide hydraulically settable compositions that have a rheology and a plastic-like behavior similar to clay such that such compositions can be extruded using a clay extruder.

Still, another object and feature is to provide compositions, methods, and apparatus that can be used to continuously manufacture a large variety of hydraulically settable articles at a cost and at production rates (i.e., high volume or quantity) comparable or even superior to the cost of manufacturing such articles from plastic, clay, metal, or wood.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof, which is illustrated in the appended drawings. Understanding that these drawings depict only a typical embodiment of the invention and are not, therefore, to be considered limiting of its scope, the invention will be described and explained with additional specificity and detail through the use of the accompanying drawings in which:

FIG. 1 is a greatly enlarged elevational cross-section view of the arrangement of particles within a hydraulically settable mixture having a moderately high natural particle packing density of 70%;

FIG. 2 is a greatly enlarged elevational cross-section view of the mixture illustrated in FIG. 1, together with a corresponding graph quantifying the volume occupied by the particles and the volume occupied by the interstitial voids between the particles;

FIG. 3 is a greatly enlarged elevational cross-section view of the mixture illustrated in FIG. 1 to which a quantity of water equaling the volume of interstitial voids has been added, together with a corresponding graph quantifying the volume occupied by the particles and the volume occupied by the water between the particles;

FIG. 4 is a greatly enlarged elevational cross-section view of the mixture illustrated in FIG. 1 to which a quantity of water less than the volume of interstitial voids has been added to form a water deficient mixture, together with a corresponding graph quantifying the volume occupied by the particles, the volume occupied by the water between the particles, and the volume occupied by the interstitial voids that yet remain between the particles;

FIG. 5 is a greatly enlarged elevational cross-section view of the mixture illustrated in FIG. 4 upon which a compressive force (i.e., pressure) has been applied sufficient to force the particles into a more closely packed arrangement, together with a corresponding graph quantifying the volume occupied by the particles, the volume occupied by the water between the particles, and the lesser volume occupied by the interstitial voids that yet remain between the particles;

DETAILED DESCRIPTION OF THE PREFERRED EMBODIMENTS

Figure 6:
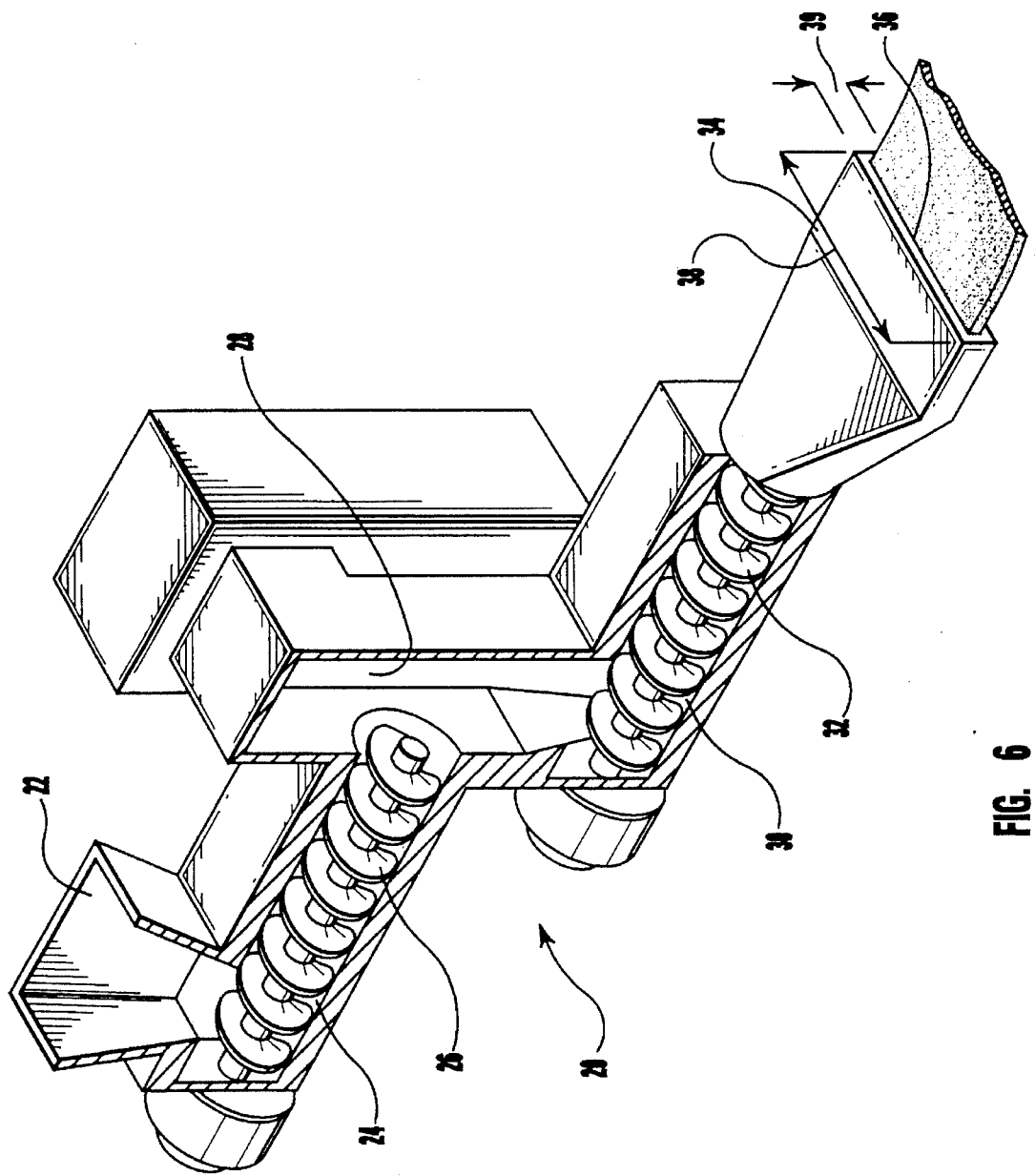
FIG. 6 is a cross-section view of an auger extruder.

The present invention encompasses novel compositions, methods, and apparatus for the continuous placement of filaments within and during the extrusion of hydraulically settable mixtures into a desired article. The continuous filaments increase the flexural, tensile, and hoop strengths, as well as the toughness, flexibility, and elongation ability of the hydraulically settable article. A variety of articles can be formed, including those which have thin walls, complicated shapes, and/or highly critical tolerances. In addition, relatively large, thick-walled objects such as "two-by-fours" or other structural objects can also be efficiently extruded and impregnated with filaments using the compositions, methods, and apparatus of the present invention. Such extruded articles are immediately (or in a manner of seconds) form-stable upon being extruded.

The novel hydraulically settable compositions can generally be described as multi-component, multi-scale, fiber-reinforced, micro-composites. By carefully incorporating a variety of different materials (including inorganics and fibers) capable of imparting discrete yet synergistically related properties, it is possible to create a unique class or range of microcomposites having remarkable properties of strength, toughness, environmental soundness, mass-producibility, and low cost.

The term "multi-component" refers to the fact that the hydraulically settable materials of the present invention typically include three or more chemically or physically distinct materials or phases, such as fibers, filaments, inorganic aggregate materials, organic aggregate materials, hydraulically settable materials, organic theology-modifying agents, dispersants, water, and other liquids. Each of these broad categories of materials imparts one or more unique properties to the final article extruded therefrom (as well as the mixture used to form the article). Within these broad categories it is possible to further include different components (such as two or more inorganic aggregates or fibers) which can impart different, yet complementary, properties to the extruded article. This allows for the specific engineering of desired properties within the article in conjunction the extrusion process.

The term "multi-scale" refers to the fact that the compositions and materials of the present invention are definable at different levels or scales. Specifically, within the hydraulically settable materials of the present invention there is typically a macro-component composition in the range from about 0.01 mm to as high as about 10 mm, a micro-component composition in the range of about 10 nanometers to about 10 microns, and a submicron component. Although these levels may not be fractal, they are usually very similar to each other, and homogeneous and uniform within each level.

The term "fiber-reinforced" is self-explanatory, although it may also fairly be applied to the reinforcing action of the filaments as well as fibers. The structural matrix of the hydraulically settable materials of the present invention relies on the bond or interaction between the hydraulically settable binder, inorganic aggregate, the rheology-modifying agent, the fibers, and the filaments. The fibers and filaments act primarily as reinforcing components to specifically add ductility, tensile strength, flexural strength, hoop strength, flexibility, and elongation ability.

Finally, the term "micro-composite" refers to the fact that the hydraulically settable materials are not merely a compound or mixture but a designed matrix of specific, discrete materials on a micro-level, which are of different sizes, shapes, and chemical make-up. The materials are sufficiently well bound and interactive so that the unique properties of each are fully evidenced in the final composite (e.g., the tensile strength of the matrix has a direct correlation to the tensile strengths of the fibrous and filament components; the burst or hoop strength of a hollow article has a direct correlation to the filament strength, diameter, placement angle, and concentration; etc.).

In light of these definitions and principles, materials that include a hydraulically settable binder, an inorganic aggregate, water, (optionally) fibers (both organic and inorganic), and (optionally) an organic rheology-modifying agent can be combined and extruded into a variety of articles. Such articles can have a variety of different strength, toughness, and density characteristics, and can have highly critical tolerances. This allows the hydraulically settable materials of the present invention to be continuously extruded and filament wound (and, hence, mass produced) into a variety of articles presently made from, e.g., plastic, metal, wood, or clay.

As described more fully hereinafter, the basic parameters of the hydraulically settable mixtures of the present invention include (1) the particle packing density, (2) the amount of hydraulically settable binder (usually hydraulic cement), (3) the amount of water, (4) the extrusion pressure, (5) the rheology (including the yield stress and green strength), and (6) the strength of the final cured product (including compressive and tensile strengths).

I. GENERAL DISCUSSION.

A. General Description of the Extrusion Process.

Hydraulically settable products, including cementitious materials and the methods of utilizing them, have been known for millennia. The types of cementitious or other hydraulically settable products that have been made are various and numerous, although they share the common quality of generally being large and bulky. In particular, cementitious objects generally require significant size and mass in order to achieve the desired strength and other performance criteria. Typical cementitious materials also require relatively extensive setting and curing times before they can be demolded. The moldability and/or extrudability of most hydraulically settable mixtures is generally limited by the tradeoff between workability and form-stability. Increasing one usually decreases the other, leaving only a narrow range of acceptable rheologies.

The present invention overcomes this tradeoff between extrudability and form-stability by creating a highly plastic and cohesive hydraulically settable mixture that is form-stable immediately or shortly after being extruded. The term "plastic" refers to a hydraulically settable mixture that is workable, which will flow under pressure, and which has sufficient cohesive strength so as to be form-stable in the green state (green strength or form-stability is either immediate or within a matter of seconds).

The unique properties of the hydraulically settable mixtures made according to the present invention result from carefully controlled rheology, preferably by optimizing the particle packing density, as described more fully below, coupled with a deficiency of water. The deficiency of water yields a relatively stiff, or highly viscous, hydraulically settable mixture because there is insufficient water to completely fill the interstices between the particles, leaving insufficient water to fully lubricate the particles. In cases where there is very low initial water, the hydraulically settable mixture may consist of dry-looking granulates that lack cohesion and do not hold together as a single mass.

However, by exposing the water deficient mixture to increased mechanical pressure by an auger or piston extruder, as well as by applying a vacuum to the mixture in order to substantially evacuate the air within the interstitial space, the particles within the hydraulically settable mixture compress together, thereby increasing their packing density. This in turn reduces the effective water deficiency, thus allowing the water to more completely fill the interstices between the more densely packed particles. The apparent increase in the water that is available to fill the interstices better lubricates the particles, reduces the interparticulate friction, and allows the mixture to flow more easily by temporarily decreasing the yield stress. In addition, vibrating the mixture may also decrease the viscosity of a water deficient mixture.

Upon exiting the die, the reduction in pressure exerted on the hydraulically settable mixture allows the material to expand slightly and return to a slightly less optimized state of particle packing. This in turn creates a partial vacuum or negative pressure within the capillaries and strong meniscus forces are created that hold the hydraulically settable material together. The sudden lack of pressure (and lower shear rate) increases the viscosity of the material which, together with a high yield stress at the zero sheer rate, reduces the amount of water available to lubricate the particles, and results in an immediate increase in form-stability.

The rheology of the hydraulically settable mixture may also be influenced by other additives within the cementitious mixture, such as cellulose-, starch-, or protein-based or synthetic organic rheology-modifying agents, which increase the yield stress of the mixture while not significantly increasing or decreasing the viscosity to the point of unworkability. Under the high shear conditions within either an auger or piston extruder, the higher yield stress is overcome, the plastic viscosity is temporarily lowered, and the mixture has a temporary increase in its ability to flow. Once the hydraulically settable material has been extruded and the shear forces have been removed, the rheology-modifying agent aids in creating a more cohesive, form-stable extruded product. Hence, the rheology-modifying agent helps to create a hydraulically settable mixture that exhibits sheer thinning, thixotropic, or pseudo-plastic behavior, that is, a material which has an apparent decrease in viscosity when subjected to shear forces, including pressure and vibration.

In addition to imparting desired rheological properties to the mixture, optimizing the particle packing within the mixture greatly increases the final strength of the cured product by reducing the amount of water and air within the hydraulically settable matrix. According to the Strength Equation below, the compressive strength of a cured cementitious product has been found to be inversely proportional to the amount of added water and interstitial air ($\sigma$ is the comprehensive strength of the cured cementitious product; k represents the highest possible theoretical strength, assuming no interstitial water or air, and is usually about 300–500 MPa, although it may be as high as 800 MPa in some cases, such as where the extruded article is cured by autoclaving; $V_c$ is the volume of cement; $V_w$ is the volume of water; and $V_a$ is the volume of air or interstitial space within a cementitious mixture):

$$\sigma = k[V_c/(V_c+V_w+V_a)]^2 MPa$$

In normal, uncompacted cement paste, k=340 MPa, while in a highly compacted system k=500 MPa. The size of k therefore depends on the processing technique, but is constant for the same technique. In general, reducing the amount of air and water within the hydraulically settable mixture will both increase the strength of the final cured material. Both can be reduced while also improving the workability of the hydraulically settable mixture by increasing the particle packing density, as set forth more fully below. In addition, increasing the extrusion pressure and attendant compaction during the extrusion process can also greatly reduce the amount of interstitial air, while maintaining adequate flowability where a higher water deficiency (less water) is used.

In cases where the particle packing density of the hydraulically settable mixture has been optimized to the higher end of the ranges discussed herein, a relatively high extrusion pressure capable of eliminating most of the interstitial air is used, and very little water is added initially, articles of manufacture having a hydraulically settable matrix can be extruded which have compressive strengths higher than 500 MPa, even approaching 800 MPa if autoclaved, for example.

It is true that high strength concrete products have been made in a laboratory setting which have low water and low interstitial air. However, they are generally formed by isostatic compaction (often dry packed) under extreme pressures, usually by means of high pressure molding greater than about 70 MPa. However, these methods are not adaptable to the economical mass production of cementitious materials, nor do they allow for the molding of anything but the simplest, most rudimentary forms. They certainly do not allow for the continuous formation by extrusion of large volumes of form-stable hydraulically settable articles such as are possible using the compositions and methods of the present invention. Moreover, extrusion provides a more continuous method for mass producing certain articles, such as those that are relatively long and narrow and have a constant cross-sectional shape and dimension, compared to conventional molding processes.

Besides incorporating into the hydraulically settable matrix filaments, as discussed more fully below, it may also be desirable to co-extrude the hydraulically settable mixture with other materials in order to obtain, e.g., a laminate structure or an extruded product with other materials impregnated within or extruded over the surface of the hydraulically settable matrix. Things which may be co-extruded with the extrudable hydraulically settable mixtures of the present invention include another hydraulically settable mixture (often having different or complementary properties), a fibrous mat, graphite (to form pencils), coating materials, polymers, clays, and continuous strips, wires, or sheets of almost any other material (such as metal). It has been found that by joining together, for example, a hydraulically settable sheet and a fibrous mat by co-extrusion, the final product exhibits synergistic results of strength, toughness, and other desirable properties.

After the hydraulically settable mixture has been extruded into the desired shape, it may be allowed to harden in the extruded shape. The hardening process may be accelerated by heating the object, such as by means of heating under controlled high relative humidity or high pressure autoclaving. Alternatively, the extruded shape may further be altered or manipulated, such as by passing an extruded sheet between a pair of rollers in order to reduce the thickness of the sheet and/or improve the surface quality of the sheet. The extruded object may also be curved, bent, cut, or further molded using any known molding process into a wide variety of other objects or shapes.

B. Extruded Shapes and Articles.

Terms such as "extruded shape", "extruded article" and "hydraulically settable article", as used in this specification and the appended claims, are intended to include any known or future designed shape or article formed by continuously extruding, and impregnating with filaments, the hydraulically settable compositions of the present invention. An illustrative, yet by no means exhaustive, list of the extruded shapes or articles which may be manufactured according to the present invention includes rectangular, square, elliptical, or cylindrical rods or bars, concrete rebars, pipes, tubes, straws, cylinders, multicellular structures, boards, I-beams, "two-by-fours", window frames, bricks, roofing tiles, and pencils.

In addition, the terms "extruded article", "extruded shape" and "hydraulically settable article" are also intended to include all precursor shapes or articles that are initially formed by extruding the compositions of the present invention, impregnating the extruded article with filaments, but which are thereafter manipulated, augmented, or otherwise formed into other shapes or articles. For example, an extruded bar or pipe which is initially straight might be curved into a curved bar. Both straight and curved bars or pipes are within the purview of the present invention and are intended to fall within the definition of an "extruded article", "extruded shape" or "hydraulically settable article".

These terms are also intended to include any extruded article or shape which is intended to be incorporated into any other article, whether or not such article is also within the scope of this patent. While the combination of extruded articles, or the combination of an extruded article and any other article, might have independently patentable features, the subpart obtained using the methods and apparatus of the present invention is intended to fall within the terms "extruded object", "extruded article" or "hydraulically settable article", as would any combination of subparts.

C. Microstructural Engineering Design.

As mentioned above, the hydraulically settable compositions of the present invention have been developed from the perspective of a micro structural engineering and materials science approach in order to build into the microstructure of the hydraulically settable matrix certain desired, predetermined properties, while at the same time remaining cognizant of costs and other manufacturing complications. Furthermore, this microstructural engineering analysis approach, in contrast to the traditional trial-and-error, mix-and-test approach, has resulted in the ability to design hydraulically settable materials with those properties of strength, weight, insulation, cost, and environmental neutrality that are necessary in order to extrude a wide variety of hydraulically settable objects in a significantly more efficient manner than previously possible.

The number of different raw materials available to engineer a specific product is enormous, with estimates ranging from between fifty thousand and eighty thousand. They can be drawn from such disparately broad classes as metals, polymers, elastomers, ceramics, glasses, composites, and cements. Within a given class, there is some commonality in properties, processing, and use-patterns. Ceramics, for instance, have a high modulus of elasticity, while polymers have a low modulus; metals can be shaped by casting and forging, while composites require lay-up or special molding techniques; hydraulically settable materials, including those made from hydraulic cements historically have low flexural strength, while elastomers have high flexural strength.

However, compartmentalization of material properties has its dangers; it can lead to specialization (the metallurgist who knows nothing of ceramics) and to conservative thinking ("we use steel because that is what we have always used"). In part, it is this specialization and conservative thinking that has limited the consideration of using hydraulically settable materials for a variety of products such as extruded shapes, particularly those with relatively thin walls, complicated shape or highly critical tolerances.

Nevertheless, once it is realized that hydraulically settable materials have such a wide utility and can be microstructurally designed and engineered, then their applicability to a variety of possible products becomes obvious. Hydraulically settable materials have an additional advantage over other conventional materials in that they gain their properties under relatively gentle and nondamaging conditions. (Other materials require high energy, severe heat, or harsh chemical processing that significantly affects the material components.) Therefore, many nonhydraulically settable materials, including filaments, can be incorporated into hydraulically settable materials without damage and with surprising synergistic properties or results if properly designed and engineered.

The design of the compositions of the present invention has been developed and narrowed, first by primary constraints dictated by the design, and then by seeking the subset of materials which maximizes the performance of the components. At all times during the process, however, it is important to realize the necessity of designing products which can be manufactured in a cost-competitive process.

Primary constraints in materials selection are imposed by characteristics of the design of a component which are critical to a successful product. With respect to an extruded article, those primary constraints include desired weight and desired strength (e.g., compressive, tensile, flexural, and hoop strength), toughness, and other performance criteria requirements, while simultaneously keeping the costs comparable to their, e.g., plastic, wood, clay, or metal counterparts.

As discussed above, one of the problems with hydraulically settable materials in the past has been that they are typically poured into a form, worked, and then allowed to set, harden, and cure over a long period of time—even days or weeks. Experts generally agree that it takes at least one month for traditional concrete products to reach their maximum strength. Even with expensive "set accelerators," this strength gain occurs over a period of days. Such time periods are usually impractical for the economic mass production of the hydraulically settable articles contemplated by the present invention.

As a result, an important feature of the present invention is that when the hydraulically settable mixture is extruded into the desired shape or article, it will maintain its shape (i.e., support its own weight subject to minor forces, such as gravity and movement through the processing equipment) in the green state without external support. Further, from a manufacturing perspective, in order for production to be economical, it is important that the extruded object rapidly (in a matter of seconds) achieve sufficient strength so that it can be handled using ordinary manufacturing procedures, even though the hydraulically settable mixture may still be in a green state and not fully hardened.

Another advantage of the microstructural engineering and materials science approach of the present invention is the ability to develop compositions in which cross-sections of the structural matrix are more homogeneous than have been typically achieved in the prior art. Ideally, when any two given samples of about 1–2 mm$^3$ of the hydraulically settable matrix are taken, they will have substantially similar amounts of hydraulically settable binder particles, hydraulically settable binder gel, aggregates, fibers, filaments, rheology-modifying agents, and any other additives.

In its simplest form, the process of using a materials science analysis in microstructurally engineering and designing a hydraulically settable material comprises characterizing, analyzing, and modifying (if necessary): (a) the aggregates, (b) the particle packing, (c) the system rheology, and (d) the processing and energy of the manufacturing system. In characterizing the aggregates, the average particle size is determined, the natural packing density of the particles (which is a function of the actual particle sizes and morphology) is determined, and the strength of the particles is ascertained. (Unreacted or previously reacted hydraulically settable binder particles may be considered to be an aggregate.)

With this information, the particle packing can be predicted according to mathematical models. It has been established that the particle packing is a primary factor for designing desired requirements of the ultimate product, such as workability, form-stability, shrinkage, bulk density, insulative capabilities, tensile, compressive, and flexural strengths, elasticity, durability, and cost optimization. The particle packing is affected not only by the particle and aggregate characterization, but also by the amount of water and its relationship to the interstitial void volume of the packed aggregates.

System rheology is a function of both macro-rheology and micro-rheology. The macro-rheology is the relationship of the solid particles with respect to each other as defined by the particle packing. The micro-rheology is a function of the lubricant fraction of the system. By modification of the lubricants (which may be water, rheology-modifying agents, plasticizers, dispersants, other materials, or a combination of these), the viscosity and yield stress can be modified. The micro-rheology can also be modified physically by changing the shape and size of the particles, e.g., the use of chopped fibers, plate-like mica, round-shaped silica fume, rhombic fused silica, or crushed, angular, or granular hydrated binder particles, each of which will interact with the lubricants differently.

Finally, the manufacturing processing can be modified to manipulate the balance between workability and form-stability. In general, lowering the viscosity of the mixture increases the workability, while increasing the yield stress increases the form-stability of the extruded material. As applied to the present invention, it is generally optimal to maintain a minimum desired yield stress while minimizing the viscosity. Molding or deformation of the material only occurs when a force greater than the yield stress of the hydraulically settable mixture is applied.

The yield stress and, hence, the form-stability of the extruded object can also be increased by either chemical additives (such as by adding a rheology-modifying agent) or by adding energy to the system (such as by heating the extrusion apparatus or the extruded materials). For example, heating the material as it is extruded can activate a starch additive, thereby causing it to increase the yield stress of the extruded material. In addition, heat accelerates the hydration reaction between the hydraulically settable binder and water, sometimes by factors as high as 10 or even 20 times the normal reaction rate. Indeed, it is this discovery of how to manipulate the hydraulically settable compositions in order to increase the form-stability of the compositions while obtaining good flow during the formation process that make the present invention such a significant advancement in the art.

From the following discussion, it will be appreciated how each of the component materials within the hydraulically settable mixture, as well as the processing parameters, contributes to the primary design constraints of the extrudable hydraulically settable mixtures so that a wide variety of extruded articles can be produced therefrom. Specific compositions are set forth in the examples given later in order to demonstrate how the maximization of the performance of each component accomplishes the combination of desired properties.

D. Hydraulically Settable Materials.

The materials used to manufacture the extruded articles of the present invention develop strength through the chemical reaction of water and a hydraulically settable binder, such as hydraulic cement, calcium sulfate (or gypsum) hemihydrate (which is sometimes mixed with gypsum anhydride, commonly known as "anhydrite"), and other substances which harden after being exposed to water. Even slag, blast furnace slag, fly ash, or silica fume may be activated and act as a "hydraulically settable binder."

The term "hydraulically settable materials" as used in this specification and the appended claims includes any material with a structural matrix and strength properties that are derived from a hardening or curing of a hydraulically settable binder. These include cementitious materials, plasters, and other hydraulically settable materials as defined herein. The hydraulically settable binders used in the present invention are to be distinguished from other cements or binders such as polymerizable, water insoluble organic cements, glues, or adhesives.

The terms "hydraulically settable material," "hydraulic cement materials," or "cementitious materials," as used herein, are intended to broadly define compositions and materials that contain both a hydraulically settable binder and water, regardless of the extent of hydration or curing that has taken place. Hence, it is intended that the term "hydraulically settable materials" shall include hydraulic paste or hydraulically settable mixtures in a green (i.e., unhardened) state, as well as hardened hydraulically settable or concrete products. While in a green state, hydraulically settable materials may also be referred to as "hydraulically settable mixtures."

1. Hydraulically Settable Binders.

The terms "hydraulically settable binder" or "hydraulic binder," as used in this specification and the appended claims, are intended to include any inorganic binder (such as hydraulic cement, gypsum hemihydrate, calcium oxide, or mixtures thereof) which develops strength properties and hardness by chemically reacting with water and, in some cases, with carbon dioxide in the air and water. The terms "hydraulic cement" or "cement" as used in this specification and the appended claims are intended to include cement clinker and crushed, ground, milled, and processed clinker in various stages of pulverization and in various particle sizes.

Examples of typical hydraulic cements known in the art include the broad family of portland cements (including ordinary portland cement without gypsum), MDF cement, DSP cement, Densit-type cements, Pyrament-type cements, calcium aluminate cements (including calcium aluminate cements without set regulators), plasters, silicate cements (including $\beta$-dicalcium silicates, tricalcium silicates, and mixtures thereof), gypsum cements, phosphate cements, high alumina cements, micro fine cements, slag cements, magnesium oxychloride cements, and aggregates coated with microfine cement particles. The term "hydraulic cement" is also intended to include other cements known in the art, such as $\alpha$-dicalcium silicate, which can be made hydraulic under hydrating conditions within the scope of the present invention.

The basic chemical components of, e.g., portland cement include CaO, MgO, $SiO_2$, $Al_2O_3$, $Fe_2O_3$, $SO_3$, in various combinations and proportions. These react together in the presence of water in a series of complex reactions to form insoluble calcium silicate hydrates, carbonates (from $CO_2$ in the air and added water), sulfates, and other salts or products of calcium, magnesium, aluminum, and iron, together with hydrates thereof. These include tricalcium aluminate, dicalcium silicate, tricalcium silicate, and tetracalcium alumina ferrite. The aluminum and iron constituents are thought to be incorporated into elaborate complexes within the aforementioned materials. The cured cement product is a complex matrix of insoluble hydrates and salts which are complexed and linked together much like stone. This material is highly inert and has both physical and chemical properties similar to those of natural stone or dirt.

Gypsum is also a hydraulically settable binder that can be hydrated to form a hardened binding agent. One hydratable form of gypsum is calcium sulfate hemihydrate, commonly known as "gypsum hemihydrate." The hydrated form of gypsum is calcium sulfate dihydrate, commonly known as "gypsum dihydrate." Calcium sulfate hemihydrate can also be mixed with calcium sulfate anhydride, commonly known as "gypsum anhydrite" or simply "anhydrite."

Although gypsum binders or other hydraulically settable binders such as calcium oxide are generally not as strong as hydraulic cement, high strength may not be as important as other characteristics (e.g., the rate of hardening) in some applications. In terms of cost, gypsum and calcium oxide have an advantage over hydraulic cement because they are somewhat less expensive.

In addition, gypsum hemihydrate is known to set up or harden in a much shorter time period than traditional cements. In fact, in use with the present invention, it will harden and attain most of its ultimate strength within about thirty minutes. Hence, gypsum hemihydrate can be used alone or in combination with other hydraulically settable materials within the scope of the present invention. It has been found that adding gypsum hemihydrate to a hydraulically settable mixture containing hydraulic cement as a binder yields a mixture having a much lower water-to-cement ratio and, hence, higher strength according to the Strength Equation.

Terms such as "hydrated" or "cured" hydraulically settable mixture, material, or matrix refers to a level of substantial water-catalyzed reaction which is sufficient to produce a hydraulically settable product having a substantial amount of its potential or final maximum strength. Nevertheless, hydraulically settable materials may continue to hydrate long after they have attained significant hardness and a substantial amount of their final maximum strength.

Terms such as "green" or "green state" are used in conjunction with hydraulically settable mixtures which have not achieved a substantial amount of their final strength, regardless of whether such strength is derived from artificial drying, curing, or other means. Hydraulically settable mixtures are said to be "green" or in a "green state" just prior and subsequent to being molded into the desired shape. The moment when a hydraulically settable mixture is no longer "green" or in a "green state" is not necessarily a clear-cut line of demarcation, since such mixtures generally attain a substantial amount of their total strength only gradually over time. Hydraulically settable mixtures can, of course, show an increase in "green strength" and yet still be "green." For this reason, the discussion herein often refers to the form-stability of the hydraulically settable material in the green state.

As mentioned above, preferred hydraulically settable binders include portland white cement, portland grey cement, micro fine cement, high alumina cement, slag cement, gypsum hemihydrate, and calcium oxide, mainly because of their low cost and suitability for the manufacturing processes of the present invention. This list of cements is by no means exhaustive, nor in any way is it intended to limit the types of binders which would be useful in making the hydraulically settable containers within the scope of the claims appended hereto. It has been found that portland grey cement improves the cohesive nature of the green hydraulically settable mixture better than other types of cements.

Additional types of hydraulic cement compositions include those wherein carbon dioxide is mixed with hydraulic cement and water. Hydraulic cement compositions made by this method are known for their ability to more rapidly achieve high green strength. This type of hydraulic cement composition is discussed in U.S. Pat. No. 5,232,496 issued Aug. 3, 1993 to Hamlin M. Jennings, Ph.D., and Simon K. Hodson, wherein water and hydraulic cement are mixed in the presence of a carbonate source selected from the group consisting of carbon dioxide, carbon monoxide, carbonate salts, and mixtures thereof. For purposes of disclosure, the forgoing patent is incorporated herein by specific reference.

2. Hydraulic Paste.

In each embodiment of the present invention, the hydraulic paste (including cement paste) is the key constituent which eventually gives the extruded object the ability to set up and develop strength properties. The term "hydraulic paste" shall refer to a hydraulically settable binder which has been mixed with water. More specifically, the term "cement paste" shall refer to hydraulic cement which has been mixed with water. The terms "hydraulically settable," "hydraulic," or "cementitious" mixture shall refer to a hydraulic cement paste to which aggregates, fibers, rheology-modifying agents, dispersants, or other materials have been added, whether in the green state or after it has hardened and/or cured. The other ingredients added to the hydraulic paste serve the purpose of altering the properties of the unhardened, as well as the final hardened product, including, but not limited to, tensile strength, compressive strength, shrinkage, flexibility, bulk density, color, porosity, surface finish, and texture.

Although the hydraulically settable binder is understood to be the component which allows the hydraulically settable mixture to set up, to harden, and to achieve much of the strength properties of the material, certain hydraulically settable binders also aid in the development of better early cohesion and green strength. For example, hydraulic cement particles are known to undergo early gelating reactions with water even before it becomes hard; this can contribute to the internal cohesion of the mixture.

It is believed that aluminates, such as those more prevalent in portland grey cement (in the form of tricalcium aluminates and tetracalcium alumina ferrites) are responsible for a colloidal interaction between the cement particles during the earlier stages of hydration. This in turn causes a level of flocculation/gelation to occur between the cement particles. The gelating, colloidal, and flocculating effects of such binders has been shown to increase the moldability (i.e., plasticity) of hydraulically settable mixtures made therefrom.

The percentage of hydraulically settable binder within the overall mixture varies depending on the identity of the other added constituents. However, the hydraulically settable binder is preferably added in an amount ranging from between about 1% to about 90% as a percentage by weight of the wet hydraulically settable mixture, more preferably within the range from between about 8% to about 60%, and most preferably from about 10% to about 45%. From the disclosure and examples set forth herein, it will be understood that this wide range of weight percentages covers the many different types of articles that may be formed by extruding a hydraulically settable mixture.

Despite the foregoing, it will be appreciated that all concentrations and amounts are critically dependent upon the qualities and characteristics that are desired in the final product. For example, in a very thin-walled structure (even as thin as 0.05 mm) where high strength is needed, it may be more economical to have a very high percentage of hydraulically settable binder with little or no aggregate. In such a case, it may be desirable to include a high amount of fiber to impart flexibility and toughness.

The other important constituent of hydraulic paste is water. By definition, water is an essential component of the hydraulically settable materials within the scope of the present invention. The hydration reaction between hydraulically settable binder and water yields reaction products which give the hydraulically settable materials the ability to set up and develop strength properties.

In most applications of the present invention, it is important that the water to hydraulically settable binder ratio be carefully controlled in order to obtain a hydraulically settable mixture which after extrusion is self-supporting in the green state. Nevertheless, the amount of water to be used is dependent upon a variety of factors, including the types and amounts of hydraulically settable binder, aggregates, fibrous materials, rheology-modifying agents, and other materials or additives within the hydraulically settable mixture, as well as the extrusion conditions to be used, the specific article to be extruded, and its properties.

The preferred amount of added water within any given application is primarily dependent upon two key variables: (1) the amount of water which is required to react with and hydrate the binder; and (2) the amount of water required to give the hydraulically settable mixture the necessary rheological properties and workability.

In order for the green hydraulically settable mixture to have adequate workability, water must generally be included in quantities sufficient to wet each of the particular components and also to at least partially fill the interstices or voids between the particles (including, e.g., binder particles, aggregates, and fibrous materials). If water soluble additives are included, enough water must be added to dissolve or otherwise react with the additive. In some cases, such as where a dispersant is added, workability can be increased while using less water.

The amount of water must be carefully balanced so that the hydraulically settable mixture is sufficiently workable, while at the same time recognizing that lowering the water content increases both the green strength and the final strength of the hardened, extruded product. The appropriate rheology to meet these needs can be defined in terms of yield stress. In order for the hydraulically settable mixtures to have adequate green strength and form-stability upon being extruded into the desired article, the hydraulically settable mixture will preferably have a yield stress greater than or equal to about 2 kPa, more preferably greater than or equal to about 10 kPa, and most preferably greater than or equal to about 100 kPa. It should be understood that these figures represent preferred minima. There is no limit to the yield stress which, depending on a number of factors, such as the water deficiency, the morphology of the particles or, the amount of rheology-modifying agent within the mixture, may be much higher. The desired level of yield stress can be (and may necessarily have to be) adjusted depending on the particular shape or article to be extruded.

Because the hydraulically settable mixtures of the present invention exhibit shear thinning, there is no single preferred viscosity, although the mixtures should have a viscosity adequate to make them form-stable but small enough to render them flowable using an extruder. In general, however, the apparent viscosity will usually be about $10^7$ poise or greater at a shear rate of 0 $s^{-1}$, about $10^4$ poise or greater at a shear rate of 20 $s^{-1}$, and about $2\times10^2$ poise or greater at a shear rate of 1000 $s^{-1}$.

One skilled in the art will understand that when more aggregates or other water absorbing additives are included, a higher water to hydraulically settable binder ratio is necessary in order to provide the same level of workability and available water to hydrate the hydraulically settable binder. This is because a greater aggregate concentration provides a greater volume of interparticulate interstices or voids which must be filled by the water as a fraction of the hydraulically settable binder volume. Porous aggregates can also internally absorb significant amounts of water due to their high void content. Based on the foregoing qualifications, typically hydraulically settable mixtures within the scope of the present invention will have a water to hydraulically settable binder ratio within a range from about 0.05 to about 4, preferably about 0.1 to about 1, and most preferably from about 0.15 to about 0.5.

Because of the higher levels of particle packing density of the hydraulically settable binder particles within a typical mixture of the present invention, the specific gravity of the hydraulic paste fraction of the hydraulically settable mixture will preferably (in cases where higher strength is desired) be greater than about 2.2, more preferably greater than about 2.5, and most preferably greater than about 2.6.

It should be understood that the hydraulically settable binder has an internal drying effect on the hydraulically settable mixture because the binder particles chemically react with water and reduce the amount of free water within the interparticulate interstices. This internal drying effect can be enhanced by including faster reacting hydraulically settable binders, such as gypsum hemihydrate, along with slower reacting hydraulic cement.

3. Water Deficiency.

In many cases, the amount of water needed to both hydrate the binder and also impart the desired rheology to the hydraulically settable mixture may be more accurately described in terms of either volume percent or "water deficiency." The level of water deficiency is determined by subtracting the volume of free interstitial water from the total interstitial space, and then dividing the result by the total interstitial space.

water deficiency=$(V_{space}-V_{water})/V_{space}$

By way of example, and in order to better illustrate the concept of water deficiency, the hydraulically settable mixture can contain added water and yet be 100% water deficient (i.e., have no interstitial water) in the case where all of the water has either been absorbed into the pores of the aggregates or reacted with the hydraulically settable binder.

Of course, it should be understood that the amount of water that has actually reacted with the hydraulically settable binder at any given time after the hydraulically settable binder and water have been mixed together will usually be significantly lower than the calculated stoichiometric equivalent of water needed to substantially hydrate the binder. Because of the kinetics of the hydration reaction, the water does not immediately react completely with the hydraulically settable binder, but only over time and generally during the curing stage after the material has been extruded.

Hence, water within the theoretical stoichiometric equivalent amount which does not react with the binder is generally available to fill the interstices or voids between the particles (if not absorbed by the aggregate material). Water that has not chemically reacted with the hydraulically settable binder may be classified as either gel water or capillary water. Both forms tend to decrease the strength of the final cured material and, hence, should be minimized where possible. Because the amount of water available to fill the interstices directly affects the workability and rheology of the hydraulically settable mixture, it will usually be necessary to determine the amount of unbound stoichiometric water available to fill the interstices and lubricate the particles at any given time after mixing, although initially almost all of the added water is free because of the slowness of the hydration reaction.

Some of the factors that will determine what percentage of the calculated stoichiometric equivalent of water will have actually reacted with the hydraulically settable binder, include the reactivity (or rate of reaction) of the binder, the temperature of the mixture, the particle size of the binder, the level of mixing, the wettability of the components within the overall mixture, and the time which has elapsed since the addition of water.

For example, hydraulically settable binders having a high rate of reaction will absorb or react with the available water more quickly than binders having lower rates of reaction. As with most reactions, higher temperatures generally will increase the rate of reaction of all hydraulically settable binders, and hence, the rate of water removal of the binder.

Moreover, hydraulically settable binders with smaller particle sizes will also tend to react with more water because they will have a greater overall surface area that will come in contact and react with the available water. Of course, the tendency of the hydraulically settable binder particles to react with water is dependent upon the level of mixing. More thoroughly blended mixtures will result in greater contact between water and binder particles, and, hence, greater reaction with the water.

The extent of any reaction that has not reached equilibrium is also dependent upon the time which has elapsed since the reactants have been mixed together. Obviously, a hydraulically settable mixture in which the hydraulically settable binder has been in contact with water over a greater period of time will show a greater level of reaction between the water and the binder. Nevertheless, where a dispersant has been added, longer mixing time increases the specific surface area for adsorption of the dispersant, thereby creating a more fluid mixture in the short run. In general, substantial setting of hydraulic cement usually occurs within about 5 hours.

Aside from the dynamics of the reaction between the hydraulically settable binder and water, the other components within the hydraulically settable mixture will also affect to some degree the absorption by or reaction of the water with the binder particles. Certain additives, such as water soluble rheology-modifying agents, will compete with the binder particles and actually absorb some of the available water.

In addition, other additives, such as dispersants, can impede the reaction between water and hydraulically settable binder particles. Whether a given component or reaction condition will increase or decrease the reaction between the water and the hydraulically settable binder particles must be carefully determined while designing any particular mix design. However, one skilled in the art will be able to predict the effect of a given component or reaction condition on the tendency of the water to react with the hydraulically settable binder, at least on the basis of empirical observation.

Once it has been determined how much water will actually react with the cement, the next step is to determine how much "interstitial water" should be added in addition to this reacted or absorbed amount. Interstitial water is the water which is available to fill the voids or interstices and which will directly affect the workability of the hydraulically settable mixture. The preferred amount of interstitial water that will be required is determined by a combination of factors, including the particle packing density of the mixture, the compressibility of the mixture, and the pressure exerted on the mixture by the extruder.

Knowing the particle packing density allows one to determine the volume of interstitial space within the uncompressed mixture which will initially be filled by interstitial water. Knowing the compressibility of the mixture and the pressure that will be exerted allows one to determine the expected reduction of interstitial space when the hydraulically settable mixture is subjected to a given pressure during the extrusion process.

Where the particle packing density is lower, there will be more interstitial space as a percentage of the overall volume of the mixture, and more water will be required to fill this space. Conversely, where the particle packing density is greater, there will be less interstitial space as a percentage of the overall volume of the mixture, and less water will be required to fill this space. How to optimize the packing density will be discussed hereinafter.

Similarly, where the hydraulically settable mixture will be subjected to a greater amount of pressure during the extrusion process, the compression step will more dramatically reduce the volume of interstitial space, which in turn means that less interstitial water will be required initially in order to achieve the desired rheology. Also, including less water (higher deficiency) allows the particles to be brought into more intimate contact during the compression process, resulting in a final cured product having less porosity, higher density, and greater strength.

Conversely, where the hydraulically settable mixture will be subjected to a lesser amount of pressure during the extrusion process, the compression step will less dramatically reduce the volume of interstitial space, which in turn means that more interstitial water will be required initially in order to achieve the desired rheology. Certain aggregates, such as sand, have relatively low compressibility. (How much pressure that may be exerted on the hydraulically settable mixture without destroying the integrity of the aggregate particles therein depends on the compressive strength of the aggregate particles.)

The key is to add just enough water in order to substantially occupy the interstitial space when the mixture is compressed during the extrusion process. Adding more water than what is required to fill the interstices during the compression of the extruded mixture would reduce both the green strength of the extruded product as well as the final strength of the cured material (according to the Strength Equation).

In light of the foregoing, it has been found that adequate workability of a hydraulically settable mixture that will be subjected to increased pressure can be obtained when a deficiency of water is included. The amount of water may be expressed in terms of volume percent, and, if deficient, will be less than the volume of the interstitial space, which is determined by subtracting the natural packing density from 1. For example, if the natural packing density is 65%, the mixture will be deficient in water if the water is included in an amount of less than about 35% by volume of the mixture. The amount of water that is required to create adequate workability will depend somewhat on the relative quantities of the mixture components, such as the hydraulically settable binder particles, aggregates, and fibers. Nevertheless, it is generally not the identity or relative quantities of the components but the overall volume and packing density of the components that will determine how much water should be added to achieve a hydraulically settable mixture having the desired rheological and plastic-like properties.

The amount of added water may, therefore, be expressed in terms of "water deficiency" before the mixture is compressed during the extrusion process. In mixtures relying upon the principles of particle packing and water deficiency in order to attain the desired rheology, the level of water deficiency will be within the broad range from between about 1% to about 90%. Because the preferred level of water deficiency is highly dependent upon many other variables, such as the components of the hydraulically settable mixture, the rheology of the mixture, and the level of particle packing efficiency, as well as the desired properties of the extruded product, there is no more narrow preferred range of water deficiency. Where a high level of rheology-modifying agent is employed, it may be possible to extrude a mixture having excess water (or "negative" water deficiency).

Nevertheless, for any given mixture it will usually be preferable to include the minimum quantity of water necessary to allow it to flow under the desired extrusion pressure and have enough internal cohesion to hold together once an article has been extruded from the mixture. The minimum amount of water necessary for the hydraulically settable mixture to flow may further be reduced by the addition of admixtures, such as plasticizers or dispersants, as set forth more fully herein. Where very low levels of water are employed, it may be necessary in some cases to pelletize the hydraulically settable mixture in order to increase the extrudability of the mixture.

Nevertheless, as a general rule, a mixture having a greater water deficiency will generally be stiffer and have lower workability initially. Conversely, a mixture having a lower water deficiency will generally have lower viscosity and greater workability initially. The level of stiffness, viscosity, or workability that will be desired for any given mixture will depend upon the extrusion process of a given situation. Of course, during the extrusion process when the hydraulically settable mixture is compressed, the level of water deficiency will decrease, often dramatically. In some cases it may approach or even exceed 0%. (A negative water deficiency means that them is a surplus or excess of water; that is, the volume of water exceeds the volume of interstitial voids between the solid particles after they have been compacted during the extrusion process.)

Nevertheless, hydraulically settable mixtures having a higher particle packing density will generally be able to contain a greater deficiency of water and yet be highly extrudable under pressure, as compared to mixtures which have a lower particle packing density. For example, while the particle packing density of a hydraulically settable mixture having a natural packing density of 50% might increase to 65%, one with a packing density of 80% might increase to 95%. The drop in interstitial space in the former case (50% to 35%) is slight compared to in the latter (20% to 5%), which is a four-fold decrease. Hence, the mixture with the higher particle packing density will experience a much more dramatic drop in the apparent water deficiency.

In some cases, it may also be preferable to add "excess water" or more water than is needed to fill the interstitial space in order to decrease the viscosity and increase the workability of the mixture. However, in order to obtain immediate green strength, it may be necessary in those cases to heat the surface of the extruded article using a heated die in order to remove some or all of the "excess water." In addition, gypsum hemihydrate may be added to react with some or all of the excess water and thereby increase the form stability of the extruded article.

In the case where more water or dispersant is added initially in order to give the hydraulically settable mixture greater workability, increased form-stability of the extruded object or shape can be obtained by, for example, immediately passing the object through a heating tunnel or vacuum chamber. This causes part of the water to be driven off in the form of vapor or steam from the article surface, which reduces the volume of interstitial water, increases the friction between the particles, and results in a quick increase in form-stability. However, overheating the extruded article, or drying it out too quickly, may harm the microstructure of the article, thereby reducing the strength of the article.

E. Rheology-modifying Agents.

The inclusion of a rheology-modifying agent acts to increase the plastic or cohesive nature of the hydraulically settable mixture so that it behaves more like a moldable or extrudable clay. The rheology-modifying agent tends to thicken the hydraulically settable mixture by increasing the yield stress of the mixture without greatly increasing the viscosity of the mixture. Raising the yield stress in relation to the viscosity makes the material more plastic-like (or clay-like) and moldable, while greatly increasing the subsequent form-stability or green strength.

A variety of natural and synthetic organic rheology-modifying agents may be used which have a wide range of properties, including high or low viscosity, yield stress, and solubility in water. Although many of the rheology-modifying agents contemplated by the present invention might be very soluble in water, the insoluble reaction products of hydraulic cement and water encapsulate the rheology-modifying agent and prevent it from dissolving out of an extruded hydraulically settable article that is exposed to water.

The various rheology-modifying agents contemplated by the present invention can be roughly organized into the following categories: (1) polysaccharides and derivatives thereof, (2) proteins and derivatives thereof, and (3) synthetic organic materials. Polysaccharide rheology-modifying agents can be further subdivided into (a) cellulose-based materials and derivatives thereof, (b) starch-based materials and derivatives thereof, and (c) other polysaccharides.

Suitable cellulose-based rheology-modifying agents include, for example, methylhydroxyethylcellulose, hydroxymethylethylcellulose, carboxymethylcellulose, methylcellulose, ethylcellulose, hydroxyethylcellulose, hydroxyethylpropylcellulose, hydroxypropylmethylcellulose, etc. The entire range of possible permutations is enormous and cannot be listed here, but other cellulose materials which have the same or similar properties as these would also work well.

Suitable starch-based materials include, for example, amylopectin, amylose, seagel, starch acetates, starch hydroxyethyl ethers, ionic starches, long-chain alkyl-starches, dextrins, amine starches, phosphate starches, and dialdehyde starches.

Other natural polysaccharide based rheology-modifying agents include, for example, alginic acid, phycocolloids, agar, gum arabic, guar gum, locust bean gum, gum karaya, and gum tragacanth.

Suitable protein-based rheology-modifying agents include, for example, Zein® (a prolamine derived from corn), collagen derivatives extracted from animal connective tissue such as gelatin and glue, and casein (the principal protein in cow's milk).

Finally, suitable synthetic organic plasticizers include, for example, polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polyacrylimides, ethylene oxide polymers, polylactic acid, synthetic clay, and latex, which may be a styrene-butadiene copolymer. The rheology of polylactic acid is significantly modified by heat and could be used alone or in combination with any other of the foregoing rheology-modifying agents.

A currently preferred rheology-modifying agent is methylhydroxyethylcellulose, examples of which are Tylose® FL 15002 and Tylose® 4000, both of which are available from Hoechst Aktiengesellschaft of Frankfurt, Germany. Lower molecular weight rheology-modifying agents such as Tylose® 4000 generally act to plasticize or lubricate the mixture rather than thicken it, which aids in flowability during the extrusion procedure. Another useful rheology-modifying agent is hydroxypropylmethylcellulose, which is sold under the tradename of Methocel®.

More particularly, lower molecular weight rheology-modifying agents improve the extrusion process by lubricating the particles. This reduces the friction between the particles as well as between the mixture and the adjacent extruder surfaces. Although a methylhydroxyethylcellulose rheology-modifying agent is preferred, almost any non-toxic rheology-modifying agent (including any listed above) which imparts the desired properties would be appropriate.

Another preferred rheology-modifying agent that can be used instead of, or in conjunction with, Tylose® or Methocel® is polyethylene glycol having a molecular weight of between 20,000 and 35,000. Polyethylene glycol works more as a lubricant and adds a smoother consistency to the mixture. For this reason, polyethylene glycol might be referred more precisely as a "plasticizer." In addition, it gives the extruded hydraulically settable material a smoother surface. Stearates can also be added to lubricate the hydraulically settable mixture.

Finally, starch-based rheology-modifying agents are of particular interest within the scope of the present invention because of their comparatively low cost compared to cellulose-based rheology-modifying agents such as Tylose® or Methocel®. Although starches typically require heat and/or pressure in order to gelate, starches may by modified and prereacted so that they can gel at room temperature. The fact that starches, as well as many of the other rheology-modifying agents listed above, have a variety of solubilities, viscosities, and rheologies allows for the careful tailoring of the desired properties of a mix design so that it will conform to the particular manufacturing and performance criteria of the desired extruded article.

The rheology-modifying agents within the hydraulically settable materials of the present invention are preferably included in a range from about 0.1% to about 5% by weight of the hydraulically settable mixture exclusive of water, more preferably in a range from about 0.25% to about 2%, and most preferably in a range from about 0.5% to about 1%. The actual amount to be used will depend upon the nature of the extruded article or product.

F. Aggregates.

Aggregates common in the concrete industry may be used in the hydraulically settable mixtures of the present invention. In the case where relatively thin-walled articles will be extruded, and in order for the mixtures to remain extrudable through the reduced cross-section dies, the diameter of the aggregates used will most often be less than about 25% of the smallest cross-section of the structural matrix of the extruded article.

Aggregates may be added to increase the compressive strength, decrease the cost by acting as a filler, and affect the particle packing density of the resultant hydraulically settable materials. Aggregates are also useful for creating a smooth surface finish, particularly plate-like aggregates. The tensile and compressive strengths of the aggregate will often affect the tensile and compressive strengths of the final hardened product.

Examples of useful aggregates include sand, dolomite, gravel, rock, bauxite, basalt, granite, limestone, sandstone, glass beads, aerogels, xerogels, seagel, mica, clay, synthetic clay, alumina, silica, fly ash, silica fume, tabular alumina, kaolin, glass microspheres, ceramic spheres, gypsum dihydrate, calcium carbonate, calcium aluminate, xonotlite (a crystalline calcium silicate gel), unreacted cement particles, and other geologic materials. Both hydrated and unhydrated cement particles may also be considered to be "aggregates" in the broadest sense of the term, depending on their distribution and the nature of their incorporation within the hydraulically settable matrix. Even discarded hydraulically settable materials, such as discarded sheets, containers, boards, or other objects of the present invention can be employed as aggregate fillers and strengtheners. Silica fume and fly ash also can be added to reduce the porosity of the hydraulically settable mixture and increase its workability and cohesiveness.

The amount of the aggregate will vary depending upon the particular application or purpose, and can vary greatly from no added aggregate up to about 90% by weight of the green hydraulically settable mixture, more preferably within the range from between about 3% to about 70% by weight, and most preferably from between about 20% to about 50% by weight.

Both clay and gypsum are particularly important aggregate materials because of their ready availability, extreme low cost, workability, and ease of formation. Gypsum hemihydrate can also provide a degree of binding and strength if added in high enough amounts. Clay is a general term used to identify all earths that form a paste with water and harden when dried. The predominant clays include silica and alumina (used for making pottery, tiles, brick, and pipes) and kaolinite. The two kaolinitic clays are anauxite, which has the chemical formula $Al_2O_3 \cdot 3SiO_2 \cdot 2H_2O$, and montmorillonite, which has the chemical formula $Al_2O_2 \cdot 4SiO_2 \cdot H_2O$. However, clays may contain a wide variety of other substances such as iron oxide, titanium oxide, calcium oxide, zirconium oxide, and pyrite.

In addition, although clays have been used for millennia and can obtain hardness even without being fired, such unfired clays are vulnerable to water degradation and exposure, are extremely brittle, and have low strength. Nevertheless, clay makes a good, inexpensive aggregate within the hydraulically settable structural matrix.

Similarly, gypsum hemihydrate is also hydratable and forms the dihydrate of calcium sulfate in the presence of water. Thus, gypsum may exhibit the characteristics of both an aggregate and a binder depending on whether (and in what proportion) the hemihydrate or dihydrate form is added to the hydraulically settable mixture.

It is often preferable, according to the present invention, to include a plurality of differently sized and graded aggregates capable of more completely filling the interstices between the aggregate and hydraulically settable binder particles. Optimizing the particle packing density reduces the amount of water necessary to obtain adequate workability by eliminating spaces which would otherwise be filled with interstitial water, often referred to as "capillary water." In addition, using less water increases the strength of the final hardened product (according to the Strength Equation).

In order to optimize the packing density, differently sized aggregates with particle sizes ranging from as small as about 0.01 microns to as large as about 4 mm may be used. (Of course, the desired purpose and thickness of the resulting product will dictate the appropriate particle sizes of the various aggregates to be used.)

In certain preferred embodiments of the present invention, it may be desirable to maximize the amount of the aggregates within the hydraulically settable mixture in order to maximize the properties and characteristics of the aggregates (such as qualities of strength, low density, or high insulation). The use of particle packing techniques may be employed within the hydraulically settable material in order to maximize the amount of the aggregates.

A detailed discussion of particle packing can be found in the following article coauthored by one of the inventors of the present invention: Johansen, V. & Andersen, P. J., "Particle Packing and Concrete Properties," *Materials Science of Concrete II* at 111–147, The American Ceramic Society (1991). Further information is available in the Doctoral Dissertation of Andersen, P. J., "Control and Monitoring of Concrete Production—A Study of Particle Packing and Rheology," The Danish Academy of Technical Sciences. For purposes of teaching particle packing techniques, the disclosures of the foregoing article and thesis are incorporated herein by specific reference.

A detailed description of how to select a mixture of aggregates and aggregate particle sizes to accommodate a given mix design criteria can be found within co-pending U.S. patent application Ser. No. 08/109,100, filed Aug. 18, 1993, in the names of Per Just Andersen, Ph.D. and Simon K. Hodson for "Design Optimized Compositions And Processes For Microstructurally Engineering Cementitious Mixtures." For purposes of disclosure, this reference is incorporated herein by specific reference.

G. Fibers.

As used in the specifications and appended claims, the terms "fibers", "discontinuous fibers", and "fibrous materials" include both inorganic fibers and organic fibers. Fibers are a particular kind of aggregate which may be added to the hydraulically settable mixture to increase the cohesion, elongation ability, deflection ability, toughness, fracture energy, and flexural, tensile, and even compressive strengths. Fibrous materials reduce the likelihood that the extruded hydraulically settable object will shatter when a strong cross-sectional force is applied.

Fibers which may be incorporated into the structural matrix are preferably naturally occurring fibers, such as cellulosic fibers extracted from hemp, cotton, sisal, plant leaves, wood or stems, or fibers made from glass, polyvinyl alcohol, synthetic fibers (e.g., Kevlar (polyaramide) and polypropylene fibers), silica, ceramic, or metal. Glass fibers are preferably pretreated to be alkali resistant.

Preferred fibers include glass fibers, synthetic fibers, abaca, bagasse, wood fibers (both hardwood or softwood, such as southern hardwood or southern pine), ceramic fibers (such as alumina, silica nitride, silica carbide, and graphite), and cotton. Recycled paper fibers can be used, but they are somewhat less desirable because of the fiber degradation that occurs during the original paper manufacturing process, as well as in the recycling process. Any equivalent fiber, however, which imparts strength and flexibility is also within the scope of the present invention. Abaca fibers are available from Isarog Inc. in the Philippines. Glass fibers, such as Cemfill®, are available from Pilkington Corp. in England.

The fibers used to make the hydraulically settable materials of the present invention preferably have a high length to width ratio (or "aspect ratio") because longer, narrower fibers can impart more strength to the matrix without significantly adding bulk and mass to the mixture. The fibers should have an aspect ratio of at least about 10:1, preferably at least about 100:1, and most preferably at least about 200:1. However, although the toughness and tensile strength of the final product are increased as the aspect ratio of the fibers is increased, fibers with lower aspect ratios are cheaper, provide better particle packing, and are easier to disperse within the hydraulically settable mixture.

The amount of fibers added to the hydraulically settable matrix will vary depending upon the desired properties of the final product, with strength, toughness, flexibility, and cost being the principal criteria for determining the amount of fiber to be added in any mix design. In most cases, fibers will be added in an amount within a range from about 0.5% to about 30% by volume of the green hydraulically settable mixture, more preferably within the range from about 1% to about 20% by volume, and most preferably within the range from about 2% to about 10% by volume. The extrusion process tends to longitudinally orient the fibers and results in a tougher product.

It will be appreciated, however, that the strength of the fiber is a very important feature in determining the amount of the fiber to be used. The stronger the tensile strength of the fiber, the less the amount that must be used to obtain the same level of tensile strength in the resulting product. Of course, while some fibers have a high tensile strength, other types of fibers with a lower tensile strength may be more elastic. Hence, a combination of two or more fibers may be desirable in order to obtain a resulting product that maximizes multiple characteristics, such as high tensile strength and high elasticity.

In addition, while ceramic fibers are generally far more expensive than naturally occurring or glass fibers, their use will nevertheless be economical in some cases due to their far superior tensile strength properties. Obviously the use of more expensive fibers becomes more economical as the cost restraints of the extruded object are relaxed, such as where a comparable object made from a competing material is relatively expensive.

It should also be understood that some fibers, such as southern pine and abaca, have high tear and burst strengths, while others, such as cotton, have lower strength but greater flexibility. In the case where both flexibility and high tear and burst strength is desired, a mixture of fibers having the various properties can be added to the mixture.

The strength properties of the fiber impregnated hydraulically settable matrix are substantially different depending on whether the fibers are "mechanically anchored" or "chemically anchored" within the matrix. The term "mechanically anchored" refers to a primarily mechanical interaction between the fibers and the other components of the hydraulically settable matrix such that the bond or interface between the fiber and the hydraulically settable matrix is generally weaker than the strength of the fibers. As a result, when a strain is applied to the extruded article, there will generally be a "pull-out" of the fibers from their spacial position within the hydraulically settable matrix rather than a rupture of the fibers. This pull-out effect, and the attendant frictional energy transferred during slippage, increases the toughness and fracture energy of the extruded article in part because of the bridging by the fibers of any cracks caused by the strain on the extruded article, and also because the randomly oriented fibers dispersed within the hydraulically settable matrix create a much longer path of crack propagation throughout the matrix. However, because of the pull-out effect of mechanically anchored fibers, they would not be expected to substantially increase the tensile and flexural strength of the extruded article. As set forth more fully below, the tensile and flexural strengths of the extruded articles of the present invention are more dramatically increased by the filaments placed within the extruded article.

In contrast to mechanically anchored fibers, the term "chemically anchored" refers to a primarily chemical interaction between the fibers and the other components of the hydraulically settable matrix such that the bond or interface between the fiber and the hydraulically settable matrix is generally stronger than the strength of the fibers. As a result, when a strain is applied to the extruded article, there will not be a "pull-out" effect of the fibers but rather the fibers will remain securely anchored within the hydraulically settable matrix until the stress on the article causes the article to fail. At the moment that the extruded article fails, the chemically anchored fibers will rupture. The result is that chemically anchored fibers are able to significantly increase the tensile strength (i.e., the peak load before failure) and flexural strength of the extruded article. However, chemically anchored fibers do not increase the toughness of the extruded article, which will generally experience a catastrophic failure at the peak load.

Increasing the chemical similarity of the fibers compared to the hydraulically settable binder increases the tendency of the fiber to be chemically anchored within the hydraulically settable matrix. This may be achieved, for example, by coating a variety of fibers with precipitated silica or ettringite. Also, both glass and alumina fibers will tend to be more chemically anchored compared to, for example, Kevlar or polypropylene fibers. In many cases it may be desirable to obtain the beneficial effect of both chemical and mechanical anchoring of the fibers by adding a mixture of different fibers.

H. Filaments.

The terms "filaments", "continuous filaments" or "continuous fibers" as used in this specification and the appended claims are intended to include individual continuous fibers or continuous assemblages of either discontinuous or continuous fibers introduced into the hydraulically settable mixture during the extrusion process. Filaments are to be distinguished from discontinuous or chopped fibers, which are mixed into the hydraulically settable mixture and which generally have a random orientation (although there may be some alignment of the fibers as a result of the extrusion process).

Placement of continuous filaments into the hydraulically settable matrix anchors the filaments over a substantially longer distance than discontinuous fibers imparts substantially different properties to the final hardened article than short fibers. Filaments within the hydraulically settable structural matrix substantially increases the tensile, flexural, and hoop or circumferential strengths of the hardened hydraulically settable article, depending on the orientation of the filaments. Filaments placed within a hydraulically settable structural matrix also tend to increase the toughness and elongation ability of the hydraulically settable article. Preferred filaments will have sufficient tensile and shear strengths to independently contribute to the strength of the article.

The "pull-out" effect of filaments tends to be minimal as filaments are anchored within substantial lengths of an article, which makes it difficult for the filaments to be dislodged. As a result of the minimal "pull-out" effect, the difference between filaments which are mechanically anchored and filaments which are chemically anchored is less significant than for discontinuous fibers.

Any type of filaments, including inorganic fibers and organic fibers, can be positioned within a hydraulically settable mixture and can have a width or thickness corresponding to the desired strength, length, thickness, or other properties of the extruded article. The filaments can be placed in the hydraulically settable matrix as an individual filament or as a continuous assemblage of continuous or discontinuous fibers. Any assemblage of filaments can be utilized including the conventional assemblages such as a "strand" which is an assemblage of untwisted filaments, a "yarn" which is an assemblage of twisted filaments, a "roving" which is a collection of bundles of filaments either as untwisted strands or as twisted yarns, a "tow" which is an untwisted bundle of strands or a "mat" which is a sheet of filaments.

The number or volume of filaments placed into the hydraulically settable matrix will vary depending upon the desired properties of the final product, with strength, toughness, flexibility, and cost being the principal criteria for determining the amount of filament to be added in any product design. Typically, the volume of filament in an article will be in a range between about 0.5% to about 30% of the volume of the hydraulically settable structural matrix. The volume of filament is more preferably within the range from about 1% to about 20%. The volume of filament is most preferably within the range from about 2% to about 10%.

It will be appreciated, however, that the strength of the filament is a very important feature in determining the amount of the filament to be used. The stronger the tensile strength of the filament, the less the amount that must be used to obtain the same level of tensile strength in the resulting product. Of course, while some filaments have a high tensile strength, other types of filaments with a lower tensile strength may be more elastic. Hence, a combination of two or more filaments may be desirable in order to obtain a resulting product that maximizes multiple characteristics, such as high tensile strength and high elasticity.

Additionally, the volume of filament needed to obtain the desired properties is affected by the manner in which the filament is placed within the hydraulically settable structural matrix during extrusion. The filaments can be placed within the hydraulically settable structural matrix to have several different configurations and can be placed at varying depths from the surface of the article. To obtain an anisotropic article having strength in the extrusion direction, the filaments can be placed parallel to each other extending within the article along the same axis as the extrusion direction. The volume of fiber needed can also be reduced by placing the filament in a criss-cross pattern as the article is being extruded by helically winding filament in opposite directions. Additionally, the filaments can be placed in both a parallel configuration and a helical configuration in order to obtain the beneficial effects of both.

Common types of continuous fibers used with the present invention include fiberglass, polyaramid fibers, graphite fibers, carbon fibers, polyethylene fibers and other organic fibers. Fiberglass is often used because of its low cost, dimensional stability, good impact properties, moderate strength and modulus, and ease of handling. Polyaramid fibers, commonly referred to as Kevlar®, have a very high specific strength or modulus but have relatively poor shear and compression properties. Polyaramid fibers are often used in pressure vessels, as they avoid shear and compressive stresses. The largest variety of available strengths and moduli can be obtained with graphite fibers which, for a price, can be designed to meet most parameters. The above filaments can be purchased from companies such as Hercules Aerospace Co. of Magna, Utah; 3-M of St. Paul, Minn.; Owens-Corning Fiberglass of Toledo, Ohio; Pittsburg Plate Glass, Manville Co.; Vetrotex St. Gobain; DuPont; Allied Fibers, and Amoco.

Alternatively, filaments can be made from natural organic fibers such as cotton, hemp, and jute. Although such fibers have a relatively low tensile strength, they are far less expensive than fiberglass, polyaramid, or graphite fibers. Natural organic fibers may thus be more economical in articles that will be subjected to lower stresses.

I. Dispersants.

The term "dispersant" is used hereinafter to refer to the class of materials which can be added to reduce the amount of water that must be added in order to maintain the same flow properties. Dispersants generally work by reducing the viscosity and yield stress of the hydraulically settable mixture. A more detailed description of the use of dispersants may be found in the Master's Thesis of Andersen, P. J., "Effects of Organic Superplasticizing Admixtures and Their Components on Zeta Potential and Related Properties of Cement Materials" (1987). For purposes of disclosure, the above-referenced article is incorporated herein by specific reference.

Dispersants generally work by being adsorbed onto the surface of the hydraulically settable binder particles and/or into the near colloid double layer of the binder particles. This creates a negative charge around the surfaces of particles, causing them to repel each other. This repulsion of the particles adds "lubrication" by reducing the "friction" or attractive forces that would otherwise cause the particles to have greater interaction. Because of this, less water can be added initially while maintaining the workability of the hydraulically settable mixture.

Greatly reducing the viscosity and yield stress may be desirable where clay-like properties, cohesiveness, and/or form-stability are less important or where it is desired to use less water initially. Adding a dispersant aids in keeping the hydraulically settable mixture workable even when very little water is added, particularly where there is a "deficiency" of water. Hence, adding a dispersant allows for an even greater deficiency of water, although the extruded article may have somewhat less form-stability if too much dispersant is used. Nevertheless, including less water initially will theoretically yield a stronger final cured article, according to the Strength Equation.

Whether or not there is a deficiency of water is both a function of the stoichiometric amount of water required to hydrate the binder and the amount of water needed to occupy the interstices between the particles in the hydraulically settable mixture, including the hydraulically settable binder particles themselves and the particles within the aggregate material and/or fibrous material. As stated above, improved particle packing reduces the volume of the interstices between the hydraulically settable binder and aggregate particles and, hence, the amount of water necessary to fully hydrate the binder and maintain the workability of the hydraulically settable mixture by filling the interstitial space.

However, due to the nature of the coating mechanism of the dispersant, the order in which the dispersant is added to the mixture is often critical. If a flocculating/gelating agent such as Tylose® or starch is added, the dispersant must be added first and the flocculating agent second. Otherwise, it will be more difficult for the dispersant to become adsorbed on the surface of the hydraulically settable binder particles, as the Tylose® or starch may become irreversibly adsorbed onto the surface of the particles, thereby bridging them together rather than causing them to repel each other.

A preferred dispersant is sulfonated naphthalene-formaldehyde condensate, an example of which is WRDA 19, which is available from W. R. Grace, Inc., located in Baltimore. Other dispersants which would work well include sulfonated melamineformaldehyde condensate, lignosulfonate, and acrylic acid. The sodium salt of sulfonated naphthalene-formaldehyde condensate can be added after the hydraulic cement and water have had sufficient time to form early hydration products (such as ettringite) in order to increase the specific surface area of the cement particles, which allows for greater dispersion of the particles.

Another way to improve the flowability of the hydraulically settable mixture under lower pressure is by adding other reactive products having a high specific surface area, such as silica fume. This also increases the yield stress and, hence, the form-stability of the extruded article.

The amount of added dispersant will generally range up to about 5% by weight of the hydraulically settable binder, more preferably within the range of between about 0.25% to about 4%, and most preferably within the range of between about 0.5% to about 2%. However, it is important not to include too much dispersant, as it tends to retard the hydration reactions between, e.g., hydraulic cement and water. Adding too much dispersant can, in fact, prevent hydration, thereby destroying the binding ability of the hydraulic paste altogether.

The dispersants contemplated within the present invention have sometimes been referred to in the concrete industry as "superplasticizers," "water reducers," or "high range water reducers." In order to better distinguish dispersants from rheology-modifying agents, which often act as plasticizers, the term "superplasticizer" will not be used in this specification.

J. Set Accelerators.

In some cases, it may be desirable to accelerate the initial set of the hydraulically settable mixture and obtain earlier form stability of the extruded article by adding to the mixture an appropriate set accelerator. These include $Na_2CO_3$, $KCO_3$, KOH, NaOH, $CaCl_2$, $CO_2$, triethanolamine, aluminates, and the inorganic alkali salts of strong acids, such as HCl, $HNO_3$, and $H_2SO_4$. In fact, any compound which increases the solubility of gypsum and $Ca(OH)_2$ will tend to accelerate the initial set of hydraulically settable mixtures, particularly cementitious mixtures.

The amount of set accelerator which may be added to a particular hydraulically settable mixture will depend upon the degree of set acceleration that is desired. This in turn will depend on a variety of factors, including the mix design, the time interval between the steps of mixing the components and molding or extruding the hydraulically settable mixture, the temperature of the mixture, and the identity of the set accelerator. One of ordinary skill in the art will be able to adjust the amount of added set accelerator according to the parameters of a particular manufacturing process in order to optimize the setting time of the hydraulically settable mixture.

K. Coatings.

It is within the scope of the present invention to coat the extruded hydraulically settable objects with scaling materials, paints, and other protective coatings. Appropriate coatings include calcium carbonate, melamine, polyvinyl chloride, polyvinyl alcohol, polyvinyl acetate, polyacrylate, hydroxypropylmethylcellulose, polyethylene glycol, acrylics, polyurethane, polyethylene, synthetic polymers, polylactic acid, Biopol® (a polyhydroxybutyrate-hydroxyvalerate copolymer), waxes (such as beeswax or petroleum-based wax), elastomers, kaolin clay, polyacrylates, and synthetic polymers, including biodegradable polymers. Biopol® is manufactured by ICI in the United Kingdom.

For example, a coating comprised of sodium silicate, which is water soluble (pH=7) but acid resistant, is a particularly useful coating. Resistance to acidity is important, for example, where an extruded pipe will be used to transport, e.g., aqueous acids. Where it is desirable to protect the extruded article from basic substances, the article may be coated with an appropriate polymer or wax, such as are used to coat paper or paperboard products. If the extruded articles are intended to come into contact with foodstuffs the coating material will preferably comprise an FDA-approved coating.

The coatings may be applied to the extruded articles using any coating means known in the art. Coatings may be applied by spraying the extruded object with any of the above-referenced coating materials, or it may be advantageous to apply the coating by dipping the article into a vat containing an appropriate coating material. In the case where a coating material is sprayed onto the surface of a generally flat or regularly curved object, the coating material may be spread or smoothed by means of a straight or curved doctor blade which is held a particular distance above the object, or which rides directly on the surface. In addition, coatings may be coextruded along with the extruded object in order to integrate the coating process with the extrusion process.

II. EXTRUDING HYDRAULICALLY SETTABLE MIXTURES.

The basic structural component of the extruded articles of the present invention is the hydraulically settable matrix, which is formed from the reaction products of a hydraulically settable binder and water. Within the basic structural matrix are incorporated other components which add additional characteristics and properties, such as fibers, aggregates, rheology-modifying agents, dispersants, and set accelerators. Using a microstructural engineering and materials science approach makes possible the ability to include these various ingredients in a variety of amounts and proportions in order to build into the mixture the desired properties of form-stability and ultimate strength, toughness, and other performance criteria of the final hardened product.

The basic steps involved in the extrusion of hydraulically settable mixtures are as follows: (1) choosing the desired qualities and attributes of the article to be extruded from a hydraulically settable mixture, including size and strength properties; (2) selecting the desired parameters of an appropriate extrusion process, including the type of extruder, the die orifice shape, and the extrusion pressure, speed, and temperature; (3) determining the optimum composition and rheology, or range of rheologies, of an appropriate hydraulically settable mixture tailored to the desired qualities and attributes of the article and the desired parameters of the extrusion process; (4) preparing a suitable hydraulically settable mixture having the appropriate composition and rheology; (5) extruding the hydraulically settable mixture into the desired articles, or precursors to articles that can be further shaped into the desired articles; and (6) allowing the extruded article, or later shaped article, to harden into the final cured article. Optionally, the curing process may be accelerated by, for example, autoclaving or by placing a partially hardened article into a high humidity environment.

A. Designing the Desired Qualities of the Article.

Using the compositions and methods set forth herein, a wide variety of articles may be mass produced in high volume by extruding a hydraulically settable mixture into the desired shape of the article, or into a precursor shape that may be further shaped into the desired article. The articles formed by using the extrusion methods of the present invention are characterized as having high compressive, tensile, and flexural strength, as well as high particle packing density of the solid aggregate and hydraulically settable binder particles. This results in a more dense and less porous hydraulically settable material than has been heretofore possible. This, in turn, results in an article having low penetrability and low diffusion of moisture. These characteristics are possible using a microstructural engineering approach in order to design into the material beforehand the desired properties and performance criteria.

The high particle packing density of the extruded articles results from (1) the selection of aggregate particles having a predetermined distribution of sizes and shapes in order to optimize the natural particle packing density, and (2) the extrusion of the hydraulically settable material under generally high pressures, which force the particles into an even higher packing density than the natural packing, particularly where there is an initial deficiency of water.

The high particle packing density and low water to hydraulically settable binder ratio that results from having an initial deficiency of water yield extruded articles having very low porosity and, hence, high strength according to the Strength Equation. The use of dispersants allows for the inclusion of even less water initially in order to create a more water deficient hydraulically settable mixture which will, nevertheless, be capable of being extruded under pressure.

The type of aggregate that will be used will depend largely on the desired strength and density criteria of the final cured article, as well as cost. Aggregates such as crushed sand, crushed granite, crushed basalt, silica, gypsum, and clay are extremely inexpensive and can greatly reduce the cost of manufacturing an extruded article therefrom. Such aggregates are also characterized as having high density and high compressive strength.

The inclusion of a hydraulically settable binder such as portland grey or portland white cement will yield a final cured product that is generally waterproof and which will resist penetration by water and other liquids. Nevertheless, other hydraulically settable binders, such as gypsum hemihydrate, are less water resistant and will yield a final cured article having lower resistance to water. In the event that a more water resistant article is desired, it may be advantageous to apply an appropriate coating onto the surface of the extruded article.

The inclusion of fibers and filaments and other high strength fillers can greatly increase the tensile, flexural or hoop strengths of the final cured articles. The tensile strength may be stronger along one or more vectors or be evenly distributed depending on whether the fibers are aligned or randomly dispersed throughout the hydraulically settable matrix and whether the filaments are parallel or helical within the structural matrix. The extrusion process itself will tend to orient the fibers in the direction of extrusion.

Different fibers and filaments have greatly varying degrees of tear and burst strength, flexibility, tensile strength, ability to elongate without breaking, and stiffness. The type of fiber that will be incorporated into the hydraulically settable material will depend on the desired properties of the article. In order to obtain the advantageous properties of different types of fibers it may be preferable in some cases to combine two or more different kinds of fibers within the hydraulically settable material.

In light of the foregoing, the cured extruded articles will preferably have a tensile strength greater than about 15 MPa. In many cases, depending on the mix design, water content, and extrusion pressure, it will be possible to obtain extruded articles having tensile strengths of about 30 MPa or greater and, in some cases, of about 50 MPa or greater. Because of the ability to remove a large percentage of the interstitial voids which are normally found within most cementitious products, the cured extruded hydraulically settable materials of the present invention will have a tensile strength to compressive strength ratio of about 1:7, which is higher than conventional concrete products, which typically have a tensile strength to compressive strength ratio of only about 1:10. Moreover, where high tensile strength fibers are employed in sufficient quantities, it is possible, according to the present invention, to obtain cured hydraulically settable materials which have a tensile strength to compressive strength ratio of about 1:3.

Because of the ability to extrude relatively thin-walled articles having relatively large internal cavities, it is possible for such extruded articles to have relatively low bulk densities. Extruded articles having a multicellular structure will preferably have a bulk density less than about 1.5 g/cm$^3$. Because of the ability to extrude multicellular articles having wall thickness to cavity ratios that are far lower than what is presently possible in the art, it is possible to extrude articles having bulk densities of about 0.7 g/cm$^3$ or lower and, in some cases, of about 0.3 g/cm$^3$ or lower. Whether an extruded article will have a lower, intermediate, or higher bulk density will generally depend on the desired performance criteria for a given usage, and will usually depend on the ratio of the volumes of the solid walls of the article and internal cavities therein. The specific gravity of the solid walls of the articles will generally remain within the ranges stated herein.

In light of the foregoing, the extruded articles of the present invention will usually have significantly higher tensile strength to bulk density ratios compared to prior art cementitious articles. The extruded articles will preferably have a tensile strength to bulk density ratio greater than about 5 MPa-cm$^3$/g, more preferably greater than about 15 MPa-cm$^3$/g, and most preferably greater than about 30 MPa-cm$^3$/g.

B. Selecting the Extrusion Process.

The type of extrusion process that will be employed will vary depending on the nature of the hydraulically settable mixture being extruded, as well as the desired properties of the extruded article. Although the hydraulically settable mix designs of the present invention have carefully controlled theology and plastic-like properties, which make them suitable for other molding processes, the essential feature of the products of the present invention is that they can be continuously extruded into extruded articles that are form-stable immediately or very shortly after the extrusion process. The continuous nature of extrusion process allows for the formation of a wide variety of articles in an economical and inexpensive fashion.

As stated above, a combination of particle packing density, water deficiency, and compression during the extrusion process creates a hydraulically settable mixture with a discontinuous rheology. An important criterion in the extrusion process is providing an extruder capable of exerting the proper pressure or range of pressures for a given mix design. Pressure within the proper range is necessary in order to increase the particle packing density, and concomitantly decrease the volume of interstitial space, which decreases the effective water deficiency of the mixture. This allows for better lubrication of the particles and increased workability and flow properties.

The best properties are generally obtained by exerting a pressure which is commensurate with the levels of particle packing, water deficiency, and aggregate strength within the mixture. Too little pressure might be inadequate to impart adequate flow properties to the hydraulically settable mixture. Conversely, too much pressure may pulverize certain aggregates within the hydraulically settable mixture, while compressing the mixture to the point of having excess water. Excess water may, in some cases, reduce the viscosity and/or yield stress of the hydraulically settable mixture to the point that it will lack sufficient form-stability.

Depending on the amount of pressure that is desired and the amount or type of shear to be exerted onto the hydraulically settable mixture, either a piston-type or auger-type extruder can be used. The advantage of the piston-type extruder is the greater amount of pressure which can be applied. In order to apply very high pressures, including those of up to 100,000 psi, the only current possibility is to use a piston extruder.

Auger-type extruders typically do not exert as much pressure as a piston extruder, and are preferred where extremely high pressures are unnecessary. Auger-type extruders have the advantage of imparting internal shear by the turning of the auger screw and the ability to apply a vacuum or negative pressure to the hydraulically settable mixture within the auger extruder to remove unwanted air within the mixture on a more continuous basis. The double auger extruder has been used mainly on an experimental basis and includes two parallel auger screws, which allow for a wider extruder die and greater extrusion pressures. In most other respects, the twin auger extruder is similar to the single auger extruder.

However, where hydraulically settable mixtures that are very deficient in water are used, it will often be necessary to use a piston extruder in order to exert higher pressures on the mixtures and cause them to flow. In such cases, the hydraulically settable mixture might appear as a dry-looking, granulate material prepared by mixing the components within a drum. The granulates are placed into a piston extruder chamber, put under a vacuum, and then compacted under high pressure by the piston in order to extrude the material. The use of a duel-batch piston extruder allows for a semi-continuous extrusion process.

A currently preferred system for large scale mixing and extrusion in an industrial setting involves equipment in which the materials incorporated into the hydraulically settable mixture are automatically and continuously metered, mixed, de-aired, and extruded by either a single or twin auger extruder apparatus. Either a single or twin auger extruder apparatus has sections with specific purposes, such as low shear mixing, high shear mixing, vacuuming, and pumping. A single or twin auger extruder apparatus has different flight pitches and orientations which permit the sections to accomplish their specific purposes.

The main types of extruders include either the clay or the plastic or food extruder. A clay extruder usually has an extruder having a very high pitch and flight height, the pitch often being 90° from the extruder die. The high pitch increases the amount of surface area of the interface between the auger blades and the material to be extruded, and increasing the pitch and resulting surface area increases the pressure and shear rate of the extruder.

On the other hand, a plastic or food extruder has a much lower flight height and pitch compared to the clay extruder. In this case, the pressure and shear rate are controlled by increasing or decreasing the RPM of the auger screw. Of course, increasing the RPM of the auger screw of a clay extruder will also increase the pressure and shear rate.

C. Designing The Hydraulically Settable Mixture.

The two main criteria used to design an appropriate hydraulically settable mixture are the desired rheology of the mixture before, during, and after the extrusion process and the desired properties of the final hardened extruded article. As set forth above, the rheology of the hydraulically settable mixture is preferably designed so that the mixture will be able to flow and be extruded when subjected to the parameters of the given extrusion process, and thereafter be form-stable immediately or shortly after being extruded.

1. Designing the Mixture Rheology.

As previously discussed, the rheology of the hydraulically settable mixture may be determined initially by controlling (1) the particle packing density of the aggregate and hydraulically settable binder particles, (2) the amount of added water, including the level of water deficiency, and (3) the identity and amount of any organic polymer rheology-modifying agents, plasticizers, or dispersants. How these materials and conditions are interrelated has been discussed in detail.

In addition, the rheology of the hydraulically settable mixture may be altered by the addition of shear forces to effect shear thinning or pseudo-plastic behavior of the water deficient mixture, as well as by compressive forces which reduce the level of water deficiency by forcing the aggregate and hydraulically settable binder particles into closer proximity. In light of this, the level of water deficiency should correlate to the amount of compression and shear force that will be exerted on the hydraulically settable mixture. That is, less water may, as a general matter, be added initially as the amount of compressive and shear forces associated with the extrusion process are increased.

The release of the compressive and shear forces upon extruding the hydraulically settable mixture into the desired article results in a form-stable article held together by internal cohesion of the capillary water or meniscuses. However, these internal forces are dependent upon the amount of water within the capillaries of the material within the extruded article. If the amount of water is too low, there will be insufficient capillary forces to maintain adequate cohesion. Conversely, if the amount of water is too high, the material will have inadequate yield stress to remain form-stable. The amount of water that remains will be a function of the amount of water added initially, as well as the level of compression during the extrusion process.

Upon hydrating, the extruded hydraulically settable material will develop its final strength properties. The compressive strength of the material may be determined by the Strength Equation, and is mainly a function of the porosity of the final hardened material. This is also true for the tensile and flexural strengths of the hardened material to a certain extent. Porosity can be reduced by increasing the initial particle packing density and by decreasing the amount of water that is added initially (or increasing the water deficiency). The level of compressive strength that is desired will depend on the particular performance criteria of the desired article.

In addition, the compressive strength can be increased by using stronger aggregates. Conversely, lighter weight aggregates can be employed when a less strong, but lighter weight article is desired. The tensile and flexural strengths may be altered by adding varying amounts of fiber. Shorter, stronger fibers, such as ceramic fibers, will generally yield a relatively stiff final hardened article with high tensile and flexural strength. Other fibers, such as cellulosic fibers, have lower tensile strength but are less expensive and more flexible and may be adequate where properties of flexibility and toughness are more important.

a. Optimizing the Particle Packing Density.

Achieving an optimized particle packing arrangement within the solid materials of the hydraulically settable mixture is desirable in order to obtain a hydraulically settable mixture having the desired theological and final strength properties. Once the particle packing density of a dry mixture is determined, it is then possible to calculate how much water should be added to the mixture in order to achieve the desired level of water deficiency. A detailed description of the theory, models, and steps necessary to accurately and reproducibly optimize the particle-packing density of the solid particles with a hydraulically settable mixture is set forth in copending U.S. application Ser. No. 08/109,100, entitled: "Design Optimized Compositions and Processes for Microstructurally Engineering Cementitious Mixtures," and filed Aug. 18, 1993, in the name of Per Just Andersen, Ph.D. and Simon K. Hodson (now abandoned). For purposes of disclosure, this application is incorporated herein by specific reference. In addition, mathematical and graphic models used to determine and quantify the particle-packing density of a mixture is set forth in V. Johansen and P. J. Andersen, "Particle Packing and Concrete Properties" at 118–22, *Materials Science of Concrete II* (The American Ceramic Society, Inc., 1991). For purposes of disclosure, this article is incorporated herein by specific reference.

In order to achieve a desired packing density of the various particles within the hydraulically settable mixture, including the hydraulically settable binder particles and the aggregates, the particles will have at least two size ranges. In order to increase the particle-packing density to higher theoretical limits, it may be preferable in some cases to have three or more different size ranges of particles. For purposes of particle packing, mixtures that contain two different size ranges of particles are referred to as "two-component systems", those that have three different particle size ranges are referred to as "three-component systems", and so on. For simplicity, the two different components of a two-component system may be referred to as the fine and coarse components, while in the three-component system they may be referred as the fine, medium, and coarse components.

In order to obtain an optimized level of particle packing, it is preferable for the average particle size within one size range to be at least seven and one-half times the particle size of the next smallest particle range, more preferably at least about ten times, and most preferably at least about twelve and one-half times. (In many cases the ratio may be greater.) For example, in a two-component system, it will be preferable for the average particle size of the coarse component to be at least about seven and one-half times the average particle size of the fine component. Likewise, in a three-component system, it will be preferable for the average particle size of the coarse component to be at least seven and one-half times the average particle size of the medium component, which will likewise preferably be at least seven and one-half times the size of the fine component. Nevertheless, as more differently sized particles are added, the ratio between the particle size magnitudes need not always be this great.

In a three-component system, it will be preferable for the fine aggregate particles to have diameters within a range from about 0.01 microns to about 2 microns, with a medium aggregate particle to have diameters in a range from about 1 to about 20 microns, and for the coarse aggregates to have a diameter within a range from about 100 microns to about 2 mm. In a two component system, any two of these ranges may be preferable. Larger and smaller diameter particles may be used, as well as particles within different ranges, depending on the number of different particle types.

The term "type" as used in the specification and appended claims with regard to aggregate, hydraulically settable binder, and other solid particles is intended to include both the kind of material used and the ranges of the particle sizes. For example, although coarse aggregates usually have particle diameters in a range from about 100 microns to about 2 mm, one type of coarse aggregate may have a particle size range from about 200 to about 500 microns while a second type may have a particle size range from about 700 microns, to about 1.2 mm. As stated herein, optimal particle packing of a mixture can be obtained by selectively combining different types of aggregates. Each type of aggregate has a defined average particle size; studies have found, however, that particle gap grading leads to good packing but low workability compared to continuous gradation.

In general, a two-component (or binary) packing system will seldom have an overall packing density higher than about 80%, while the upper limit for a three-component (or ternary) system is about 90%. To obtain higher particle packing, it will be necessary, in most cases, to add four or more components, although having broader and more optimized particle sizes among two- or three-component systems can yield higher overall particle packing than 80% and 90%, respectively.

The hydraulically settable binder used in the present invention is usually a hydraulic cement, gypsum, or calcium oxide and may, in some cases, comprise fly ash or silica fume. Hydraulic cement is characterized by the hydration products that form upon reaction with water. Hydraulic cements generally have particle sizes ranging from 0.1 μm to 100 μm. Portland cement, Type 1 has an average particle size in a range from about 10 to about 25 microns.

The types of aggregates and hydraulically settable binders used in the present invention are further defined by the average diameter size (d') and the natural packing density (φ) of the types of particles. These values are experimentally determined and are necessary for calculating the packing density of the resulting hydraulically settable mixture.

The natural packing density of each type of material is determined by filling the material into a cylinder having a diameter of at least 10 times the largest particle diameter of the material. The cylinder is then tapped against a hard surface until the material is fully compacted. By reading the height of compacted material in the cylinder and the weight of material, the packing density is calculated according to the formula:

$$\phi = \frac{W_M}{SG_M \cdot V_M} \quad (1)$$

Where, $W_M$=weight of the material, $SG_M$=specific gravity of the material, and $V_M$=volume of the material.

Of course, two or more types of hydraulically settable binder may also be added to a mixture. The particle size of the hydraulically settable binder is usually so small, however, that the combination of different types of hydraulically settable binders generally does not significantly affect the packing density of the mixture. Nevertheless, in some situations the combination of different types of hydraulically settable binders may be relevant. In these situations, the types of hydraulically settable binder can be represented as a pseudo-particle in the same manner as for fine and coarse aggregate.

The above described process teaches a method for determining the packing density for all possible combinations of a given feed stock. With regard to the rheological effect, increasing the particle packing density allows for the inclusion of less water while maintaining the same levels of workability and plastic-like behavior of the mixture. In addition to improving the rheological properties of the mixture while in the green state, maximizing particle packing density also increases the strength of the final cured product by reducing the amount of interstitial space filled either by air, water, or a combination of both (according to the Strength Equation).

Nevertheless, it should be understood that "optimizing" the particle packing system will not necessarily be achieved by simply maximizing the particle packing density. As a general rule, maximization of particle packing density tends to increase the desired properties which are achieved through particle packing. However, restraints such as cost and/or availability of particular aggregates might warrant a lower particle packing density while still obtaining a mixture with adequate rheological properties for a particular purpose.

Although it has been recognized that increasing the particle packing density aids in controlling the rheological properties of a hydraulically settable mixture, the maximum packing density in the prior art has been about 65%. In contrast, through the particle packing techniques described above, it is possible to obtain natural particle packing densities greater than 65%, and even as high as 99%.

In general, the particle packing density will preferably be within a range from about 0.65 to about 0.99, more preferably between about 0.70 and about 0.95, and most preferably between about 0.75 and about 0.90. (The added cost of achieving 99% particle packing efficiency is often prohibitive. Therefore, most preferred packing densities are somewhat less).

FIG. 1 illustrates the concept of particle packing by showing a cross-section of particles which have been efficiently packed together (particle packing density of 0.70). From FIG. 1, it can be seen that the spaces between the larger aggregate particles that would normally be occupied by air are instead occupied by smaller aggregates. Moreover, the space between the larger and smaller particles which would normally be occupied by air are in turn occupied by yet smaller sized aggregate particles. In this way, the volume of interstitial air between the particles is greatly reduced, while the particle packing density is greatly increased.

FIG. 2 graphically illustrates and quantifies the actual packing density by showing how in a typical packing system (particle packing density of 0.70) the overall volume of the mixture is distributed between solid particles (70%) and interstitial space (30%). It is this interstitial space into which water is added in order to lubricate the individual particles so that the hydraulically settable mixture will have adequate workability and flow properties, particularly when the packing density is temporarily increased by extruding the mixture under increased pressure.

b. Water Deficiency.

As stated above, the amount of water which will be added to any given hydraulically settable mixture should be carefully measured in order to obtain the desired properties of workability and rheology. It will be understood, however, that the amount of water to be added to any given mixture will often have less to do with the volume, or even the mass, of the dry hydraulically settable mixture but directly corresponds to the packing density, more particularly the amount of interstitial voids within the mixture.

To better illustrate this point, reference is made to FIGS. 3A and 3B, which show two different particle packing systems having the same overall volume and which are both 0% deficient in water. That is, just enough water has been added to completely fill the interstices between the particles. Both of these mixtures will have similar rheologies even though they have quite varying amounts of water. As shown graphically in FIGS. 3A and 3B, the mixture having a packing density of 65% (FIG. 3A) has seven times the interstitial water of the mixture having 95% packing density (FIG. 3B). (Of course, it would also be predicted that the mixture with the higher packing density will have greater strength when cured, according to the Strength Equation.)

FIG. 4 shows an optimized particle packing system in which there is a 50% deficiency of water, that is, only half of the interstitial space has been filled with water (50% of the space, or 15% of the overall mixture by volume). As a matter of comparison, two hydraulically settable mixtures which have the same overall volume and the same volume of added water will have differing levels of water deficiency whenever their particle packing density differs. The lower the packing density the greater the water deficiency since there is more interstitial space to be filled.

FIG. 5 shows both pictorially and graphically how the application of pressure to a hydraulically settable mixture, such as by an extruder, causes the particles of the mixture to become more compacted, thereby increasing their packing density. Because the particles and water are essentially incompressible, the amount of interstitial voids greatly decreases, while the amount of water available to lubricate the particles apparently increases. Although air is extremely compressible and would not significantly impede the compaction process described above, it is advantageous to remove the air by means of a vacuum in order to prevent re-expansion of the air upon release of the compressive force.

Knowing just how much water should be added to any given hydraulically settable mixture must be carefully calculated prior to actually adding the water and also verified once the water is added. As stated above, the hydraulically settable binder does not necessarily react with all of the theoretical stoichiometric water necessary to hydrate the binder. Instead, some of this water actually fills the interstitial space, at least temporarily, until it reacts with the hydraulically settable binder over time.

Of course, it should be understood that the level of water deficiency is not the only determinant of the rheology of the hydraulically settable mixture. Other additives, such as dispersants and rheology-modifying agents, greatly affect the viscosity, workability, and other rheological properties of the mixture. One skilled in the art will be able to adjust the level of water deficiency based on the amount of dispersant and/or rheology-modifying agent that has been added to the mixture to obtain a hydraulically settable mixture having the desired properties.

D. Preparing The Hydraulically Settable Mixture.

As set forth above, any mixing means that is appropriate for a particular manufacturing process will work well to achieve good particle packing, although it is believed that the best particle packing density is achieved by mixing together the aggregates and the hydraulically settable binder particles before any water has been added. Once the desired amount of water is ready to be added, any appropriate mixing process may be used. A means for applying high shear to a hydraulically settable mixture, such as the high shear mixers described more fully hereinafter, may be used to create a very homogeneous mixture. A kneader-mixer, such as a clay kneader, is often preferable where lower shear is desired. Finally, the materials may be mixed together and extruded using either a single or twin auger extruder. High frequency vibration may be used in conjunction with any mixing process to aid in the mixing of the components.

The currently preferred embodiment for preparing an appropriate moldable mixture in an industrial setting includes equipment in which the materials incorporated into the moldable mixture are automatically and continuously metered, mixed (or kneaded), de-aired, and extruded by an auger extruder apparatus. It is also possible to premix some of the components in a vessel, as needed, and pump the premixed components into a kneading mixing apparatus.

A double shaft sigma blade kneading mixer with an auger for extrusion is the preferred type of mixer. The mixer may be adjusted to have different RPMs and, therefore, different shear for different components. Typically, the moldable mixtures will be mixed for a maximum of about 60 minutes, and thereafter emptied from the mixer by extrusion.

In certain circumstances it may be desirable to mix some of the components together in a high shear mixture in order to form a more well dispersed, homogeneous mixture. For example, certain fibers may require such mixing in order to fully disagglomerate or break apart from each other. High shear mixing results in a more uniformly blended mixture, which improves the consistency of the unhardened moldable mixture as well as increasing the strength of the final hardened sheet. This is because high shear mixing more uniformly disperses the fiber, aggregate particles, and binder throughout the mixture, thereby creating a more homogeneous structural matrix within the hardened sheets.

High shear mixers useful in creating the more homogeneous mixtures as described herein are disclosed and claimed in U.S. Pat. No. 4,225,247 entitled "Mixing and Agitating Device"; U.S. Pat. No. 4,552,463 entitled "Method and Apparatus for Producing a Colloidal Mixture"; U.S. Pat. No. 4,889,428 entitled "Rotary Mill"; U.S. Pat. No. 4,944,595 entitled "Apparatus for Producing Cement Building Materials"; and U.S. Pat. No. 5,061,319 entitled "Process for Producing Cement Building Material". For purposes of disclosure, the foregoing patents are incorporated herein by specific reference. High shear mixers within the scope of these patents are available from E. Khashoggi Industries of Santa Barbara, Calif., the Assignee of the present invention.

Different mixers are capable of imparting differing shear to the moldable mixer. For example, a kneader imparts higher shear compared to a normal cement mixer, but is low compared to an Eirich Intensive Mixer or a twin auger food extruder.

It should be understood, however, that high shear, high speed mixing is generally efficacious only where the mixture has relatively low viscosity. In those cases where it is desirable to obtain a more cohesive, plastic-like mixture, it may be desirable to blend some of the ingredients, including water, in the high shear mixer and thereafter increase the concentration of solids, such as fibers or aggregates, using a lower shear kneading mixer.

In many cases the order of mixing will impart different properties to the hydraulically settable mixture. In a currently preferred embodiment in which both a dispersant and a rheology-modifying agent are used, it will be preferable to first mix the hydraulically settable binder and water together using a high shear mixer. The dispersant is preferably added after significant wetting of the hydraulically settable binder particles has occurred. After the dispersant has been substantially adsorbed by the hydraulically settable binder particles, the rheology-modifying agent is added to the mixture.

E. Extruding Articles From The Hydraulically Settable Mixture.

Once the moldable mixture has been properly blended, it is then transported to an extruding means such as an auger extruder, a piston extruder or a twin auger extruder and extruded. Although the hydraulically settable mix designs of the present invention have carefully controlled rheology and plastic-like properties which make them suitable for other molding processes, the essential feature of the products of the present invention is that they can be continuously extruded. It is this continuous extrusion process which allows the formation of a wide variety of objects and shapes in an economical and inexpensive fashion.

As stated above, a combination of particle packing density, water deficiency, and compression during the extrusion process creates a hydraulically settable mixture with discontinuous rheological properties. Hence, an important criterion in any extrusion process is choosing an extruder which is capable of exerting a carefully predetermined pressure for any given mix design. This is because the compressive forces of the extruder are responsible for temporarily increasing the particle packing density, which decreases the volume of interstitial space and decreases the effective water deficiency of the mixture. This immediately translates into better lubricated particles and increased workability and flow properties.

However, the best properties are generally obtained by exerting a pressure which is commensurate with the levels of particle packing, water deficiency and aggregate strength within the mixture. Adding too little pressure would prevent the ability to impart adequate flow properties to the hydraulically settable mixture. Conversely, adding too much pressure might also cause a number of problems, including the pulverization of certain aggregates within the hydraulically settable mixture, a tendency of the extruded material to burst out of the extruder die rather than continuously flowing out, or non-uniformity of flow through the die.

Depending on the amount of pressure that is desired and the amount of type of shear to be exerted onto the hydraulically settable mixture, either a piston-type or auger-type extruder can be used. An auger-type extruder (FIG. 6) has certain advantages even though it cannot be used to extrude at the same high pressures as a piston extruder. These advantages include continuous internal shear which is applied by the turning auger screw, as well as greater ease in continuously applying a vacuum or negative pressure to the hydraulically settable mixture within the auger extruder to remove any unwanted air within the mixture. In some cases, an apparatus capable of both mixing and extruding the moldable mixture may be used in order to streamline the operation and minimize the coordination of the various components within the system. The advantage of the piston-type extruder as shown in FIG. 7 is the greater amount of pressure which can be applied. In order to apply very high pressures, even up to 100,000 psi, the only currently known possibility is to use a piston extruder or a roller milling/extruding process. The piston of a piston extruder and the auger of an auger extruder are merely examples of means for applying an extrusion pressure sufficient to cause a hydraulically settable mixture to flow and be extruded through a die; other means can also be utilized.

Figure 7:
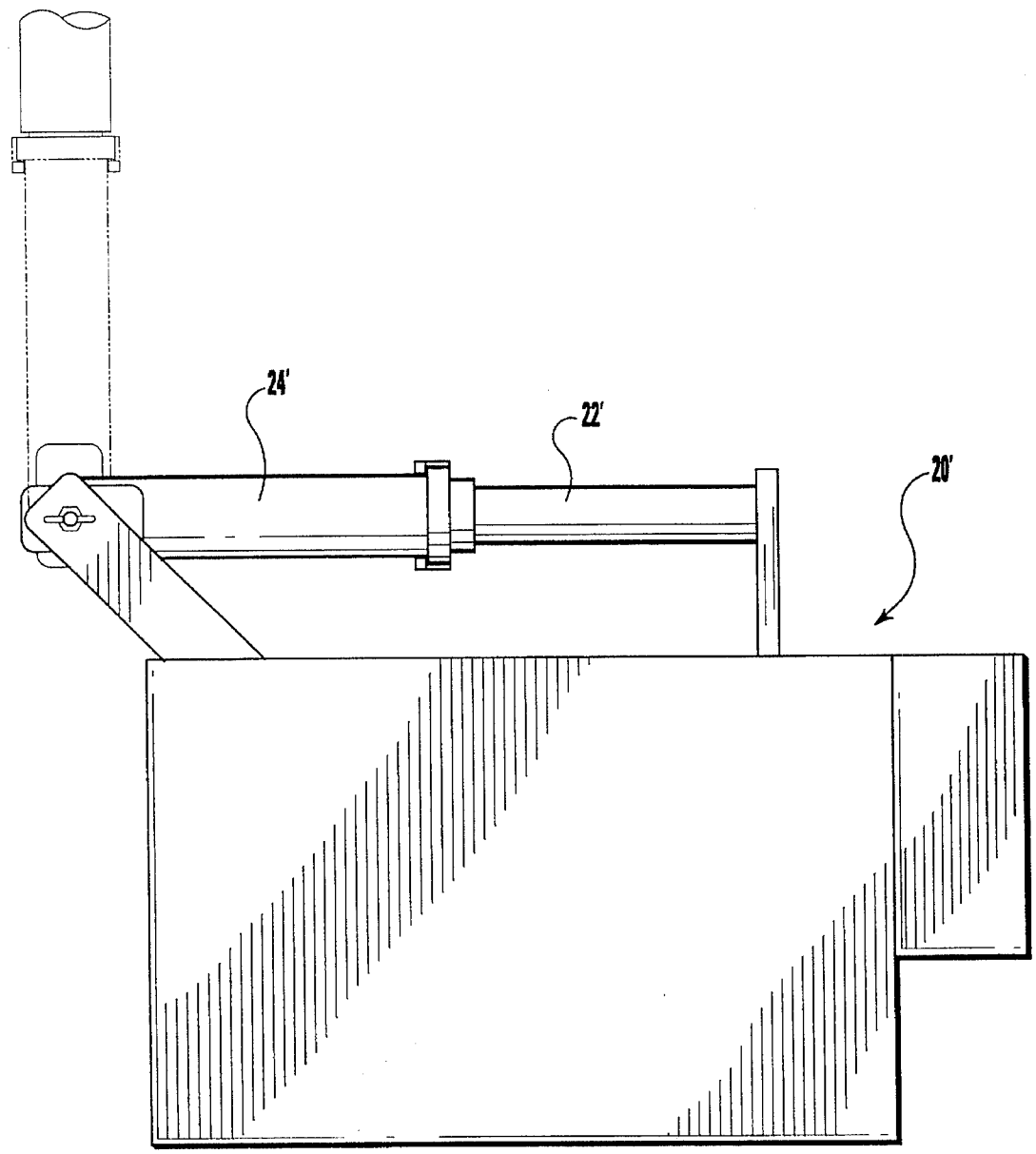
FIG. 7 is a cross-section view of a piston extruder.

Reference is now made to FIG. 6, which is a closeup view of an auger extruder 20, which includes a feeder 22 that feeds the moldable mixture into a first interior chamber 24 within the extruder 20. Within the first interior chamber 24 is a first auger screw 26 which exerts forward pressure on and advances the moldable mixture through the first interior chamber 24 toward an evacuation chamber 28. Typically, a negative pressure or vacuum will be applied to the evacuation chamber 28 in order to remove unwanted air voids within the moldable mixture.

Thereafter, the moldable mixture will be fed into a second interior chamber 30. A second auger screw 32 will advance the mixture toward a die head 34 having a transverse slit 36 with a die width 38 and a die thickness 39. The cross-sectional shape of the die slit 36 is configured to create a sheet of a desired width and thickness that will generally correspond to the die width 38 and die thickness 39.

Alternatively, as seen in FIG. 7, the extruder may comprise a piston extruder 20' instead of an auger extruder 20. A piston extruder utilizes a piston 22' instead of an auger screw 22 in order to exert forward pressure on and advance the moldable mixture through the interior chamber 24'. An advantage of using a piston extruder is the ability to exert much greater pressures upon the moldable mixture. Nevertheless, due to the highly plastic-like nature of mixtures typically employed in the present invention, it is not generally necessary, or even advantageous, to exert pressures greater than those achieved using an auger extruder.

A currently preferred system for large scale mixing and extrusion in an industrial setting involves equipment in which the materials incorporated into the hydraulically settable mixture are automatically and continuously metered, mixed, de-aired, and extruded by a twin auger extruder apparatus. A twin auger extruder apparatus has sections with specific purposes such as low shear mixing, high shear mixing, vacuuming, and pumping. A twin auger extruder apparatus has different flight pitches and orientations which permits the sections to accomplish their specific purposes.

It is also possible to premix some of the components in a vessel, as needed, and pump the premixed components into the twin auger extruder apparatus. The preferable twin auger extruder apparatus utilizes uniform rotational augers, wherein the augers rotate in the same direction. Counter-rotational twin auger extruders, wherein the augers rotate in the opposite directions, accomplish the same purposes. A pug mill may also be utilized for the same purposes. Equipment meeting these specifications are available from Buhler-Miag, Inc., located in Minneapolis, Minn.

The amount of pressure that is applied in order to extrude the moldable mixture will generally depend on the pressure needed to force the mixture through the die head, as well as the desired rate of extrusion. The rate of extrusion should be carefully controlled in some circumstances in order for the rate of formation of the extruded article to correspond to the rate of subsequent processing steps, such as cutting and/or reformation of the extruded article. An important factor which will affect the optimum speed or rate of extrusion is the final thickness of the extruded article. A thicker article contains more material and will require a higher rate of extrusion to provide the necessary material. Conversely, a thinner article contains less material and will require a lower rate of extrusion in order to provide the necessary material.

The ability of the moldable mixture to be extruded through a die head, as well as the rate at which it is extruded, is generally a function of the rheology of the mixture, as well as the operating parameters and properties of the machinery. Factors such as the amount of water, hydraulically settable binder, rheology-modifying agent, dispersant, the particle packing density, or the level of water absorption or reaction by the mixture components all affect the rheological properties of the mixture.

As set forth above, adequate pressure is necessary in order to temporarily increase the workability of the moldable mixture in the case where the mixture has a deficiency of water and has a degree of particle packing optimization. In a mixture that is water deficient, the spaces (or interstices) between the particles contain insufficient water to lubricate the particles in order to create adequate workability under ordinary conditions. However, as the mixture is compressed within the extruder, the compressive forces drive the particles together, thereby reducing the interstitial space between the particles and increasing the apparent amount of water that is available to lubricate the particles. In this way, workability is increased until the mixture has been extruded through the die head, at which point the reduced pressure causes that mixture to exhibit an almost immediate increase in stiffness and green strength, which is generally desirable.

In light of each of the factors listed above, the amount of pressure which will be applied by the extruder in order to extrude the moldable mixture will preferably be in a range from about 10 bars to about 7000 bars, more preferably in a range from about 20 bars to about 3000 bars, and most preferably in a range from about 50 bars to about 200 bars.

It will be understood that the extrusion of the moldable mixture through the die head will tend to unidirectionally orient the individual fibers within the moldable mixture along the "Y" axis, or in the lengthwise direction of the extruded article.

As set forth above, it may also be desirable to co-extrude the hydraulically settable mixture with other materials in order to obtain, e.g., a laminate structure or an extruded product with other materials impregnated within the hydraulically settable matrix. Things which may be co-extruded with the extrudable hydraulically settable mixtures of the present invention include another hydraulically settable mixture (often having different or complementary properties), a fibrous mat, coating materials, polymers, clays, graphite (for making a pencil), or continuous fibers, strips, wires, or sheets of almost any other material (such as metal). It has been found that by joining together, for example, a hydraulically settable sheet and a fibrous mat by co-extrusion that the final product exhibits synergistic results of strength, toughness, and other performance criteria.

F. Accelerated Drying.

Although the hydraulically settable materials of the present invention are capable of quickly gaining high green strength, it may yet be desirable to accelerate further the hardening or stiffening of the extruded materials. This can be accomplished by applying heat to further remove some of the water within the hydraulically settable mixture, particularly from the surface, where the greatest amount of green strength is often desired. Heating is especially desirable where there is an excess of water within the mixture in order to increase the viscosity and yield stress of the extruded article and impart the desired rapid form-stability.

Because of the nature of extrusion, it will usually not be advantageous to overheat the extruder die above a certain temperature in order to remove water during the extrusion process. Overheating the die might cause the extruded mixture to expand or form pockets of high pressure steam that can cause the hydraulically settable mixture to "explode" out of the extruder die. (Nevertheless, some degree of heating may be desirable in order to reduce the friction between the extruded material and the extruder die by forming a steam barrier.) By careful control of the rheology of the hydraulically settable mixture and appropriate heating of the extruder die, it is generally possible to obtain extruded articles having strength to allow handling immediately after extrusion.

G. Accelerated Curing.

In those cases in which the extruded hydraulically settable mixture is so water deficient that there is insufficient water to adequately hydrate the cement or other hydraulically settable binder, it might be advantageous to expose the extruded object to water or air having high humidity. The hygroscopic nature of typical binders, particularly hydraulic cement, allows the binder to literally absorb the necessary water of hydralion from the air. Although this would occur naturally in any event (at least in the case of hydraulic cement), exposing the very water deficient extruded object to air having high humidity greatly increases this water absorption process and the rate of hydration of the binder particles. In particular, autoclaving may be used in order to greatly increase the strength of the final cured article.

III. PLACING FILAMENTS DURING EXTRUSION.

The present invention provides apparatus and methods for continuously extruding a hydraulically settable mixture and simultaneously placing filaments within the mixture to form novel articles of manufacture having a filament reinforced hydraulically settable structural matrix. The primary purpose of incorporating continuous filaments is to increase the modulus of elasticity, elongation modulus, tensile strength, flexural strength, toughness, and peak load before rupture of an article. The circumferential, bursting or hoop strength of an article can also be increased by increasing the angle $\alpha$ of the filaments, which strength is essential in the functionality of pipes, containers, and all other pressure vessels, particularly thin-walled pressure vessels (containers whose wall thickness to radius ratio is less than 0.1). The filaments can be placed anywhere within the hydraulically settable structural matrix, including in the interior and/or on the surface of the structural matrix.

Filaments can be placed in any desired orientation within the hydraulically settable structural matrix by introducing filaments into the die of an extruder as a hydraulically settable mixture is being extruded. This action causes the filaments to be "drawn" into the extruding hydraulically settable mixture. The hydraulically settable mixture encapsulates the filaments and becomes consolidated or compacted as a result of the internal pressure applied to the mixture during the extrusion process, thereby minimizing the amount and volume of internal voids or defects within the mixture and maximizing the interface between the filaments and the hydraulically settable mixture. Increasing the interface between the filaments and the matrix helps to more securely anchor the filaments within the hydraulically settable matrix.

Different embodiments of the apparatus for continuously placing filaments within the extruding hydraulically settable mixture permit the filaments to be placed in a variety of configurations or orientations. These include a parallel configuration, helical configuration, criss-cross configuration, or combinations of these configurations. In a "parallel configuration" the filaments are generally coaxial to the longitudinal axis, or extrusion direction, of the hydraulically settable article. Conversely, in the "helical configuration" and "criss-cross configuration" (which is merely a variation of the helical configuration), the filaments are offset from the longitudinal axis, usually at an angle $\alpha$ of at least about 5° up to a maximum of about 90°, which may be referred to herein as the "offset angle", "winding angle" or "spiral angle". (Depending on the direction of rotation of the filament placing means, i.e., clockwise or counterclockwise, angle $\alpha$ can either be positive or negative but will not have a magnitude greater than 90°, an angle of 91° being identical to an angle of −89°.)

The placement of filaments within the hydraulically settable mixture without any significant winding or similar movement of the filaments while the filaments are being introduced into the interior chamber of the extruder die yields a parallel, coaxial configuration of filaments within the extruded article. Winding the filaments upon introducing the filaments into the extruder die produces an article having a spiral configuration of filaments within the hydraulically settable structural matrix. A criss-cross configuration is achieved by winding filaments in the opposite direction relative to the direction of previously wound filaments. Specifically, winding one filament clockwise and another filament counter clockwise yields overlapping fibers in a criss-cross orientation, one filament having a positive angle relative to the longitudinal axis and the other filament having a negative angle relative to the longitudinal axis.

The concentration or volume of filaments relative to a given volume of the hydraulically settable matrix of the extruded article is proportional to the number, cross-sectional area, and the magnitude of the winding angle $\alpha$ of the filaments. Increasing any or all of these variables will increase the concentration or volume of the filaments within the hydraulically settable matrix. In particular, increasing the magnitude of the winding angle $\alpha$ increases the frequency of each individual winding, which simultaneously decreases the distance between each winding, thereby increasing the concentration (and, hence, volume) of filament per unit length of the extruded article.

By varying the concentration and/or the winding angle $\alpha$ of the filaments placed within the extruded hydraulically settable articles of the present invention, a wide variety of strength, elongation, and toughness properties can be attained. Additionally, depending on their chemical makeup, the filaments themselves can have greatly varying tensile and shear strengths, as well as flexibility and elongation ability. Such properties are also affected by the diameter of the filaments, or whether the filaments consist of a single strand or a group of strands twisted or otherwise joined together to form a single filament unit.

A primary factor affecting the properties imparted to the final hardened article by the wound filaments is the offset angle. Some of the properties affected by the offset angle include the hoop strength, tensile strength, and flexibility of the article. The preferred offset angle depends on many factors, including the shape of the article being extruded, the type of filament, the desired strength properties of the article, and cost. Filaments having a lower winding angle will generally define an elliptical cross section of the pipe or cylinder into which they are placed. As the winding angle increases to 90°, the filaments will tend to define an ellipse of diminishing cross-width. At an angle of 90°, the filaments will define a circular cross section.

Assuming that the article being extruded is a pipe, cylinder, or other article having a generally circular cross-section, it will have a radius that is generally perpendicular to the longitudinal axis. For purposes of defining the direction and magnitude of the strength imparted by the filaments, it would be useful to define the strength imparted by the filaments as having vector components corresponding to the longitudinal axis and radius, respectively. Whenever a filament has an angle of offset greater than 0° but less than 90°, the filament will have both a longitudinal vector component and a radial vector component. In filaments having a winding angle less than 45°, the longitudinal strength vector would be expected to generally exceed the radial strength vector. Similarly, in filaments having a winding angle greater than 45°, the radial strength vector would be expected to generally exceed the longitudinal strength vector.

In general, more longitudinally oriented filaments having a greater longitudinal strength vector will tend to increase the tensile strength of the hydraulically settable article in the longitudinal, or lengthwise direction. Conversely, filaments having a greater angle of offset relative to the longitudinal axis, i.e., those having a greater radial strength vector will instead tend to increase the circumferential strength (otherwise known as hoop or burst strength in the case of a pipe or other hollow structure). A mixture of filaments having both higher and lower angles of offset can be used in order to impart each of these properties.

The angle $\alpha$ at which the filament is placed is a function of both the forward extrusion speed ("$V_e$"), as well as the rotational velocity ("$V_r$") of the placing means. In fact, the tangent of angle $\alpha$ is proportional to the ratio of the rotational velocity to the extrusion speed ($V_r/V_e$). Therefore, all things being equal, the faster the extrusion speed, the lower the angle of offset of the filaments. Conversely, the greater the magnitude of the rotational velocity of the placing means the greater the magnitude of the winding angle of the filaments. The concentration of filaments within the hydraulically settable matrix of the extruded article is directly proportional to both the number of filaments, as well as the average angle $\alpha$ of the filaments. As both the number and average angle $\alpha$ of the filaments increases, so does the concentration. The greater the concentration of filaments, the less space there is between the individual filament strands. This results in a greater and more uniform effect imparted by the filaments to the hydraulically settable matrix of the extruded article. In general, smaller diameter fibers more closely spaced together will tend to more uniformly impart the desired properties of, e.g., strength, flexibility, and toughness compared to larger diameter fibers.

Finally, the relative placement depth of the various individual filaments affects the spacial orientation of the filaments, which, like concentration and winding angle, can affect the strength, flexibility, and other properties of the final hardened article. More even distribution of the placement depth of the individual filaments yields a final product with more uniformly distributed filaments, which better distributes any load or impact that is applied to the extruded article.

In most cases, it will generally be preferable to place the filaments in a manner which achieves uniform strength throughout the article. Nevertheless, the particular performance criteria of any given article will dictate the optimal placement of filaments therein. The filaments can be initially placed at an optimal depth or the filaments can be further positioned within the hydraulically settable structural matrix by pulling the filaments deeper into the mixture after being initially placed. A number of independent factors work together in affecting the depth of fiber placement, including tension of the filaments, the viscosity of the mixture, the extrusion rate of the mixture, and the rotational rate of the placing means.

Filaments are drawn from the placing means by the mixture primarily due to the frictional force between the mixture and the filaments, which is controlled, at least in part, by controlling the viscosity of the mixture. As previously discussed, however, to increase the workability of the hydraulically settable mixture so as to enable extrusion of the mixture at a minimum cost, it is preferable to lower the viscosity of the mixture while maintaining an adequate yield stress to maintain form stability. In the preferred embodiment, these opposing conditions are optimized. Too high a viscosity can waste energy or prevent extrusion of the mixture or cause the filament to break, while too low of a viscosity can cause the filament to slip within the mixture and thus prevent uniform alignment of the filament. As previously discussed, viscosity of the mixture can be varied by numerous methods such as altering the packing density, increasing the water content, or the addition of admixtures such as dispersants or water reducers.

Filaments can be placed deeper within a hydraulically settable structural matrix after being initially drawn from the placing means by maintaining an optional tension on the filaments as the filaments are wound. Tension on the filaments causes the filaments to be pulled into the hydraulically settable structural matrix by the rotation on the placing means.

The amount of penetration of the filament within the extruded article is inversely proportional to the length of filament laid down during any given rotation distance, as the are defined by the circumference of the extruded article has a greater length than a chord defined by two points along the arc. The length, in turn, is inversely proportional to the tension on the filament. In other words, by increasing the tension on the filament being wound, the length of filament being laid down during the rotation of the rotatable placing means decreases. This, in turn causes the filament to be pulled down within the extruded material. By adjusting the tension of the filament, as well as the rotational velocity and extrusion rate, one skilled in the art can control the depth of the filament penetration within the extruded material.

Depicted in FIGS. 8–29 are filaments being placed within a hydraulically settable mixture by an apparatus comprising means for continuously placing filaments within a hydraulically settable composition being extruded into a desired article. The filaments are shown in FIGS. 8–21 being introduced into a die or interior chamber of an extruder of the present invention; the interior chamber is herein referred to as a "filament placement chamber", an "interior die chamber", or simply "die". A specific embodiment of an apparatus for continuously placing filaments in a hydraulically settable composition is shown in FIGS. 22–29.

The methods and apparatus described below can also be used with materials other than hydraulically settable mixtures. By way of example only, other materials which can be utilized with the methods and apparatus of the present invention include plastics, clays, mixtures of clay and fibers, or mixtures comprising an organic binder and inorganic aggregates as described in co-pending U.S. patent application Ser. No. 08/218,971, entitled "Methods Of Molding Articles Having An Inorganically Filled Organic Polymer Matrix," and filed Mar. 25, 1994, in the names of Per Just Andersen, Ph.D., and Simon K. Hodson, which is incorporated herein by specific reference. Similarly, the present invention can be utilized with mixtures comprising an organic binder and organic aggregates.

Figure 8:
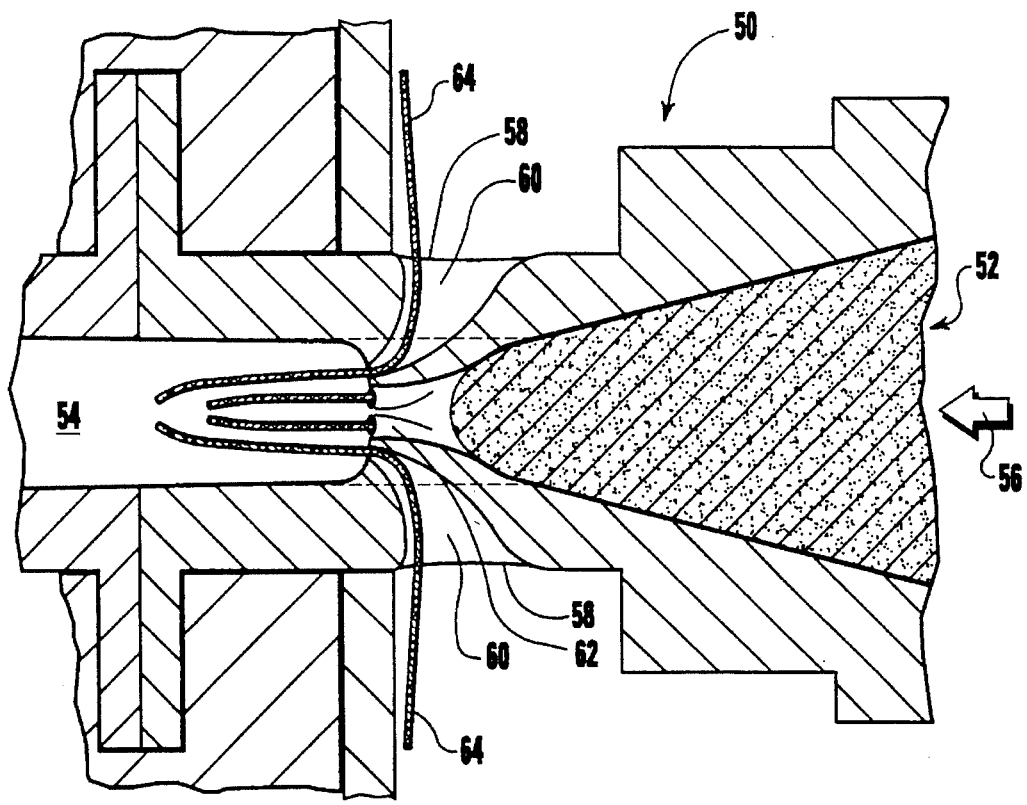
FIG. 8 is a longitudinal cross-section view of an apparatus for placing filaments into a hydraulically settable mixture while simultaneously extruding the hydraulically settable mixture, which illustrates the mixture being extruded towards the filaments.
Figure 9:
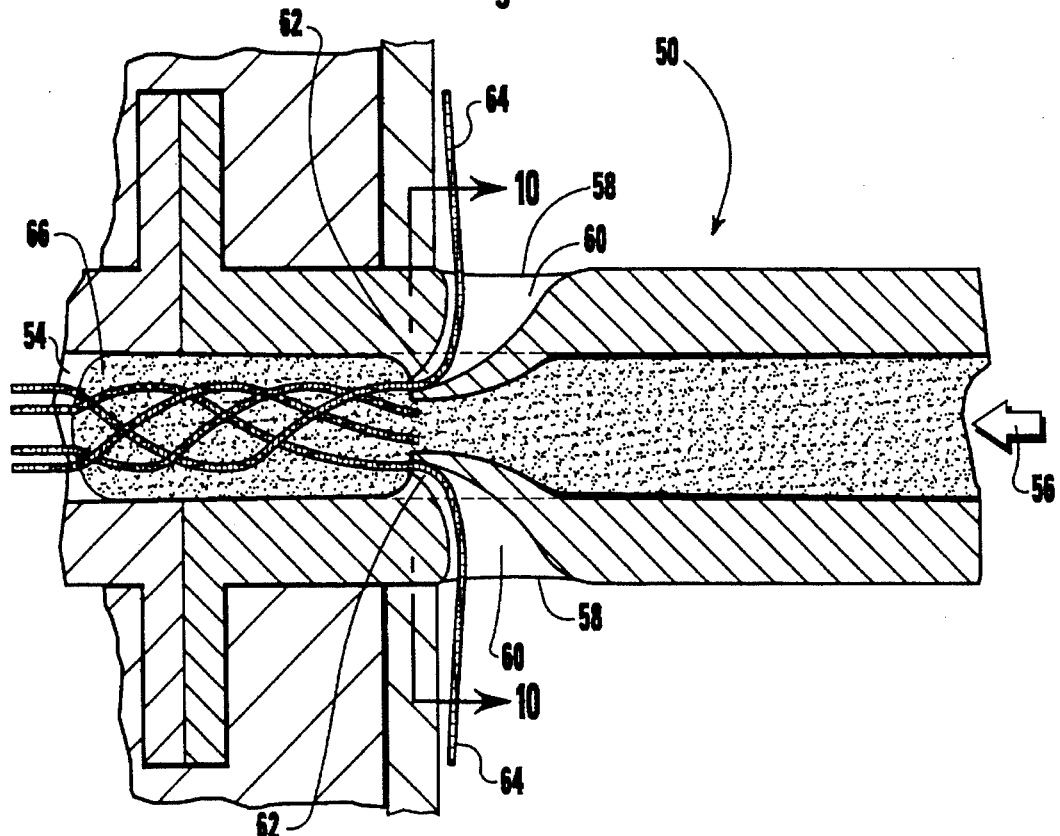
FIG. 9 is a longitudinal cross-section view of an apparatus for placing filaments into a hydraulically settable mixture while simultaneously extruding the hydraulically settable mixture, which illustrates the mixture encapsulating the filaments which are being placed in a helical configuration as a rod is formed.
Figure 10:
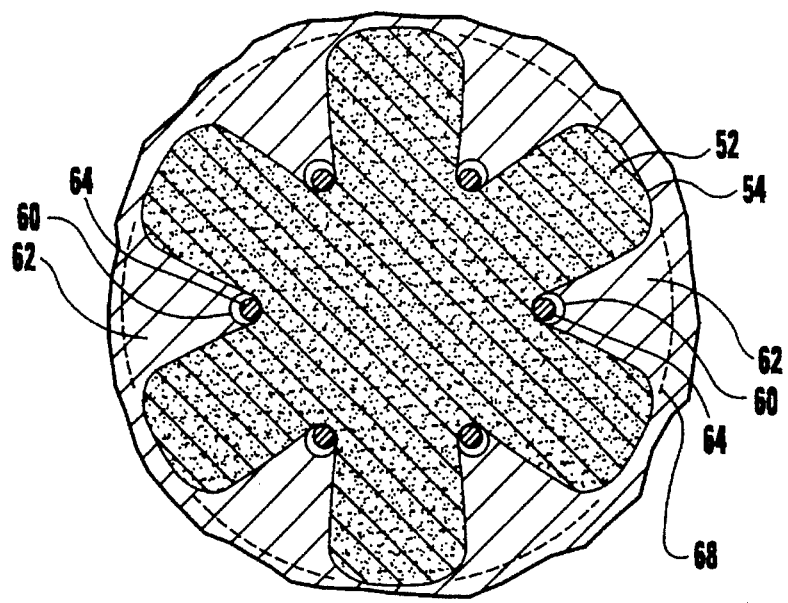
FIG. 10 is a transverse cross-section view of an apparatus for placing filaments into a hydraulically settable mixture while simultaneously extruding the hydraulically settable mixture taken along cutting plane line 10—10 of FIG. 9, which illustrates the placement of filaments by a placing means having scoop ends.

FIGS. 8–10 depict filaments being introduced into a die of an extruder, placed within a hydraulically settable mixture, and wound into a spiral configuration. Depicted in FIG. 8 is a longitudinal cross-section view of the apparatus shown generally at 50 for placing filaments during extrusion of a hydraulically settable mixture shown at 52. The hydraulically settable mixture 52 is extruded within a filament placement chamber 54 in the direction indicated by arrow 56 toward means for placing filament. The placing means are disposed around and communicate with filament placement chamber 54, with each placing means comprising means for receiving filament into the placing means, means for channeling the received filament through the placing means and introducer means for introducing filaments into the filament placement chamber, after which the filaments are drawn by the internal friction or viscosity of the hydraulically settable mixture.

In the embodiment of the apparatus shown in FIG. 8, the means for receiving a filament into the placing means comprises a filament entry 58; the means for channeling the received filament through the placing means comprises a channel 60; and the means for introducing the filament into the interior die chamber comprises scoop end 62. Inserted through each filament entry 58 is a filament 64 that extends through channel 60 and is introduced by scoop end 62 into filament placement chamber 54. A portion of filament placement chamber 54 is shown in FIG. 8 with a circular cross-section; however, filament placement chamber 54 can have any cross-section, length, or shape necessary to manufacture a desired article.

FIG. 8 shows filament placement chamber 54 tapering to have an increasingly smaller diameter towards the exit end of filament placement chamber to provide means for maintaining back pressure on the system. Back pressure assists in maintaining constant pressure within the filament placement chamber or die, which improves the compaction of the hydraulically settable mixture and the resulting interface between the hydraulically settable matrix and the filaments. Compaction of the hydraulically settable mixture around the filaments results in better encapsulation of the filaments, increased uniformity, and fewer voids within the mixture, which collectively optimize the interface between the filaments and the hydraulically settable mixture and help to securely anchor the filaments within the hardened article. The back pressure within filament placement chamber 54 effectively fills any grooves or perforations created by the penetrating filaments as they enter and cut through the hydraulically settable structural matrix during placement, usually by wound filaments. It is particularly desirable to provide adequate back pressure when filament placement chamber 54 is long and when large amounts of filaments are incorporated into the hydraulically settable structural matrix.

The placing means shown in FIGS. 8–10 are rotatable to provide means for winding filaments into a helical or spiral configuration within the hydraulically settable matrix as the hydraulically settable mixture is extruded. A means for rotating the placing means (not shown in FIGS. 8–11) rotates the placing means around filament placement chamber 54. The placing means can also remain stationary or in a fixed position to yield filaments of a generally parallel configuration extending along the same axis as the extrusion direction. The placing means can have any shape necessary to place non-cylindrical or odd-shaped filaments, such as rovings or mats.

As the mixture is extruded, it passes around scoop ends 62 (as depicted in the longitudinal cross-section of FIG. 9), encapsulates the filaments extending from scoop ends 62, and pulls the filaments in the extrusion direction 56. The filaments are pulled from the scoop ends 62 due to the internal friction or viscosity of the hydraulically settable mixture. Upon curing of the hydraulically settable mixture, the filaments are securely incorporated within the hydraulically settable matrix, thereby providing the aforementioned reinforcement and strength properties. The filaments and the hydraulically settable mixture together form a continuous article 66 or extrudate of any desired length. The extrudate can also be cut into smaller articles of any desired length, thereby permitting continuous production of even relatively small articles. By way of example only, article 66 being formed in FIG. 9 is a rod or a bar.

The design of the placing means assists in determining the configuration of the filaments within the mixture and the placement depth of the filaments within the hydraulically settable matrix. Depicted in FIG. 10 is a transverse cross-section view taken along cutting plane line 10—10 of FIG. 9 depicting scoop ends 62 extending into filament placement chamber 54 and the perimeter 68 of article 66 after it is extruded. The placement depth is determined, at least in part, by the length of the portion of the placing means that extends into filament placement chamber 54. Placement depth is also increased by increasing the tension of the filament.

The angle of the placing means, which directly corresponds to the exit angle of the filament (i.e., the angle in which the filament exits the placing means), can also affect the strain on the filament as it is wound into the hydraulically settable mixture. In general, strain on the filaments is minimized by minimizing the difference between the winding angle and the exit angle of the filament. The difference is minimized by designing the placing means to yield an exit angle which is substantially the same as the winding angle. Increasing the difference between the exit angle and winding angle of the filament tends to increase the friction between the filament and the placing means, thereby creating more tension on the filament being placed. As stated above, increasing the tension of the filament will generally increase the placement depth of the filament, often in an unwanted fashion.

Figure 11:
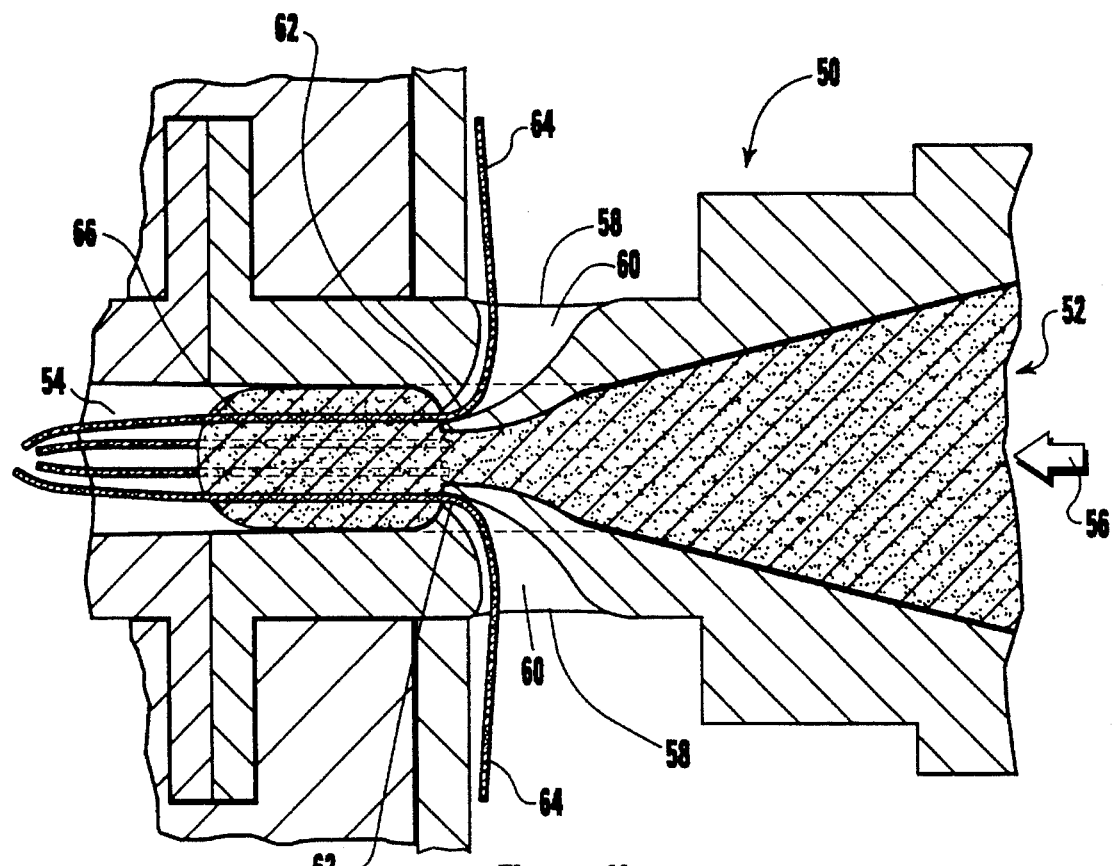
FIG. 11 is a longitudinal cross-section view of an apparatus for placing filaments into a hydraulically settable mixture while simultaneously extruding the hydraulically settable mixture, which illustrates the mixture encapsulating the filaments which are being placed in a parallel configuration by a placing means having scoop ends.
Figure 12:
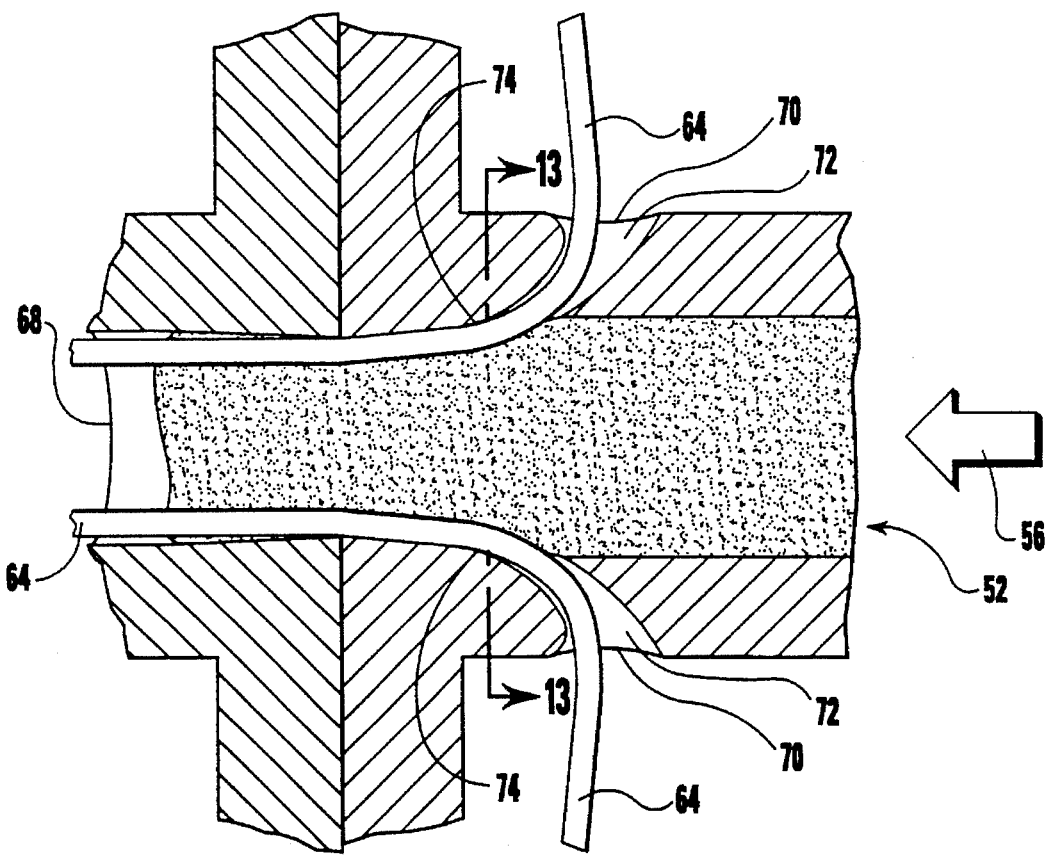
FIG. 12 is a longitudinal cross-section view of an apparatus for placing filaments into a hydraulically settable mixture while simultaneously extruding the hydraulically settable mixture, which illustrates the mixture encapsulating the filaments which are being placed in a parallel configuration by a placing means having nib ends.
Figure 13:
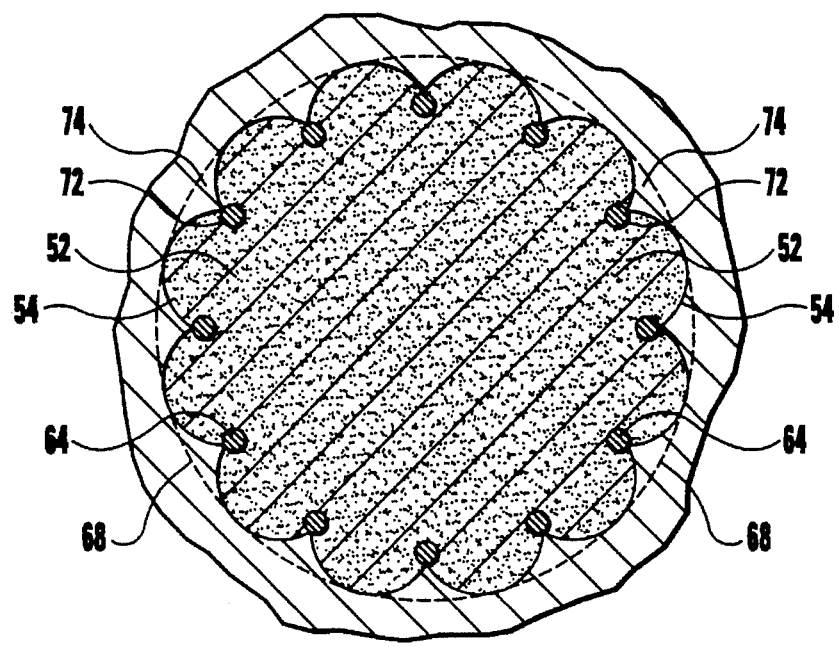
FIG. 13 is a transverse cross-section view of an apparatus for placing filaments into a hydraulically settable mixture while simultaneously extruding the hydraulically settable mixture taken along cutting plane line 13—13 of FIG. 12, which illustrates the placement of filaments by a placing means having nib ends.
Figure 14:
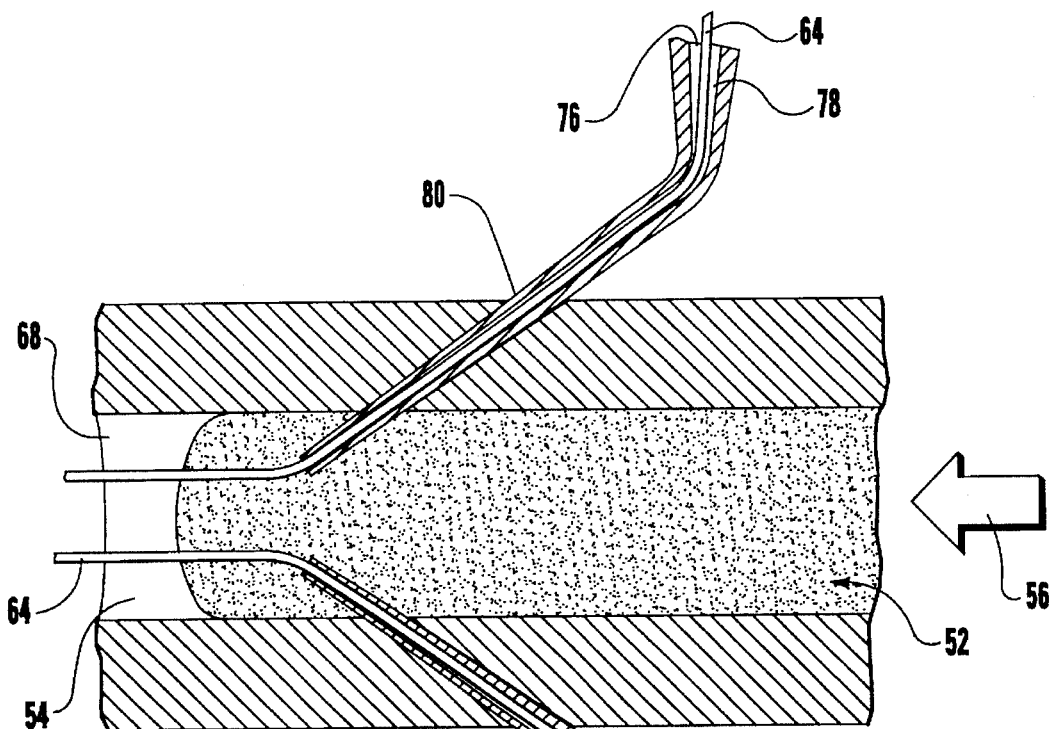
FIG. 14 is a longitudinal cross-section view of an apparatus for placing filaments into a hydraulically settable mixture while simultaneously extruding the hydraulically settable mixture, which illustrates the mixture encapsulating the filaments which are being placed in a parallel configuration by a placing means having hollow needles.

As discussed above, the placing means shown in FIGS. 8–10 can also remain fixed, as shown in FIG. 11, which depicts a longitudinal cross-section view of an apparatus to yield filaments in a parallel configuration extending along the longitudinal axis of the filament placement chamber 54. Other embodiments of the placing means are shown in FIGS. 12, 13 and 14, which can also be rotated or remain stationary. FIG. 12 is a longitudinal cross-section view of the apparatus having a placing means comprising a filament entry 70, a channel 72, and an introducer comprising a nib end 74. The placing means in FIG. 12 remains stationary to form a parallel configuration of filaments within the hydraulically settable matrix. Depicted in FIG. 13 is a transverse cross-section view of the placing means and filament placement chamber 54 shown in FIG. 12 taken along cutting plane 13—13 of FIG. 12, which depicts nib ends 74 extending into filament placement chamber 54 and the shape of the article after it is extruded.

FIG. 14 illustrates a longitudinal cross-section view of another embodiment of the placing means. Each placing means in FIG. 14 comprises a filament entry 76, a channel 78, and an introducer comprising a hollow needle 80. The placing means shown in FIG. 14 can be incrementally positioned deeper into filament placement chamber 54 to help vary the placement depth of the filaments within the hydraulically settable structural matrix. The placing means embodied in FIGS. 8–14 are illustrative and not restrictive and may be embodied in any other structure or structures capable of placing filaments within the hydraulically settable structural matrix.

The strength of the article being formed can be further increased by placing more filaments into the mixture by one or more additional sets of placing means that are offset from the first set of placing means. For example, a second filament can be placed closer to the surface of the matrix compared to a previously placed filament. Additionally, multiple sets of placing means which are rotatable or fixed can be used in combination to place filaments into a variety of combinations or configurations. For example, filaments can be wound into a hydraulically settable mixture in the opposite direction of filaments which have been previously wound.

Figure 15:
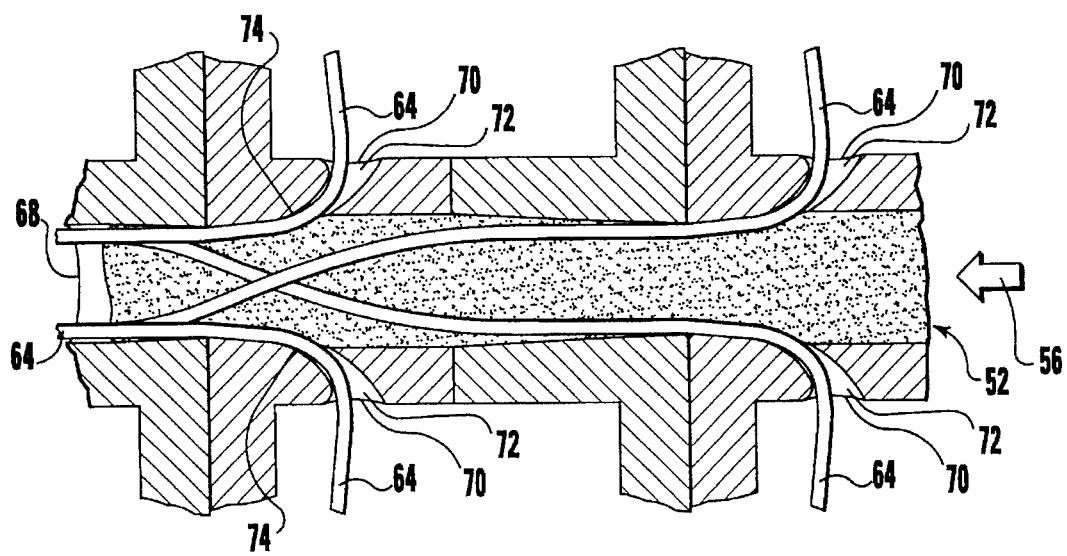
FIG. 15 is a longitudinal cross-section view of an apparatus for placing filaments into a hydraulically settable mixture while simultaneously extruding the hydraulically settable mixture, which illustrates the placement of filaments in a criss-cross configuration by two sets of rotatable placing means.

Depicted in FIG. 15 is a longitudinal cross-section view of apparatus 50 extruding the hydraulically settable mixture 52 in the extrusion direction indicated by arrow 56, while simultaneously placing filaments 64 in a "criss-cross" configuration within the hydraulically settable mixture 52. Two sets of rotating placing means comprising filament entry 70, channel 72, and nib end 74 rotate in opposite directions to wind filaments within the structural matrix in opposite directions, resulting in a criss-cross configuration of filaments.

Figure 16:
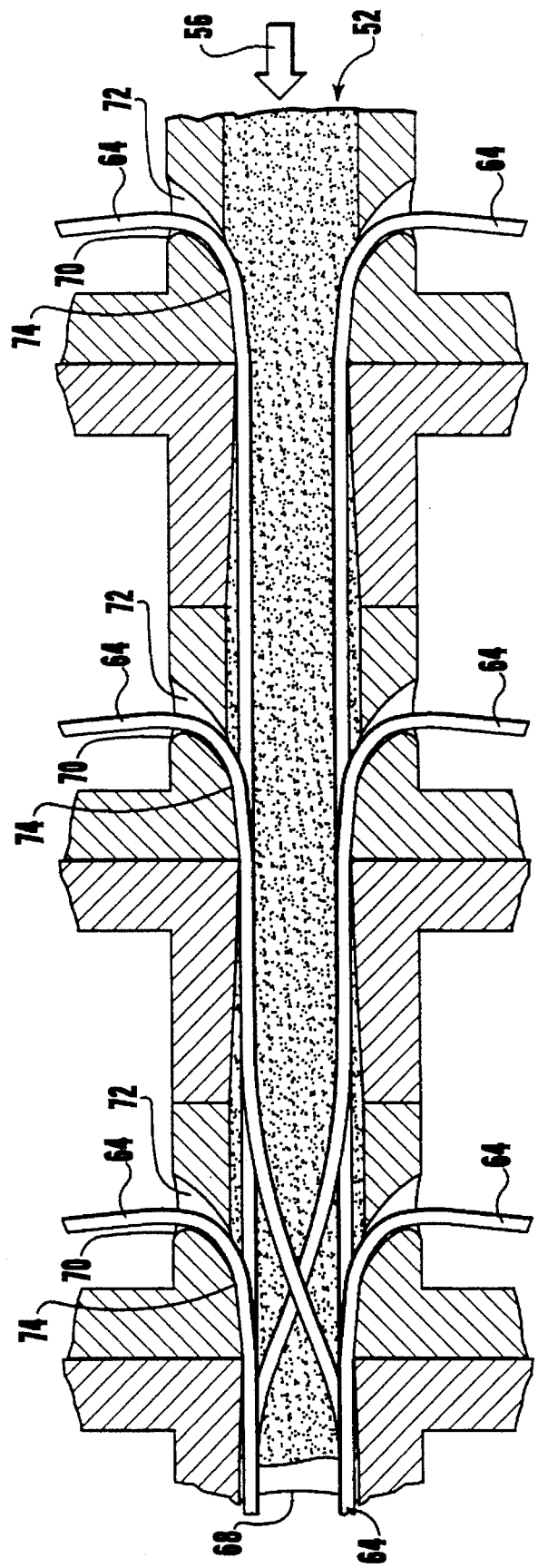
FIG. 16 is a longitudinal cross-section view of an apparatus for placing filaments into a hydraulically settable mixture while simultaneously extruding the hydraulically settable mixture, which illustrates the placement of filaments in a parallel configuration by a set of fixed placing means and in a criss-cross configuration by two sets of rotatable placing means.

Depicted in FIG. 16 is a longitudinal cross-section view of apparatus 50 extruding the hydraulically settable mixture 52 in the extrusion direction 56, while simultaneously placing filaments 64 in a parallel configuration and a criss-cross configuration within the hydraulically settable mixture 52. In the extrusion direction 56, filaments are first placed by fixed placing means comprising filament entry 70, channel 72, and nib ends 74 in a parallel configuration. Filaments are placed over the parallel filaments in a criss-cross configuration by two sets of rotating placing means, which also comprise filament entry 70, channel 72, and nib ends 74, and which rotate in opposite directions to wind the filaments within the hydraulically settable mixture in opposite directions.

Although typically the greater the absolute strength of the filaments the fewer the filaments that will be needed, the filaments are preferably sufficiently dispersed throughout the article to distribute the desired strength properties throughout the entire article. One skilled in the art of materials science will be able to determine in advance, or through minimal testing based on the teachings herein, the actual size, strength, number, and orientation of the filaments that should be placed within the hydraulically settable matrix in order to obtain the desired properties.

It may also be desirable to place different types of filaments within the same article. Additionally, other materials can be coextruded with the hydraulically settable mixture and filaments. The hydraulically settable mixture and filaments can be coextruded around a material or a material can be coextruded around the mixture and the filaments. The mixture and the filaments can, for example, be coextruded around lead to form pencils or a coating can be coextruded around the mixture and the filaments.

One of the primary benefits of the methods and apparatus of the present invention is the ability to form articles having a variety of shapes with any type and quantity of filament selectively positioned within the articles. The shape of the article is determined primarily by the shape of the filament placement chamber 54 and any mandrels included within filament placement chamber 54 for introducing a cavity or hollow space within the extruded article. The configuration or spatial orientation of the filaments placed within the hydraulically settable structural matrix depends on the design of the placing means, including the depth at which the filaments are introduced, as well as the speed at which the placing means are rotated.

Figure 17:
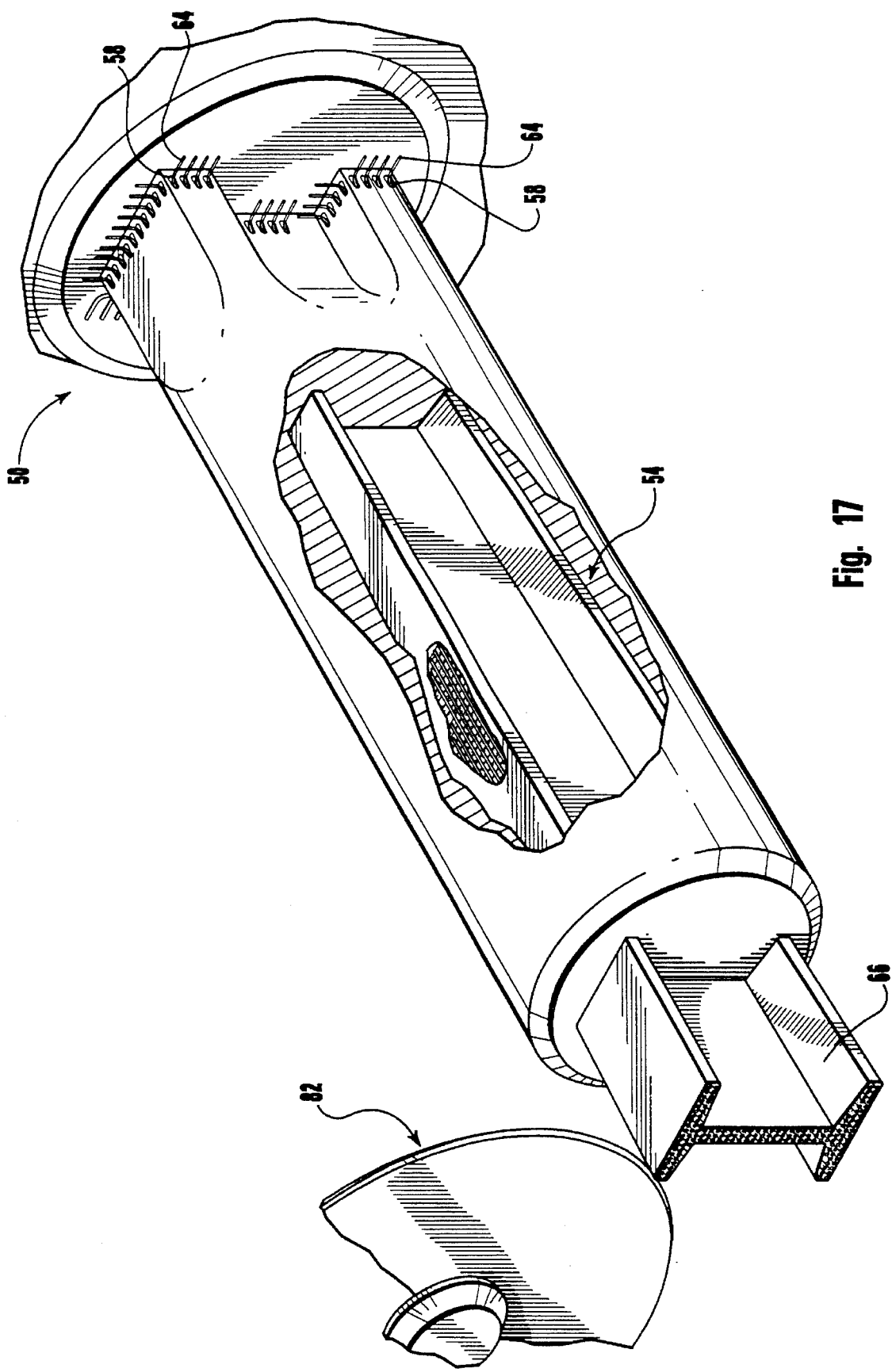
FIG. 17 is a perspective view of an apparatus with a cut-away view of an I-beam shaped filament placement chamber, which illustrates the formation of a hydraulically settable I-beam with filaments placed in a parallel configuration along the length of the I-beam.

In designing a desired article, the filament is selected and the filament configuration is determined based primarily on the stresses to which the article will be subjected. For example, an I-beam that will be subject to transverse loading would preferably have filaments positioned at a distance from the centroidal axis in the portion of the member subject to tension, thereby increasing the flexibility of the beam and the peak load to failure. FIG. 17 depicts a perspective view of apparatus 50 having placing means located around an I-shaped filament placement chamber 54, which is shown in a cut-away view. Apparatus 50 in FIG. 17 is shown forming an article 66 shaped as a continuous I-beam. The continuous extrudate or article can be cut into an individual I-beam by a means for cutting the extrudate. The cutting means can comprise a spinning blade 82, a fixed blade such as a guillotine, a saw, or any other structure capable of cutting through the hydraulically settable structural matrix and filaments therein.

Figure 18:
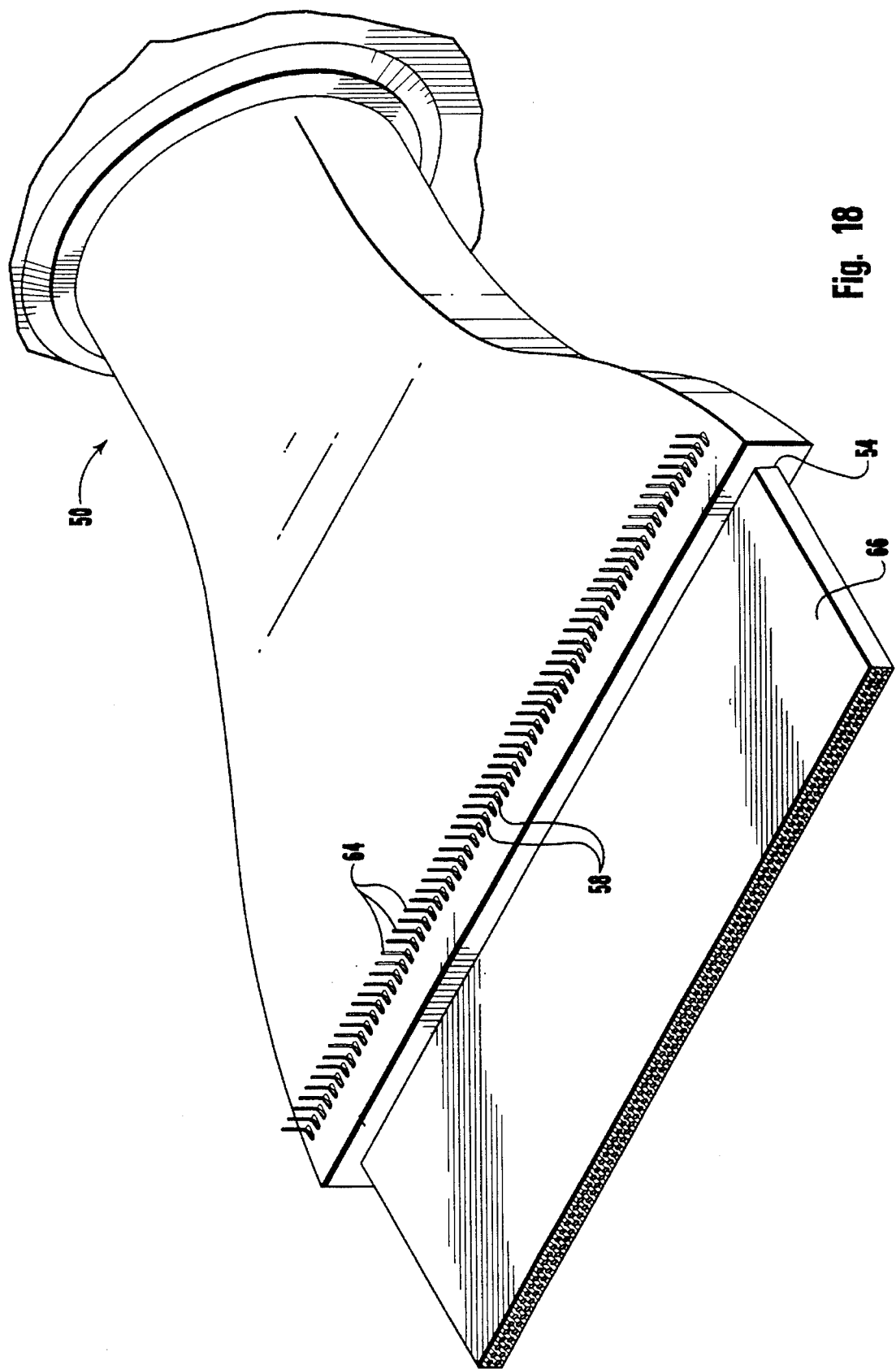
FIG. 18 is a perspective view of an apparatus forming a hydraulically settable sheet with filaments placed in a parallel configuration along the length of the sheet.
Figure 19:
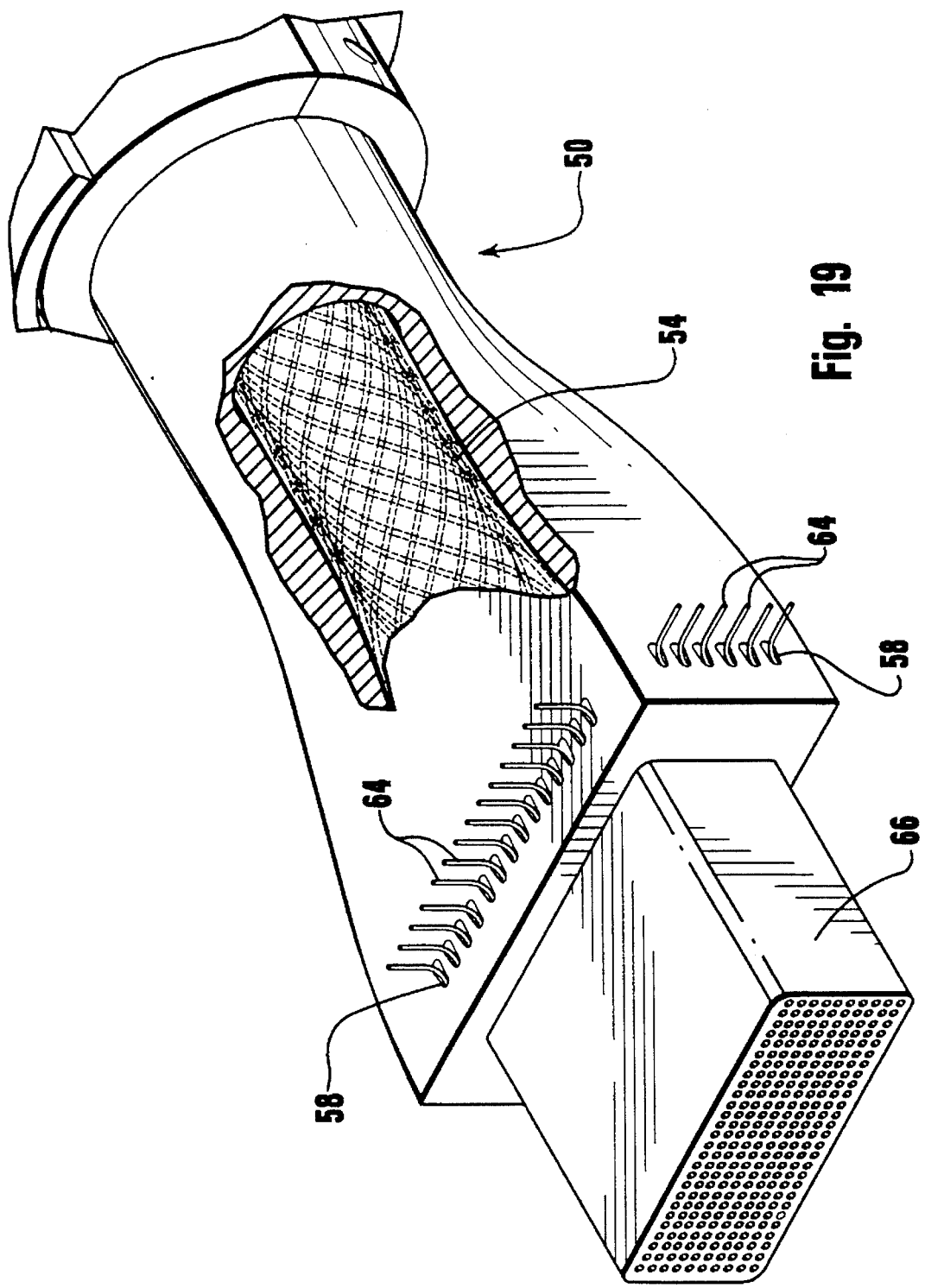
FIG. 19 is a perspective view of an apparatus with a cut-away view of a filament placement chamber having a circular cross-section along its length and a rectangular cross-section at the exit end of the filament placement chamber, which illustrates the formation of a hydraulically settable article having a rectangular cross-section with filaments placed in a helical configuration along the longitudinal axis of the article and filaments placed in parallel configuration in the corners and the perimeter of the article.
Figure 20:
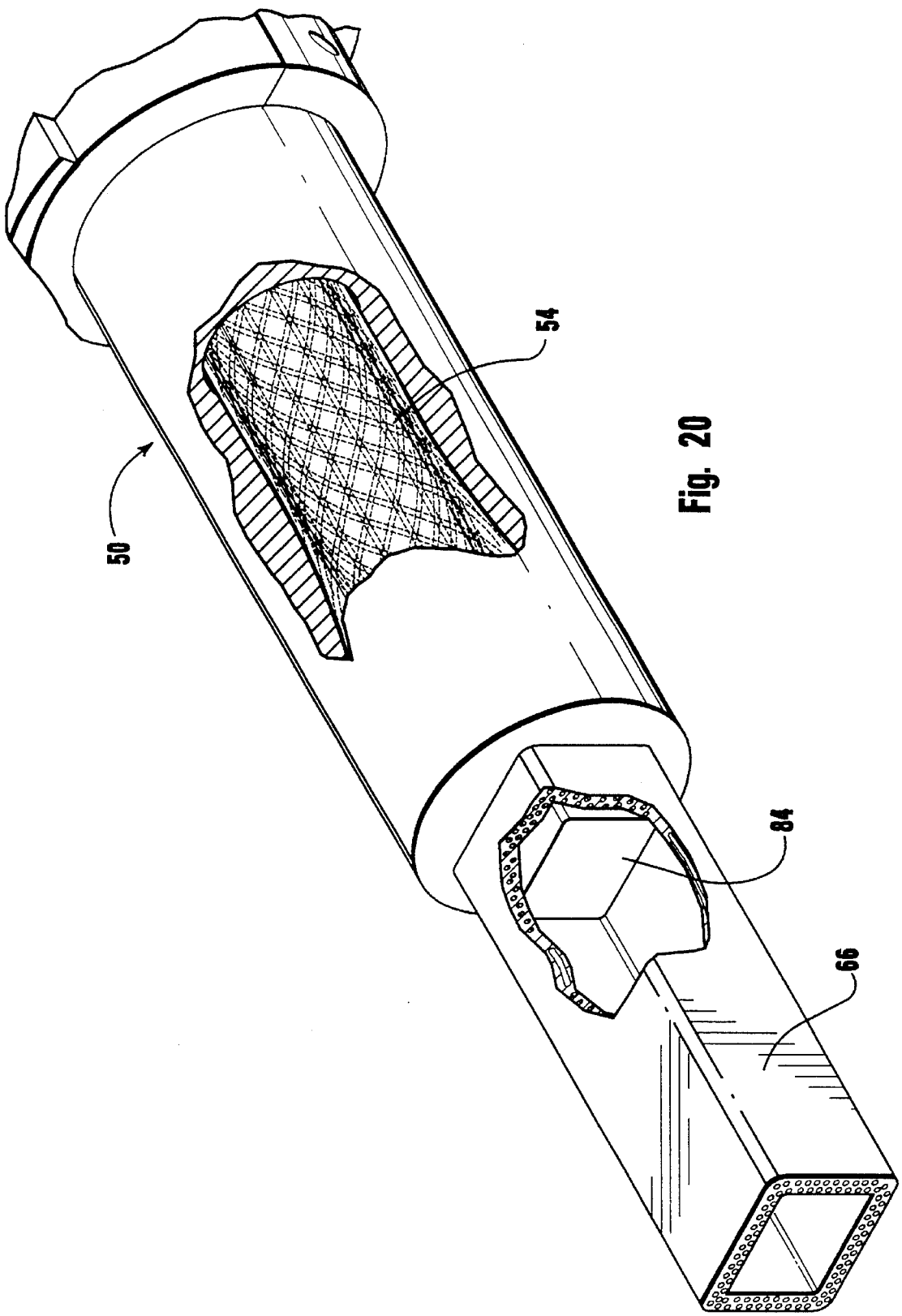
FIG. 20 is a perspective view of an apparatus with a cut-away view of a filament placement chamber having a circular cross-section which transcends gradually along its length to having a square cross-section at the exit end of the filament placement chamber, and a mandrel is shown in the filament placement chamber that also transcends from having a circular cross-section to a square cross-section, which illustrates the formation of a tubular hydraulically settable article having a hollow square cross-section with filaments placed in a helical and parallel configuration around the longitudinal axis of the article.

Articles, such as boards, "two-by-fours", plywood, counter tops, corrugated structures, flat sheets, and roofing tiles can be formed by extruding a hydraulically settable mixture and placing filaments in a parallel configuration within the matrix. FIG. 18 is a perspective view of apparatus 50 with a slit-shaped filament placement chamber 54 and fixed placing means located around filament placement chamber 54, which illustrates the formation of a flat hydraulically settable sheet 66 with filaments in a parallel configuration.

Filaments can also be placed in a helical configuration within hydraulically settable articles that do not have a circular cross-section, such as boards. As depicted in the perspective view of apparatus 50 in FIG. 19, an article can be formed with a non-circular cross-section, yet have a matrix with a helical configuration of filaments. Apparatus 50 in FIG. 19 has a filament placement chamber 54 shown in a cut-away view having a circular cross-section throughout its length until it reaches or extends to the "exit end" or "exit die" which has a different cross-section in the shape of the desired article. The corners and the perimeter of the article can be reinforced with parallel filaments. Such articles can also be made by designing filament placement chamber 54 with a circular cross-section in the area of the rotatable placing means, which gradually transcends in the extrusion direction into a non-circular cross-section at the exit die.

A mandrel can also be positioned within filament placement chamber 54 to form tube-like articles with a hollow cross-section, such as pipes or tubes. The mandrel can have any shape and any cross-section as long as the mixture can be extruded around it. It may be desirable for the mandrel to be tapered, having a smaller diameter at the beginning of the filament placement chamber than at the end. The tapered mandrel enhances the ability of the system to maintain back pressure, which assists in compacting the mixture and increases the interface between the mixture and filaments.

Mandrels are also useful in forming tubular articles having a non-circular cross-section, such as rectangular tubes, with a structural matrix containing a helical configuration of filaments. As depicted in the perspective view of apparatus 50 in FIG. 20, such articles can be made by utilizing a filament placement chamber 54 shown in a cut-away view with a circular cross-section in the area of the rotatable placing means which gradually transcends to a non-circular cross-section and a mandrel 84, which also makes a similar transition from a circular cross-section to a non-circular cross-section. The mandrel 84 can also be designed to have cross-section areas of transitioning shapes along the length of the mandrel, the cross-sectional areas having an approximately equal perimeter, which enhances the shape and strength of the helical winding.

Figure 21:
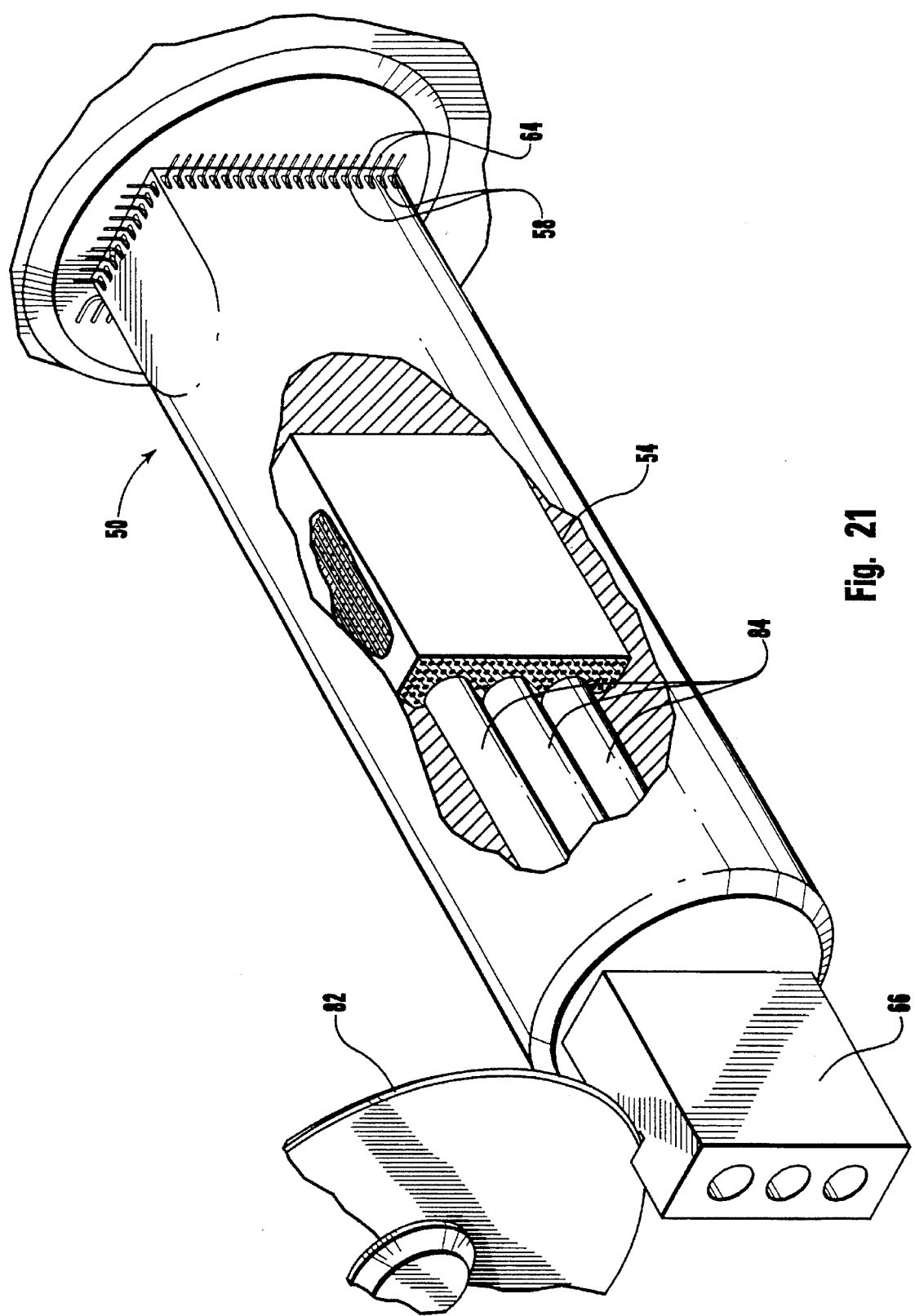
FIG. 21 is a perspective view of an apparatus with a cut-away view of a filament placement chamber containing multiple mandrels, which illustrates the formation of a hydraulically settable brick with filaments placed in a parallel configuration along the length of the brick.

Additionally, multiple mandrels can be positioned within the filament placement chamber to form multi-chambered articles such as hollow bricks, honeycomb, or other multi-cellular structures. FIG. 21 depicts hollow bricks being formed by an apparatus 50 having three mandrels 84, shown in a cut-away view of filament placement chamber 54, and placing means around filament placement chamber 54 having a rectangular cross-section. As with the other extrudates, the continuous "brick" can be cut into the desired length by cutting means, such as cutter 82, to form individual bricks.

FIGS. 22–29 show another embodiment of apparatus 50 capable of placing filaments into helical configurations, criss-cross configurations, parallel configurations, or combinations thereof. Filaments can be placed by apparatus 50, as shown in FIGS. 22–29, during the extrusion of a hydraulically settable mixture. The simultaneous placement of filaments and extrusion of the hydraulically settable mixtures enables the continuous production of articles reinforced with spiral wound filaments.

Figure 22:
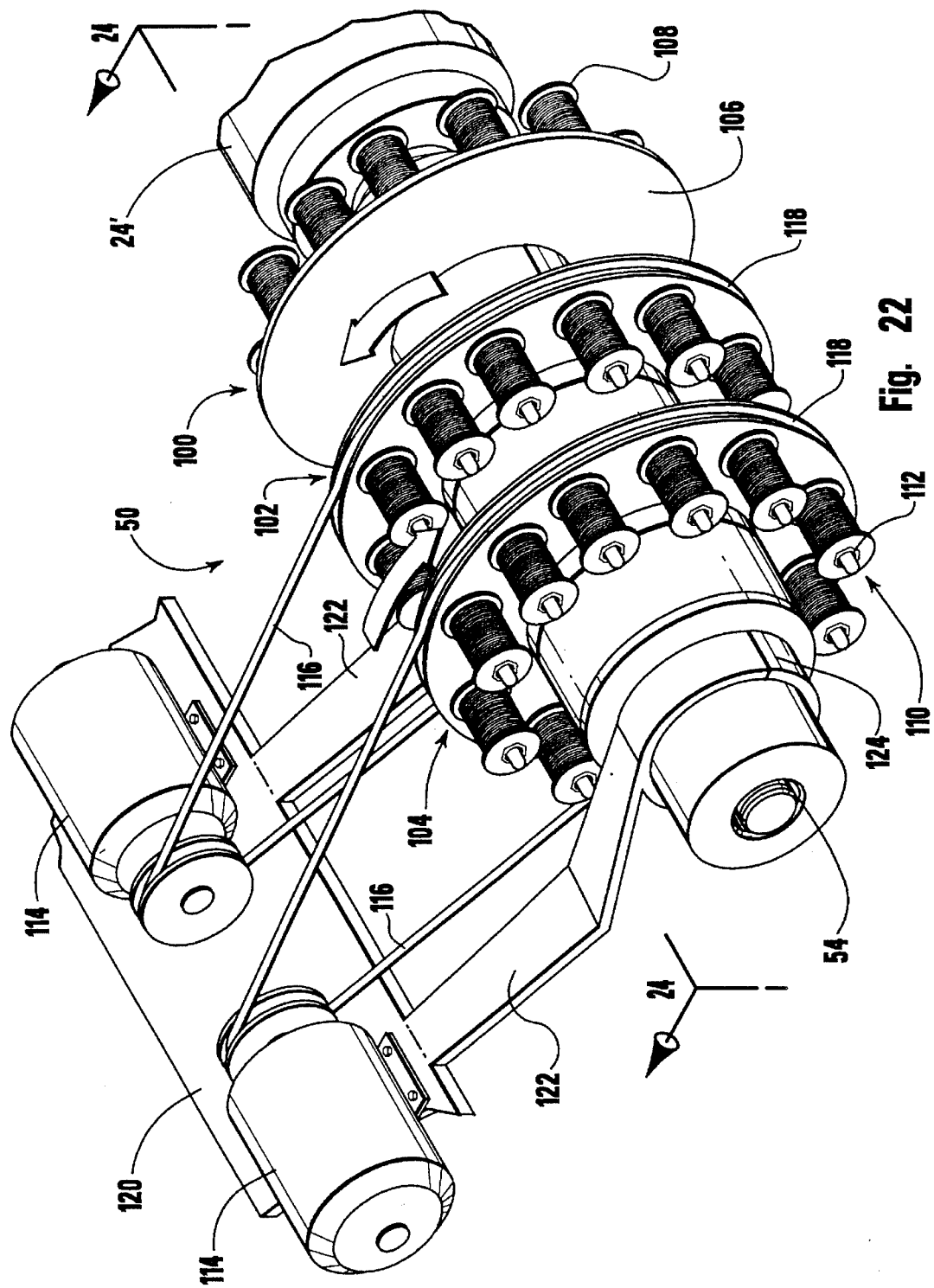
FIG. 22 is a perspective view of an apparatus for placing filaments into a hydraulically settable mixture while simultaneously extruding the hydraulically settable mixture.
Figure 23:
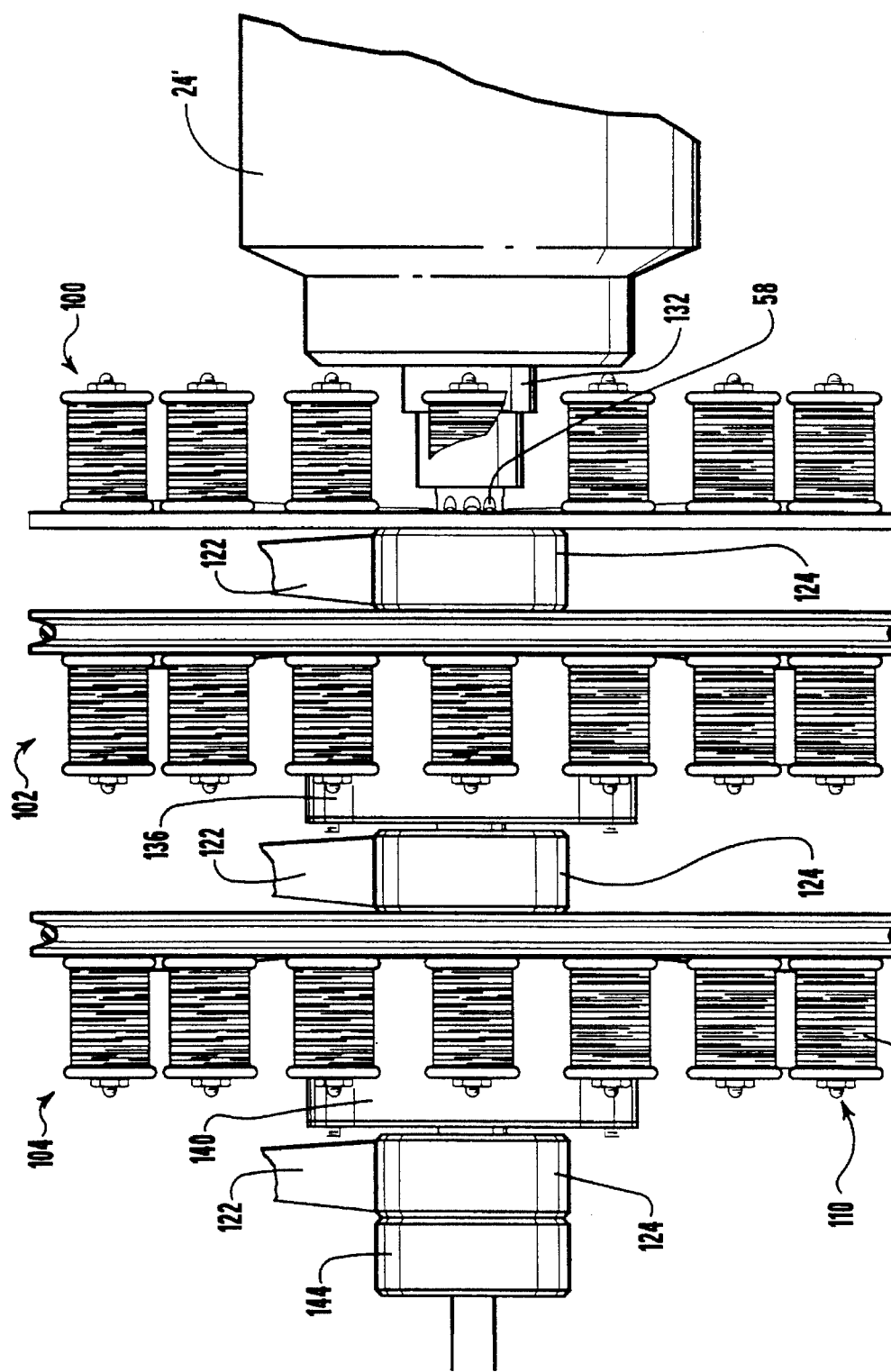
FIG. 23 is a side elevational view of an apparatus for placing filaments into a hydraulically settable mixture while simultaneously extruding the hydraulically settable mixture.

FIG. 22 is a perspective view, and FIG. 23 is a side elevational view, showing apparatus 50 having a filament placement chamber 54 in direct communication with an interior chamber 24' of a piston extruder. Disposed around filament placement chamber 54 are three feeder rings, as shown generally at 100, 102 and 104, comprising means for storing and continuously providing filaments 64 to the placing means (not shown in FIGS. 22 and 23), which, in turn, introduces the Filament into filament placement chamber 54. A set of fixed placing means are disposed around filament placement chamber 54, which receives filaments from fixed feeder ring 100. One set of rotatable placing means receives filament from and rotates with rotatable feeder ring 102. Another set of rotatable placing means receives filaments from rotatable feeder ring 104, which rotate together in the opposite direction of the other set of rotatable placing means.

Each feeder ring comprises a feeder ring frame 106 and at least one filament dispenser or creel, such as filament spools 108. The filament dispensers are positioned on feeder rings 100, 102, 104. A filament dispenser can also be utilized without the feeder rings to comprise a means for storing and continuously providing filaments to a placing means. By way of example and not limitation, a filament dispenser which can store and continuously provide filaments without being positioned on a feeder ring is a conventional creel used in conventional filament winding methods.

The filament dispenser can either freely rotate on a spindle without tension, or else a tensioning means for varying filament tension can be utilized to vary the tension of the filaments 64 being dispensed from the filament dispensers, such as tensioner 110. Each tensioner 110 in the embodiment shown in FIG. 22 comprises a hollow spindle (not shown) with inner threads (not shown) to receive a threaded bolt (not shown) with a bolt head 112 capable of engaging the top of filament spool 108. Increasing or decreasing the contact between the top of filament spool 108 and bolt head 112, usually by tightening and loosening the threaded bolt, varies the tension of the filament being dispensed. The tensioner may also comprise a spring positioned around the spindle and between bolt head 112 and filament spool 108. Another embodiment of the tensioning means includes motorized movement of the spools 108.

Means for rotating the placing means engage the rotatable feeder rings 102 and 104, which are rigidly attached to the rotatable placing means, and thereby rotate the rotatable placing means. The embodiment of the rotating means shown in FIG. 22 comprises a motor 114, a belt 116, and a groove 118 on each respective rotatable feeder ring for receiving belt 116. Each motor 114 moves each belt 116, which in turn rotates the respective rotatable feeder ring. The motors 114 are mounted on a support frame 120, which is attached to the extruder (not shown). The support frame further supports the apparatus by members 122, which are attached to clamps 124.

Another embodiment of the rotating means comprises a motor which rotates a sprocket, which in turn engages the links of a chain, which also engage teeth located around the feeder ring to thereby rotate the rotatable feeder ring. An additional embodiment of the rotating means comprises a motor which rotates a sprocket that directly engages teeth located around the feeder ring to thereby rotate the rotatable feeder ring. The rotating means may be digitally controlled for improved accuracy. The rotating means also includes controls with a feedback mechanism to monitor and control the rotation rate in relation to the extrusion rate. The rotating means may be embodied in any other structures capable of rotating the placing means directly or by rotating a feeder ring attached to the placing means. The rotating means described above are, of course, merely illustrative and not restrictive.

Figure 24:
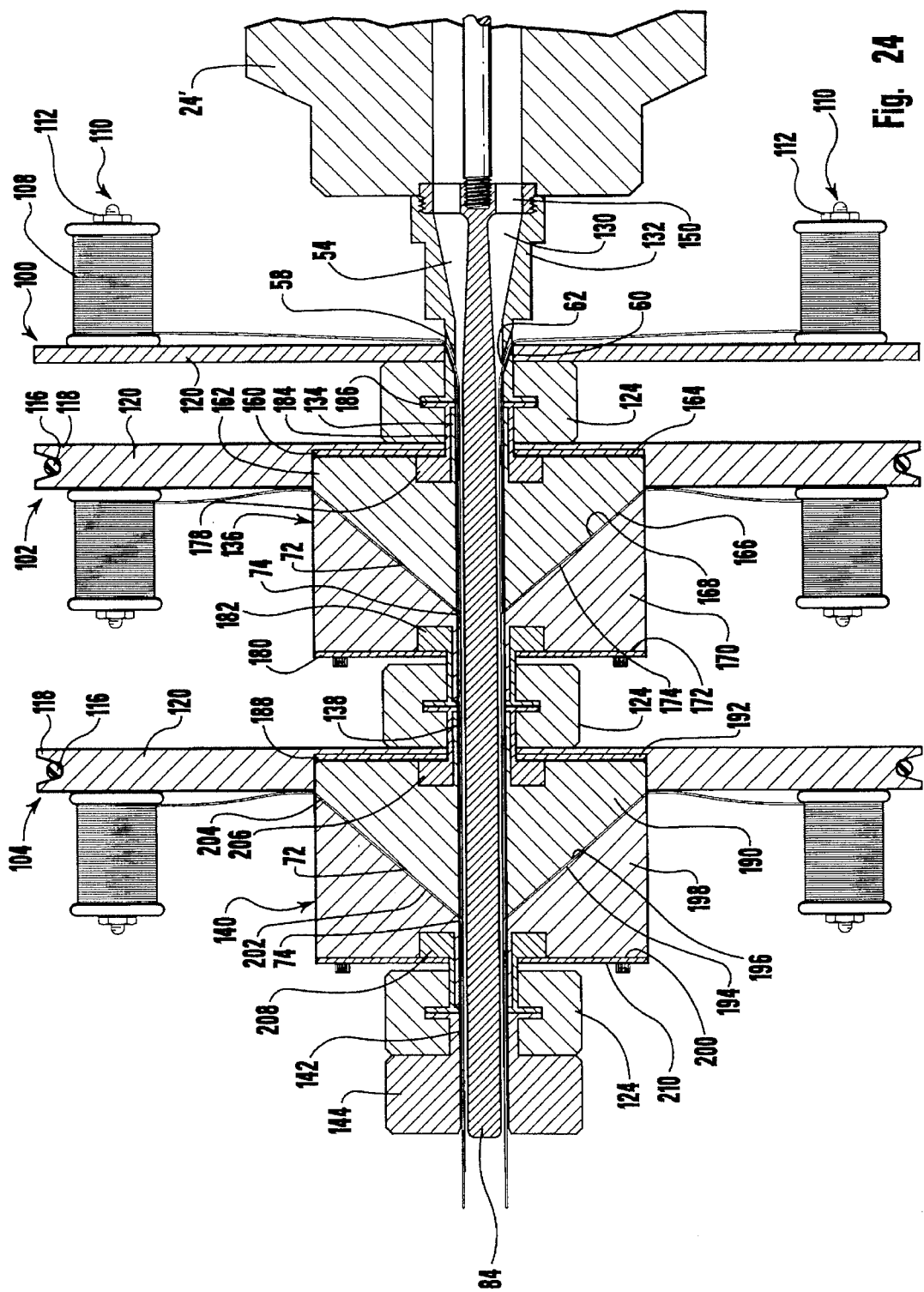
FIG. 24 is a longitudinal cross-section view of an apparatus for placing filaments into a hydraulically settable mixture while simultaneously extruding the hydraulically settable mixture taken along cutting plane line 24—24 of FIG. 22.
Figure 25:
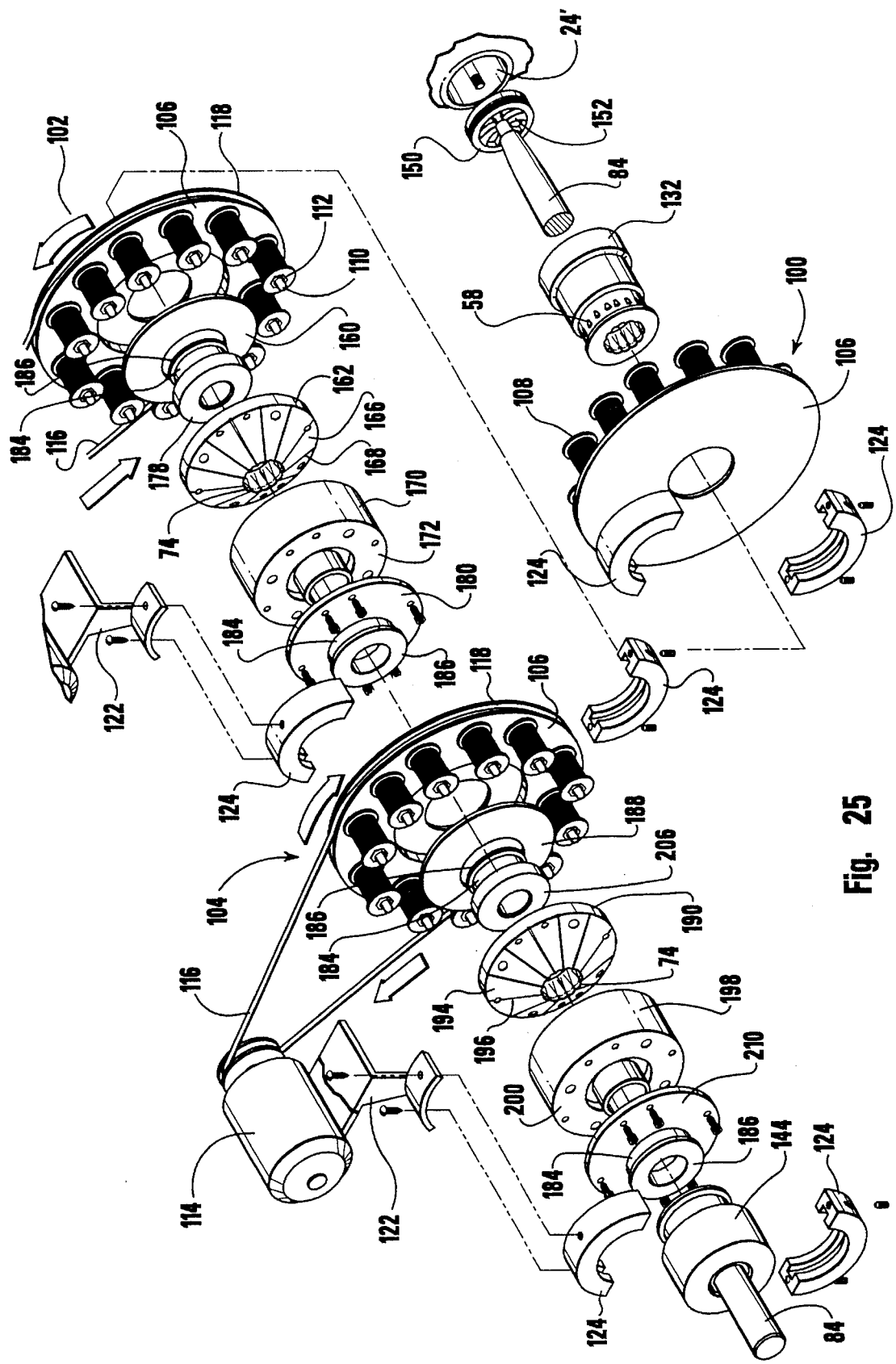
FIG. 25 is an exploded perspective view of an apparatus for placing filaments into a hydraulically settable mixture while simultaneously extruding the hydraulically settable mixture.

The components of apparatus 50 and the path of the hydraulically settable mixture through apparatus 50 are best viewed in FIGS. 24 and 25. Referring to FIG. 24, which depicts a cross-section view of the apparatus 50 taken along cutting plane line 24—24 of FIG. 22, and to FIG. 25, which depicts an exploded perspective view of the apparatus, filament placement chamber 54 is defined by a bore 130 of an entrance die 132, a bore 134 of a rotatable channel carriage 136, a bore 138 of another rotatable channel carriage 140, and a bore 142 of an exit die 144. The hydraulically settable mixture is continuously extruded from the interior chamber 24' into bore 130 of entrance die 132 through bores 134 and 138 of rotatable channel carriages 136 and 140 and out of bore 142 of exit die 144.

The cross-sectional area of filament placement chamber 54 can be consistent along the entire length of filament placement chamber 54 or it can vary in size and shape. A cross-section of filament placement chamber 54 can have any shape including, without implied limitations, a round, square, elliptical, or triangular cross-section. In FIG. 24, filament placement chamber 54 is shown with a circular cross-section throughout the entire length of the filament placement chamber and a slightly decreasing diameter in the extrusion direction. The hydraulically settable mixture is extruded through one bore and into a bore having a smaller diameter than the previous bore to further compress the mixture and position the filament within the hydraulically settable structural matrix. As previously discussed, it is generally desirable for the cross-sectional area of the filament placement chamber to become increasingly smaller towards the exit end or die to maintain back pressure on the system, which assists in filling in the grooves created by the placement of filaments within the hydraulically settable structural matrix.

As shown at 84 in FIG. 24, the filament placement chamber can also be configured with a mandrel to form tubular articles, such as pipes. The mandrel can be untapered or tapered, as shown in FIG. 24, to assist in maintaining back pressure on the system and can be utilized with a filament placement chamber, which can be either tapered or untapered as explained above. When utilizing a mandrel with a piston extruder 20, it is necessary to attach the mandrel to extruder 20 with a spider 150 located between mandrel 84 and extruder 20. Spider 150 has tapered legs 152 radiating from the center to the perimeter, which allow the hydraulically settable mixture to flow around legs 152 and then come back together after passing around legs 152. Spider 152 is not necessary when apparatus 50 is attached to an auger extruder.

To achieve a parallel configuration of filaments within the hydraulically settable matrix, filaments are delivered from spools 108 on fixed feeder ring 100 into filament placement chamber 54 through fixed placing means located around entrance die 132. Fixed feeder ring 100 is disposed around and fixedly attached to entrance die 132. The hydraulically settable mixture passes from bore 130 of entrance die 132 and into bore 134 of rotatable channel carriage 136. Filaments are fed through filament entry 58 and channel 60 and delivered to scoop end 62 and then placed below the surface of the hydraulically settable matrix.

To achieve a helical or spiral configuration of filaments within the hydraulically settable matrix either rotatable feeder ring 102 or 104 can be rotated while simultaneously delivering filaments from spools 108 to the placing means which place the filaments in the matrix and rotate with the rotatable feeder rings. Rotatable feeder ring 102 delivers filaments to placing means located within rotatable channel carriage 136 which is fixedly attached to rotatable feeder ring 102 by a locking collar 160.

Rotatable channel carriage 136 comprises a front section 162 having a flat side 164 and a convex side 166 with grooves 168 and further comprising a back section 170 having a flat side 172 and a concave side 174. Convex side 166 of front section 162 and concave side 174 of back section 170 are bolted together in a mating relationship.

The filament entry 70, channels 72 and nib ends 74 located within rotatable channel carriage 136 comprise a placing means for placing the filaments within the hydraulically settable matrix. Channels 78 are formed by grooves 168 in convex side 166 and by concave side 174 when convex side 166 and concave side 174 are mated. The angle at which the filament enters into the hydraulically settable mixture can be varied by varying the pitch of convex side 166 and concave side 168.

Locking collar 160 retains a ball bearing assembly 178 within the flat side of the front section 162 and another locking collar 180 retains another ball bearing assembly 182 within flat side 164 of the back section 170. Each ball bearing assembly has a tubular neck 184 and a lip 186. The ends of bore 134 extend within and are concentric with the tubular necks 184 of both ball bearing assemblies 178 and 182. Lip 186 of ball bearing assembly 178 is positioned in a groove in clamp 124 with a lip 186 of entrance die 132. Ball bearing assembly 178 remains relatively stationary as rotatable channel carriage 136 rotates.

In the extrusion direction, the mixture is received from bore 130 of rotatable channel carriage 136 and into bore 138 of another rotatable channel carriage 140. Within bore 138, filaments are placed in the hydraulically settable mixture by the placing means comprising filament entry 70, channels 72 and nib ends 74 located within rotatable channel carriage 140. The filaments are delivered to the placing means from spools 108 on rotatable feeder ring 104 which is fixedly attached to rotatable channel carriage 140 by a locking collar 188.

Rotatable channel carriage 140 is shown being structurally identical to rotatable channel carriage 136. Rotatable channel carriage 140 comprises a front section 190 having a flat side 192 and a convex side 194 with grooves 96 and further comprising a back section 198 having a flat side 200 and a concave side 202. Convex side 194 of front section 190 and concave side 202 of back section 198 are bolted together in a mating relationship.

The placing means located within rotatable channel carriage 140 have filament entry 70, channels 72 and nib ends 74. Channels 72 are formed by grooves 204 in convex side 194 and by concave side 202 when convex side 194 and concave side 202 are mated. The angle at which the filament enters into the hydraulically settable mixture can be varied by varying the pitch of convex side 194 and concave side 202. The pitch of convex side 194 and concave side 202 can also be adjusted to reduce the strain on the filaments upon placement in the hydraulically settable mixture and to counter the back pressure of filament placement chamber 54.

Ball bearing assembly 206 is retained within the flat side 192 of the front section 190 by locking collar 188 and ball bearing assembly 208 is retained within flat side 200 of the back section 198 by locking collar 210. Ball bearing assemblies 206 and 210 have tubular necks 184 and lips 186. Rotating within necks 184 of ball bearing assemblies 206 and 208 is bore 138 of rotatable channel carriage 140 while ball bearing assemblies 206 and 208 remain relatively stationary Lip 186 of ball bearing assembly 182 is positioned in a groove in clamp 124 with lip 186 of ball bearing assembly 206.

The structures of rotatable channel carriages 136 and rotatable feeder ring 102 are structurally identical to rotatable channel carriage 140 and rotatable feeder ring 104, however, rotatable channel carriage 136 and rotatable feeder ring 102 rotate in the opposite direction of rotatable channel carriage 140 and rotatable feeder ring 104. Although the structures are shown in an identical configuration, the structures can also be different to vary the placement depth, the exit angle and the winding angle.

The hydraulically settable mixture and the filament pass from bore 138 of the rotatable channel carriage 140 into bore 142 of exit die 144 which forms the end of filament placement chamber 54. Exit die 144 has a lip 186 which is positioned in a groove of clamp 124 with lip 186 of ball bearing assembly 208. Ball bearing assembly 208 and exit die 144 remain relatively stationary as rotatable channel carriage 140 rotates.

In operation of apparatus 50, as the hydraulically settable mixture is extruded through filament placement chamber 54 the filaments placed by the placing means adhere to the hydraulically settable mixture at or near the surface of the extruding mixture, thereby causing the filaments to be drawn from the placing means as the mixture advances. The filaments can be delivered for placement within the matrix of an article by one feeder ring to obtain a desired filament configuration or by more than one feeder ring to obtain multiple configurations. A criss-cross configuration of filaments can be achieved when filaments are placed from placing means which are rotated with both rotatable feeder rings 102 and 104. Additionally, a criss-cross configuration and a parallel configuration of filaments can be placed within a hydraulically settable matrix delivering filaments to placing means from fixed feeder ring 100 and rotatable feeder rings 102 and 104.

Depicted in FIGS. 26, 27, 28 and 29 are perspective views of articles 66 being continuously extruded as pipes by apparatus 50 to have various configurations of filament within the pipes. The filament configurations are revealed in FIGS. 26–29 by shadow lines. FIGS. 26–29 illustrates various embodiments of apparatus 50 as shown in FIGS. 22–25 and the ability of the various embodiments to produce various configurations of filaments within an article.

Figure 26:
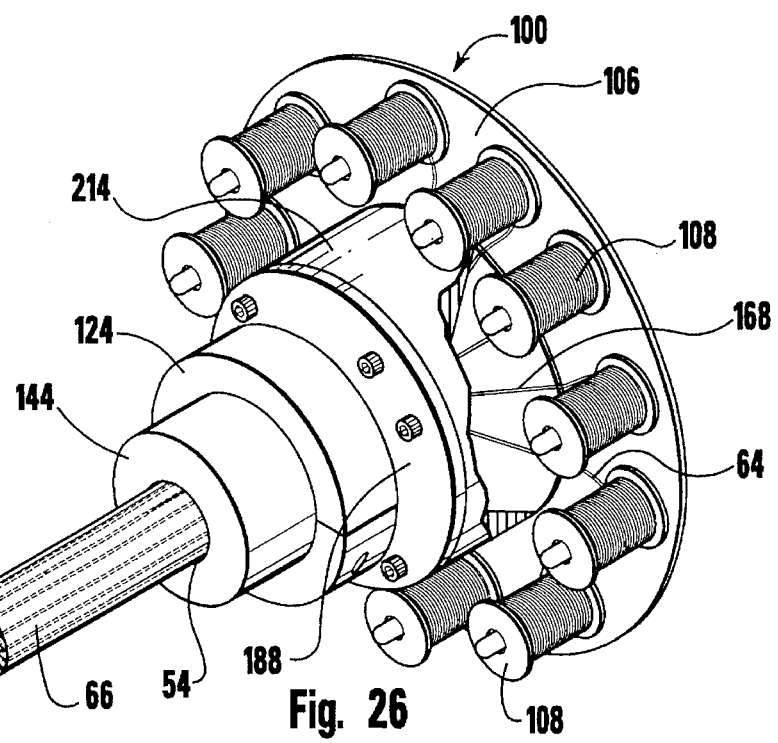
FIG. 26 is a perspective view of an apparatus forming a hydraulically settable pipe having filaments extending along the length of the pipe in a parallel configuration as placed by a set of fixed placing means in a fixed channel carriage shown in a cut-away view with filaments being dispensed from filament spools on a fixed feeder ring.
Figure 27:
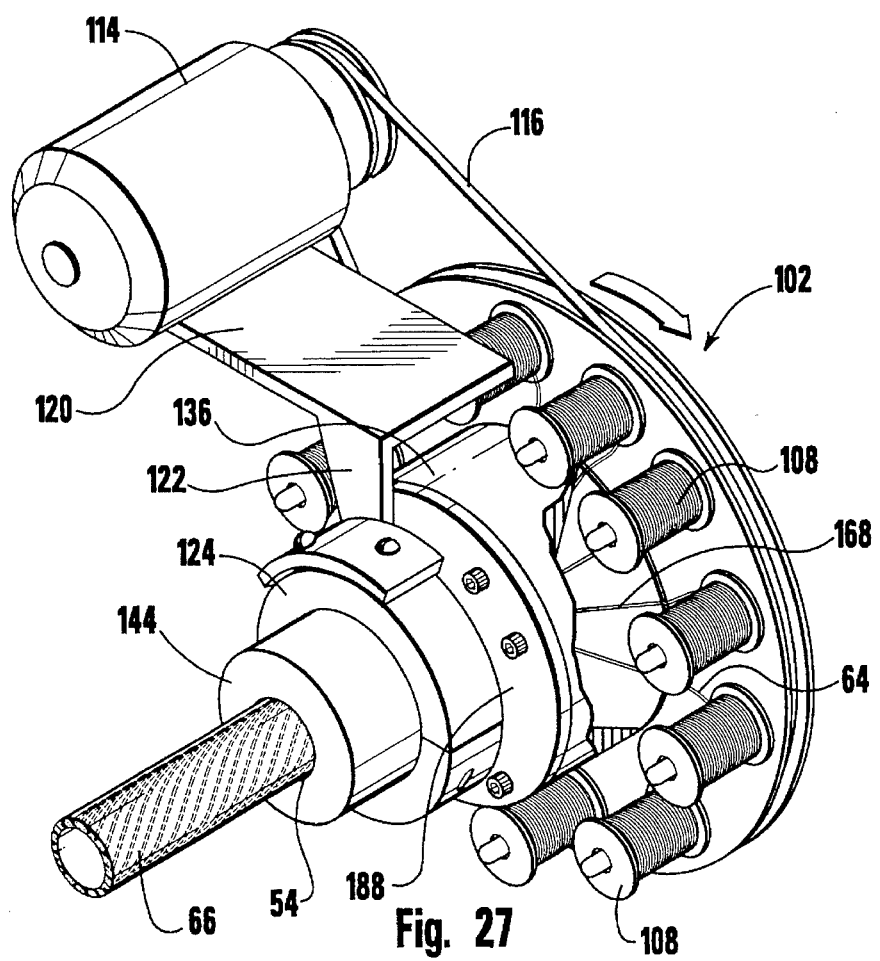
FIG. 27 is a perspective view of an apparatus forming a hydraulically settable pipe having filaments extending along the length of the pipe in a helical configuration as placed by a set of rotatable placing means in a rotatable channel carriage shown in a cut-away view with filaments being dispensed from filament spools on a rotatable feeder ring.

FIG. 26 shows a pipe having filaments extending along the length of the pipe in a parallel configuration as placed by a set of fixed placing means circumferentially disposed around filament placement chamber 54 in fixed channel carriage 214, which is shown in a cut-away view. A pipe is shown in FIG. 27 having filaments extending along the length of the pipe in a helical or spiral configuration as placed by a set of rotatable placing means circumferentially disposed around filament placement chamber 54 in rotatable channel carriage 136, which is shown in a cut-away view.

Figure 28:
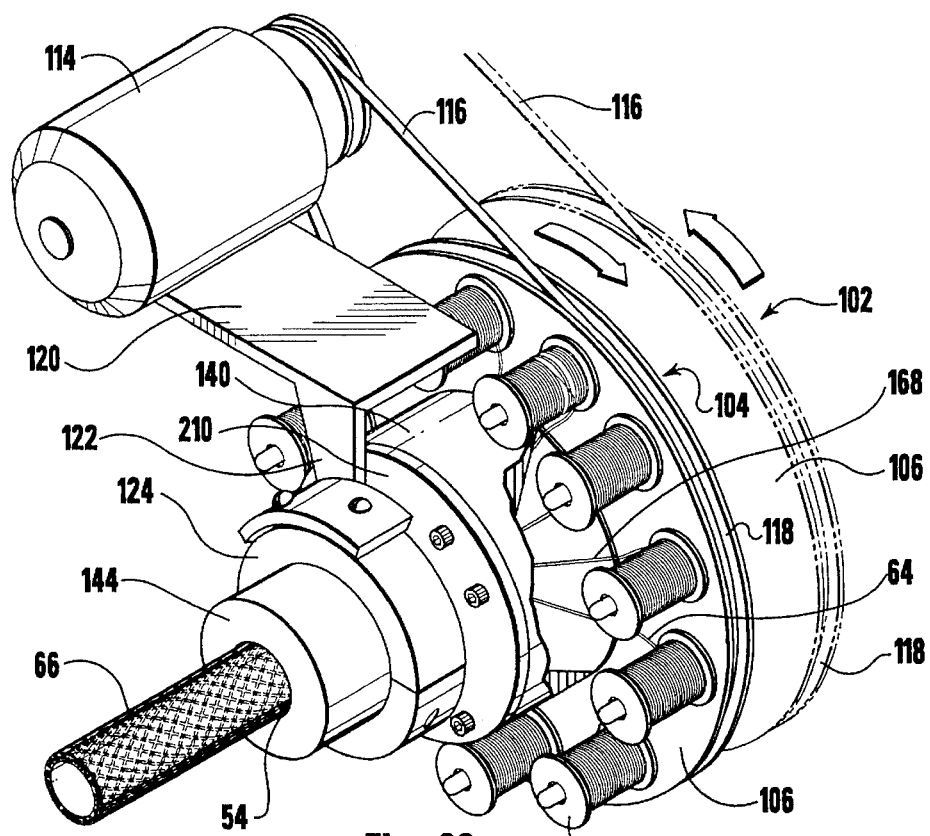
FIG. 28 is a perspective view of an apparatus forming a hydraulically settable pipe having filaments extending along the length of the pipe in a criss-cross configuration as placed by two sets of rotatable placing means, one set is in a rotatable channel carriage shown in a cut-away view with filaments being dispensed from filament spools on a rotatable feeder ring.
Figure 29:
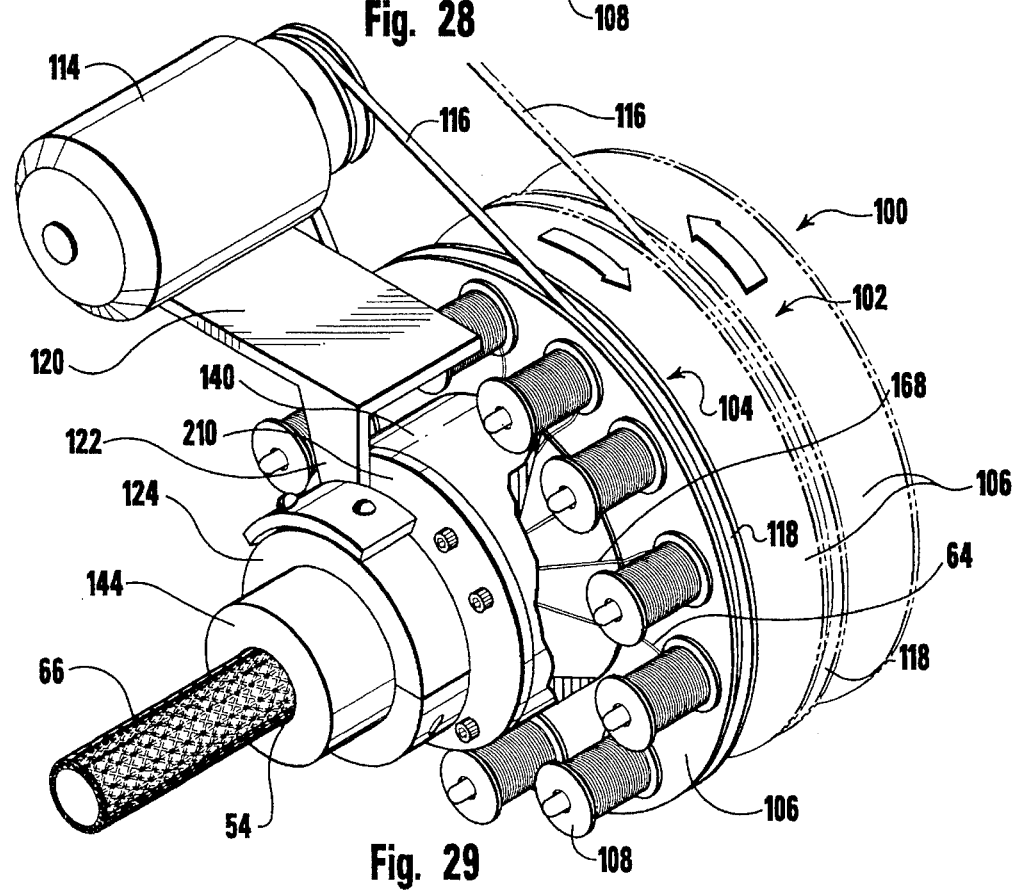
FIG. 29 is a perspective view of an apparatus forming a hydraulically settable pipe having filaments extending along the length of the pipe in a parallel configuration and a criss-cross configuration as placed by a fixed placing means and two sets of rotatable placing means, one set is in a rotatable channel carriage shown in a cut-away view with filaments being dispensed from filament spools on a rotatable feeder ring.

FIG. 28 shows a pipe having filaments extending along the length of the pipe in a criss-cross configuration. Filaments are dispensed from filament spools 108 positioned on rotatable feeder ring 106 to rotatable placing means located in rotatable channel carriage 140, shown in a cut-away view. Rotatable feeder ring 102 is illustrated by shadow lines to indicate that filaments are being dispensed to another set of rotatable placing means and placed in the mixture. FIG. 29 is similar to FIG. 28, however, apparatus 50 is shown with a fixed feeder ring 100 illustrated by shadow lines to indicate that filaments are being dispensed to a set of fixed placing means and placed in the mixture. The pipe shown in FIG. 29 has a parallel and criss-cross configuration of filaments extending along the length of the pipe as placed by the respective sets of placing means. The embodiment shown in FIG. 29 can also be utilized to achieve the same filament configurations as shown in FIGS. 26–28 by operating only one or two of the feeder rings in conjunction with the corresponding sets of placing means.

IV. EXAMPLES OF THE PREFERRED EMBODIMENTS.

To date, numerous tests have been performed comparing the rheological and extrusion properties of various hydraulically settable mixtures of varying composition. Below are specific examples of compositions which have been extruded according to the present invention. These actual examples also include a description of hypothetically placing filaments within the hydraulically settable mixtures during extrusion. Additionally, a number of hypothetical, or "prophetic", examples have been included based on actual mix designs that have been extruded or which would be expected, based on experience, to possess the properties described hereinafter. The actual examples are written in the past tense, while the hypothetical examples are written in the present tense in order to distinguish between the two.

In general, the examples are directed to placing filaments in hydraulically settable mixtures which employ varying levels of water deficiency and particle packing efficiency, along with varying amounts of, for example, hydraulically settable binder, aggregates, fibers, rheology-modifying agents, and other admixtures in order to obtain mixtures having varying flow properties when extruded under pressure, and varying degrees of form-stability once the article has been extruded and the pressure released.

EXAMPLES 1–9

Hydraulically settable mixtures having 4 kg of portland cement Type 1, 6 kg fine silica sand, 50 g Tylose® FL 15002, and varying amounts of water were prepared and then extruded through a die using a piston extruder. The fine silica sand had a natural packing density of about 0.55 and a particle size in the range from about 30–50 microns. When mixed with portland cement Type 1, which has an average particle size in a range from about 10–25 microns, the resulting dry mixture had a particle packing density of about 0.65, which represents only a moderate increase over the natural packing density of each. The natural packed volume of the cement and sand was 5.504 liter, with a porosity of 1.924 liter.

The amount of water in the mixtures was varied as follows in order to determine the extrudability of the mixture at varying levels of water deficiency:

| Example | Water | % Deficient | Extrusion Pressure |
|---|---|---|---|
| 1 | 3.0 kg | (55.9%) | 15 psi |
| 2 | 2.5 kg | (29.9%) | 15 psi |
| 3 | 1.924 kg | 0% | 45 psi |
| 4 | 1.905 kg | 1.0% | 100 psi |
| 5 | 1.65 kg | 14.2% | 300 psi |
| 6 | 1.443 kg | 25.0% | 820 psi |
| 7 | 0.962 kg | 50.0% | 1639 psi |
| 8 | 0.60 kg | 68.8% | 2131 psi |
| 9 | 0.40 kg | 79.2% | 3278 psi |

In Examples 1 and 2, the numbers in parentheses under the heading "% Deficient" indicates that an excess of water was used. That is, more water than the volume of interstitial space (or porosity, which was 1.924 liter) was added. As a result, these mixtures were characterized as "very fluid" and could not be extruded with sufficient form-stability so that the extruded objects would maintain their shape without external support. Similarly, although Examples 3 and 4 were less fluid and were characterized as "very soft" they could not be extruded into form-stable objects that would completely maintain their shape without external support. However, as the amount of water was further decreased, thereby increasing the water deficiency, the form-stability of the extruded material increased to the point where an extruded object would maintain its shape without external support.

The mixture of Example 5 was characterized as "soft" but could be extruded at relatively low pressure into an object having good form-stability. The mixtures in Examples 6–9 could be extruded by increasing the extrusion pressure as the amount of water was decreased, with increasing form-stability being observed as the amount of water decreased. As the water deficiency and extrusion was increased, the level of compaction of the mixture also increased, which resulted in greater packing of the particles together and higher density of the extruded material. After each of the mixtures was allowed to harden, the hardened material for each example had the following tensile strengths, respectively, expressed in MPa: 2.4, 3.1, 5.2, 15.2, 28.2, 30.3, 32.2, 35.0, and 38.0.

The placement of filaments within the mixtures substantially varies the properties of the mixtures and the final hardened articles formed therefrom, particularly the tensile strength of the articles. Any filaments can be used including fiberglass, aramid fibers, carbon fibers, graphite fibers, polyethylene fibers and other organic fibers.

The mixtures of Examples 5–9 were successfully extruded into honeycomb (i.e., multicellular) structures, bars, and window frames. The mixtures of Examples 6–9 were also extruded into pipes of varying wall thickness. The pipe extruded from the mixture of Example 7 had a wall thickness that was 25% of the pipe cavity; the pipe extruded from the mixture of Example 8 had a wall thickness that was 15% of the pipe cavity; and the pipe extruded from the mixture of Example 9 had a wall thickness that was 10% of the pipe cavity. The wall thickness can be further reduced by reinforcing the pipe with filaments.

EXAMPLES 10–13

To the mixtures of Examples 5–9 are added the following amounts of fiber, expressed as a percentage by volume of the total solids content of the hydraulically settable mixture:

| Example | Fiber |
|---------|-------|
| 10 | 1% |
| 11 | 2% |
| 12 | 3% |
| 13 | 4% |

The type of fiber that will be added depends on the properties and performance criteria of the extruded article. In general, however, increasing the tensile strength of the fiber will increase the tensile strength of the extruded article. Nevertheless, other factors such as aspect ratio, length, and reactivity with the hydraulically settable binder will affect the level of anchoring or pull-out of the fibers within the hydraulically settable matrix when subjected to stresses and strains. As the amount of fiber is increased, the tensile strength and ductility of the hardened extruded article also increase. The tensile strength and ductility of the article due to the fibers, however, is relatively small when filaments are placed in the hydraulically settable matrix.

EXAMPLE 14

The procedures of Examples 1–9 were repeated except that the amount of Tylose® FL 15002 within the hydraulically settable mixture was increased to 100 g prior to extrusion. The increased amount of Tylose® aided the extrusion process by increasing the lubrication between the particles themselves and between the particles and the extruder walls and diehead. In addition, the increased Tylose® increased the form-stability of the extruded articles somewhat, although not two-fold. The ability of the mixture to pull a filament is not substantially effected by increasing the amount of Tylose® as the viscosity is not greatly increased.

EXAMPLE 15

The procedures of Examples 1–9 were repeated except that 160 g of sulfonated naphthalene-formaldehyde condensate was added to the mixture as a dispersant. First the hydraulic cement, water, dispersant and at least part of the aggregate were mixed together using a high shear mixer for about 10 minutes. Afterward, the Tylose® FL 15,002 and the remaining aggregate, if any, were mixed into the mixture using a low shear mixer. The dispersant allowed for the obtaining of a more fluid mixture while maintaining the same level of water.

The resulting hydraulically settable mixtures have lower viscosity, which made them more easily extruded using lower pressures, compared to the mixtures of Examples 1–9. However, the lower viscosity tends to decrease the ability of the mixture to pull filaments. Additionally, the extruded articles were generally less form stable than their counterparts obtained in Examples 1–9. Nevertheless, significantly less water was required to obtain a mixture having the same level of extrudability and form stability in the present example compared to Examples 1–9. This yielded final cured articles having higher strength due to the reduced amount of water within the hydraulically settable mixtures, according to the Strength Equation.

EXAMPLE 16

The procedures of Examples 1–9 and 15 were repeated, except that 0.8 kg of silica fume was also added to each of the mixtures. Because of the high specific surface area of silica fume, the mixtures which included silica fume had better dispersion, particularly where a dispersant was added to the mixture.

While the addition of silica fume would be expected to result in a mixture requiring more water to obtain the same level of workability, it turns out that the extremely small particle size of the silica fume relative to the other particles within the hydraulically settable mixtures greatly increased their particle packing densities. Consequently, the mixtures had significantly lower porosities, which decreased the amount of water needed to lubricate the particles. As a result, the extrudability of the mixtures containing silica fume was similar to those which did not include silica fume. However, the silica fume increased the yield stress and cohesive nature of the mixtures, which increased the form stability of the extruded articles made therefrom. The ability to pull filaments is also increased, however, it becomes more difficult to control the placement of the filaments by increasing the tension on the filaments. The pull-out effect on the filaments in the hardened article is decreased as the filaments have greater contact with the other components of the hydraulically settable structural matrix.

In the following examples, the particle sizes of the silica sand aggregate were increased in order to increase the packing density of the resulting mixture. The increased particle packing densities that were thus obtained resulted in extruded articles of higher strength. This goes against the conventional wisdom, which teaches the use of the finest particle size available in order to increase the density, and hence the strength, the final hardened article. In contrast, by progressively increasing the size of the silica sand particles, which increased the ratio of the size of the aggregate particle to the cement particles to within the preferred and more preferred ranges, the density of the mixture actually increased.

EXAMPLES 17–36

The same amounts and types of hydraulically settable binder and aggregate were used according to Examples 1–9, except that the amount of added water was varied in much smaller gradations as follows:

| Example | Water | % Deficient |
|---------|-------|-------------|
| 17 | 3.0 kg | (55.73%) |
| 18 | 2.8 kg | (45.35%) |
| 19 | 2.6 kg | (34.97%) |
| 20 | 2.4 kg | (24.59%) |
| 21 | 2.2 kg | (14.20%) |
| 22 | 2.0 kg | (3.82%) |
| 23 | 1.8 kg | 6.46% |
| 24 | 1.6 kg | 16.94% |
| 25 | 1.4 kg | 27.32% |
| 26 | 1.2 kg | 37.71% |
| 27 | 1.0 kg | 48.09% |
| 28 | 0.9 kg | 53.23% |
| 29 | 0.8 kg | 58.47% |
| 30 | 0.7 kg | 63.66% |
| 31 | 0.6 kg | 68.85% |
| 32 | 0.5 kg | 74.04% |

| Example | Water | % Deficient |
|---|---|---|
| 33 | 0.4 kg | 79.24% |
| 34 | 0.3 kg | 84.43% |
| 35 | 0.2 kg | 89.62% |
| 36 | 0.1 kg | 94.81% |

The extrusion pressures needed to extrude the mixtures of these examples were similar to those needed to extrude the mixtures of Examples 1–9. As above, the mixtures in Examples 17–22 were too fluid to have adequate form-stability after being extruded. In addition, because they had an excess of water initially, they exhibited relatively low strength according to the Strength Equation. While the mixture of Example 23 could be extruded, only articles of larger cross section and simple shape were able to maintain their shape without external support. The mixtures of Examples 24–33 could be extruded within about the same range of pressures as the mixtures of Examples 5–9. However, the mixtures of Examples 34–36 were unable to be extruded using the extruding equipment available to the inventors. Mixtures which are too fluid do not provide adequate viscosity to pull filaments after filaments are placed in such fluid mixtures.

EXAMPLES 37–53

Hydraulically settable mixtures having 4 kg of portland cement Type 1, 6 kg silica sand, 50 g Tylose®, and varying amounts of water were prepared and then extruded through a die using a piston extruder. The silica sand had a natural packing density of about 0.55 and a particle size within the range from about 50–80 microns. When mixed with portland cement Type 1, which has a particle size within the range from about 10–25 microns, the resulting dry mixture had a particle packing density of about 0.7, which represents a better increase over the natural packing density of each compared to what was obtained in Examples 1–9.

The mount of water in the mixtures was varied as follows in order to determine the extrudability of the mixture at varying levels of water deficiency:

| Example | Water | % Deficient |
|---|---|---|
| 37 | 2.4 kg | (56.53%) |
| 38 | 2.2 kg | (43.49%) |
| 39 | 2.0 kg | (30.44%) |
| 40 | 1.8 kg | (17.40%) |
| 41 | 1.6 kg | (4.35%) |
| 42 | 1.4 kg | 8.69% |
| 43 | 1.2 kg | 21.73% |
| 44 | 1.0 kg | 34.78% |
| 45 | 0.9 kg | 41.30% |
| 46 | 0.8 kg | 47.82% |
| 47 | 0.7 kg | 54.34% |
| 48 | 0.6 kg | 60.87% |
| 49 | 0.5 kg | 67.39% |
| 50 | 0.4 kg | 73.91% |
| 51 | 0.3 kg | 80.43% |
| 52 | 0.2 kg | 86.96% |
| 53 | 0.1 kg | 93.48% |

In Examples 37–41, the number in parentheses under the heading "% Deficient" indicates the amount of excess water that was used. As above, these mixtures were "very fluid" and could not be extruded with sufficient form-stability so that an extruded object would maintain its shape without external support. The mixtures of Examples 42–50 were able to be extruded into a variety of form-stable articles as above, including honeycomb structures, bars, and window frames. Because of the higher particle packing efficiencies of the mixtures of Examples 37–53 compared to those of Examples 1–9, holding the water constant resulted in mixtures having decreased water deficiency and, hence, greater flowability and lower viscosity. The higher particle packing also increases the anchoring of filaments in a hardened article formed from such mixtures as the filaments have greater contact with the other components of the hydraulically settable structural matrix.

As the amount of water deficiency increased, pipes of increasingly thinner walls could be extruded. In addition, the final hardened extruded articles had higher strength compared to the articles extruded from the mixtures having a lower particle packing density, which comports with the Strength Equation. Pipes having even thinner walls can be designed by placing filaments within the mixtures.

However, as the amount of water fell below 0.4 kg and the water deficiency increased to above about 75%, the mixtures could not be extruded using the equipment available, although it is believed that using a higher pressure extruder would make it possible, though less practical, to extrude such mixtures. Therefore, the mixtures in Examples 51–53 could not be extruded.

From these examples it can be seen that increasing the packing density of the solid particles while keeping the amount of added water constant results in a mixture having less water deficiency. This allows for the extrusion of a higher packed mixture at a lower pressure for the same amount of water. Additionally, increasing the packing density increases the frictional contact with filaments, which results in an increased ability to pull filaments placed within a mixture.

EXAMPLES 54–67

The hydraulically settable mixtures of Examples 40–53 are repeated except that silica sand having particle sizes in the range of about 60–120 microns is used. The resulting particle packing density of the resulting sand and cement mixture is about 0.75. Keeping the amount of added water constant according to Examples 40–53 yields mixtures having the following amounts of water deficiency:

| Example | Water | % Deficient |
|---|---|---|
| 54 | 1.8 kg | (50.94%) |
| 55 | 1.6 kg | (34.17%) |
| 56 | 1.4 kg | (17.40%) |
| 57 | 1.2 kg | (0.63%) |
| 58 | 1.0 kg | 16.14% |
| 59 | 0.9 kg | 24.53% |
| 60 | 0.8 kg | 32.91% |
| 61 | 0.7 kg | 41.30% |
| 62 | 0.6 kg | 49.69% |
| 63 | 0.5 kg | 58.07% |
| 64 | 0.4 kg | 66.46% |
| 65 | 0.3 kg | 74.84% |
| 66 | 0.2 kg | 83.23% |
| 67 | 0.1 kg | 91.61% |

As above, keeping the amount of water constant while increasing the particle packing density yields a hydraulically settable mixture that can be extruded at lower extrusion pressures, which may reduce the strain on filaments as the filaments are placed within a mixture and increases the ability to control placement based on filament tension. In addition, the final hardened extruded article has higher strength according to the Strength Equation. However, the mixtures of Examples 54–57 lack form-stability after being extruded, while the mixtures of Examples 58–65 can be extruded into a number of articles, including those listed above. Finally, the mixtures of Examples 66 and 67 are too dry and viscous to be extruded using the equipment available. The higher particle packing density also increases the anchoring of filaments in a hardened article formed from such mixtures as the filaments have greater contact with the other components of the hydraulically settable structural matrix.

EXAMPLES 68–79

The hydraulically settable mixtures obtained in Examples 25–36 are altered by decreasing the amount of fine silica sand to 4 kg and adding 2 kg of precipitated calcium carbonate having an average particle size of about 1 micron. This results in a hydraulically settable mixture having a particle packing density of about 0.8. The resulting water deficiencies for a given amount of water are as follows:

| Example | Water  | % Deficient |
|---------|--------|-------------|
| 68      | 1.4 kg | (56.53%)    |
| 69      | 1.2 kg | (34.17%)    |
| 70      | 1.0 kg | (11.81%)    |
| 71      | 0.9 kg | (0.63%)     |
| 72      | 0.8 kg | 10.55%      |
| 73      | 0.7 kg | 21.73%      |
| 74      | 0.6 kg | 32.91%      |
| 75      | 0.5 kg | 44.10%      |
| 76      | 0.4 kg | 55.28%      |
| 77      | 0.3 kg | 66.46%      |
| 78      | 0.2 kg | 77.64%      |
| 79      | 0.1 kg | 88.82%      |

As above, keeping the amount of water constant while increasing the particle packing density yields a hydraulically settable mixture that can be extruded at lower extrusion pressures, which may reduce the strain on filaments as the filaments are placed within a mixture and increase the ability to control placement based on filament tension. In addition, the final hardened extruded article has higher strength, according to the Strength Equation. The higher particle packing density also increases the anchoring of filaments in a hardened article formed from such mixtures as the filaments have greater contact with the other components of the hydraulically settable structural matrix.

EXAMPLES 80–89

The hydraulically settable mixtures obtained in Examples 44–53 are altered by decreasing the amount of silica sand to 4 kg and adding 2 kg of precipitated calcium carbonate having an average particle size of about 1 micron. This results in a hydraulically settable mixture having a particle packing density of about 0.85. The resulting water deficiencies for a given amount of water are as follows:

| Example | Water  | % Deficient |
|---------|--------|-------------|
| 80      | 1.0 kg | (58.40%)    |
| 81      | 0.9 kg | (42.56%)    |
| 82      | 0.8 kg | (26.72%)    |
| 83      | 0.7 kg | (10.88%)    |
| 84      | 0.6 kg | 4.96%       |
| 85      | 0.5 kg | 20.80%      |
| 86      | 0.4 kg | 36.64%      |
| 87      | 0.3 kg | 52.48%      |
| 88      | 0.2 kg | 68.32%      |
| 89      | 0.1 kg | 84.16%      |

As above, keeping the amount of water constant while increasing the particle packing density yields a hydraulically settable mixture that can be extruded at lower extrusion pressures which may reduce the strain on filaments as the filaments are placed within a mixture and increase the ability to control placement based on filament tension. In addition, the final hardened extruded article has higher strength, according to the Strength Equation. The higher particle packing density also increases the anchoring of filaments in a hardened article formed from such mixtures as the filaments have greater contact with the other components of the hydraulically settable structural matrix.

EXAMPLES 90–95

The hydraulically settable mixtures obtained in Examples 62–67 are altered by decreasing the amount of silica sand to 4 kg and adding 2 kg of precipitated calcium carbonate having an average particle size of about 1 micron. This results in a hydraulically settable mixture having a particle packing density of about 0.9. The resulting water deficiencies for a given amount of water are as follows:

| Example | Water  | % Deficient |
|---------|--------|-------------|
| 90      | 0.6 kg | (46.06%)    |
| 91      | 0.5 kg | (21.71%)    |
| 92      | 0.4 kg | 2.63%       |
| 93      | 0.3 kg | 26.97%      |
| 94      | 0.2 kg | 51.31%      |
| 95      | 0.1 kg | 75.66%      |

As above, keeping the amount of water constant while increasing the particle packing density yields a hydraulically settable mixture that can be extruded at lower extrusion pressures which may reduce the strain on filaments as the filaments are placed within a mixture and increase the ability to control placement based on filament tension. In addition, the final hardened extruded article has higher strength according to the Strength Equation. The higher particle packing density also increases the anchoring of filaments in a hardened article formed from such mixtures as the filaments have greater contact with the other components of the hydraulically settable structural matrix.

EXAMPLE 96

The procedures of Examples 1–9 are repeated, except that the average particle size is decreased while maintaining the same level of particle packing density and water deficiency. The resulting hydraulically settable mixtures exhibit greater pseudo-plastic behavior. In other words, the apparent viscosities of the mixtures having a lower average particle size decreases for a given shear rate, while the yield stress increases. This results in mixtures which may be extruded under lower pressure while exhibiting greater form stability. Extrusion under lower pressure may reduce the strain on filaments as the filaments are placed within a mixture and increase the ability to control placement based on filament tension. The form stability of such mixtures is substantially increased by filaments placed within the mixtures.

EXAMPLE 97

The procedures of Examples 90–95 are repeated, except that the extruded articles are cured by autoclaving at 400° C. and 24 bars of pressure for 12 hours. The final cured articles have compressive strength of about 800 MPa and a tensile strength of about 100 MPa. The tensile strength of the final cured articles is substantially increased by filaments placed within the mixture.

EXAMPLE 98

The procedures of Examples 1–9 are repeated, except that 25 g of Tylose® 4000 are added as lubricant. The resulting hydraulically settable mixtures have greater flowability and result in extruded articles having a better surface finish without substantially affecting the ability of the mixture to pull filaments. The strength properties remain approximately the same.

EXAMPLE 99

The procedures of Examples 1–9 are repeated, except that 25 g of calcium or magnesium stearate are added as lubricant. The resulting hydraulically settable mixtures have greater flowability and result in extruded articles having a better surface finish without substantially affecting the ability of the mixture to pull filaments. The strength properties remain approximately the same.

EXAMPLE 100

The procedures of Examples 1–9 are repeated, except that 25 g of polyethylene glycol having an average molecular weight of about 35,000 are added as lubricant. The resulting hydraulically settable mixtures have greater flowability and result in extruded articles having a better surface finish without substantially affecting the ability of the mixture to pull filaments. The strength properties remain approximately the same.

EXAMPLE 101

An extrudable hydraulically settable mixture is formed using the following components:

| | | |
|---|---|---|
| Fly ash | 90 g |
| Portland Cement | 10 g |
| NaOH | 10 g |
| Water | 20 g |

The sodium hydroxide raises the pH of the aqueous phase of the hydraulically settable mixture to about 14, which activates the fly ash so that it behaves as a hydraulically settable binder. Portland cement is added in order to increase the compressive strength of the final cured product to about 20 MPa and the tensile strength to about 105 MPa. Because of the low cost of fly ash, the mixture of this example is less expensive than those containing higher levels of portland cement and conventional aggregates. Of course, where lower strengths are acceptable, the portland cement may be further reduced or eliminated altogether. The fly ash also increases the frictional contact with the filaments, which increases the ability of the mixture to pull the filaments and better anchors the filaments within the hydraulically settable matrix.

EXAMPLE 102

An extrudable hydraulically settable mixture is formed using the following components:

| | | |
|---|---|---|
| Portland White Cement | 4.0 kg |
| Fine Sand | 6.0 kg |
| Water | 1.5 kg |
| Tylose® FL 15002 | 200 g |

The hydraulically settable mixture is formed by mixing the ingredients together for 10 minutes using a high speed mixer to obtain a very homogeneous mixture. Thereafter, the mixture is extruded into a variety of multi-cell structures, including "honeycomb" structures, which have very high compressive strength, particularly in light of the open cell nature of the extruded object.

Because of the multi-cell structure, the cured material is much more lightweight than comparable solid extruded objects made from the same hydraulically settable mixtures. The block density of the multi-cell structures is only 1.02 g/cm$^3$. Moreover, the cured materials have a compressive strength of about 75 MPa and a tensile strength of about 28 MPa. Depending upon the amount of space within the multi-cell structure, the block density can easily range anywhere from between about 0.5 g/cm$^3$ to about 1.6 g/cm$^3$. The tensile strength can be substantially increased by filaments placed within the mixture which permits even lower block densities.

EXAMPLES 103–105

Extrudable hydraulically settable mixtures are formed according to Example 102, except that abaca fiber is added to the mixtures in varying amounts as follows (measured by volume):

| Example | Abaca Fiber |
|---|---|
| 103 | 1% |
| 104 | 2% |
| 105 | 3% |

The resulting extruded multi-cell structures have greater strengths, both in the green state and after they are cured, than the structures of Example 102. Moreover, the multi-cell structures formed in these examples are more ductile and less brittle, particularly as more fiber is added to the hydraulically settable mixture. Placement of filaments within the mixtures further increases the ductility and reduces the brittleness of the structures.

EXAMPLES 106–108

Extrudable hydraulically settable mixtures are formed according to Example 102, except that glass fiber is added to the mixtures in varying amounts as follows (measured by volume):

| Example | Glass Fiber |
|---|---|
| 106 | 1% |
| 107 | 2% |
| 108 | 3% |

The resulting extruded multi-cell structures have greater strengths, both in the green state and after they are cured, than the structures of Example 102. Moreover, the multi-cell structures formed in these examples are more ductile and less brittle, particularly as more fiber is added to the hydraulically settable mixture. Similarly, placement of filaments within the mixtures substantially increases the ductility and decreases the brittleness.

The following examples demonstrate how the strength of an extruded hydraulically settable mixture increases or decreases as the following variables are varied: particle packing density, water to cement ratio, and amount of cement as a percentage of the solids content of the mixture.

EXAMPLES 109–114

Extrudable hydraulically settable mixtures are formed which have 1.0 kg portland cement and 6.0 kg sand. In each mixture the portland cement comprises 14.3% by weight of the dry mixture. The particle sizes of the sand are varied in order to yield mixtures having particle packing densities which vary from 0.65 to 0.90 in increments of 0.05. In addition, the amount of water that is added is varied in order to yield a mixture having the desired level of water deficiency. In this first set of examples, the water deficiency is 50%.

As will be shown, the compressive strength of a hydraulically settable mixture having a constant weight percentage of portland cement and sand increases if either (1) the particle packing density is increased while maintaining a constant level of water deficiency or (2) the level of water deficiency is increased while maintaining a constant packing density. The amount of water is expressed in kg, while the compressive strength is expressed in MPa. The phrase "W/C Ratio" is shorthand for water to cement ratio.

| Example | Packing Density | Water | W/C Ratio | Strength |
|---|---|---|---|---|
| 109 | 0.65 | 0.71 | 0.71 | 24 |
| 110 | 0.70 | 0.56 | 0.56 | 33 |
| 111 | 0.75 | 0.44 | 0.44 | 47 |
| 112 | 0.80 | 0.33 | 0.33 | 69 |
| 113 | 0.85 | 0.23 | 0.23 | 103 |
| 114 | 0.90 | 0.15 | 0.15 | 160 |

These examples clearly demonstrate that the strength of an extruded article will greatly increase as the particle packing density is increased, even while the absolute level of cement and sand are held constant. This correlates to the Strength Equation because as the particle packing density is increased both the amount of air and water within the mixture are decreased. However, because the amount of water deficiency is held constant, the mixtures have similar levels of workability and may be extruded using similar extrusion pressures. The increased particle packing increases the frictional contact between the filaments and other components of the hydraulically settable structural matrix, which increases the ability of the mixtures to pull the filaments and better anchors the filaments within the hydraulically settable structural matrix.

EXAMPLES 115–120

The compositions of Examples 109–114 are substantially repeated except that the amount of water is reduced in each example in order to yield a water deficiency of 60%.

| Example | Packing Density | Water | W/C Ratio | Strength |
|---|---|---|---|---|
| 115 | 0.65 | 0.57 | 0.57 | 31 |
| 116 | 0.70 | 0.45 | 0.45 | 43 |
| 117 | 0.75 | 0.35 | 0.35 | 59 |
| 118 | 0.80 | 0.26 | 0.26 | 84 |
| 119 | 0.85 | 0.19 | 0.19 | 121 |
| 120 | 0.90 | 0.12 | 0.12 | 182 |

The compressive strength of the hydraulically settable mixtures increases as the amount of water is reduced. Increasing the compressive strength by reducing the amount of water may be useful to offset any tendency of the filaments to decrease the compressive strength of the final hardened articles.

EXAMPLES 121–126

The compositions of Examples 109–114 are substantially repeated except that the amount of water is reduced in each example in order to yield a water deficiency of 70%.

| Example | Packing Density | Water | W/C Ratio | Strength |
|---|---|---|---|---|
| 121 | 0.65 | 0.42 | 0.42 | 42 |
| 122 | 0.70 | 0.34 | 0.34 | 57 |
| 123 | 0.75 | 0.26 | 0.26 | 76 |
| 124 | 0.80 | 0.20 | 0.20 | 105 |
| 125 | 0.85 | 0.14 | 0.14 | 146 |
| 126 | 0.90 | 0.09 | 0.09 | 209 |

The compressive strength of the hydraulically settable mixtures increases as the amount of water is reduced. Increasing the compressive strength by reducing the amount of water may be useful to offset any tendency of the filaments to decrease the compressive strength of the final hardened articles.

EXAMPLES 127–132

The compositions of Examples 109–114 are substantially repeated except that the amount of water is reduced in each example in order to yield a water deficiency of 80%.

| Example | Packing Density | Water | W/C Ratio | Strength |
|---|---|---|---|---|
| 127 | 0.65 | 0.28 | 0.28 | 60 |
| 128 | 0.70 | 0.23 | 0.23 | 78 |
| 129 | 0.75 | 0.18 | 0.18 | 102 |
| 130 | 0.80 | 0.13 | 0.13 | 134 |
| 131 | 0.85 | 0.09 | 0.09 | 179 |
| 132 | 0.90 | 0.06 | 0.06 | 243 |

The compressive strength of the hydraulically settable mixtures increases as the amount of water is reduced. Increasing the compressive strength by reducing the amount of water may be useful to offset any tendency of the filaments to decrease the compressive strength of the final hardened articles.

EXAMPLES 133–138

The compositions of Examples 109–114 are substantially repeated except that the amount of water is reduced in each example in order to yield a water deficiency of 90%.

| Example | Packing Density | Water | W/C Ratio | Strength |
|---|---|---|---|---|
| 133 | 0.65 | 0.14 | 0.14 | 94 |
| 134 | 0.70 | 0.11 | 0.11 | 116 |
| 135 | 0.75 | 0.09 | 0.09 | 143 |
| 136 | 0.80 | 0.07 | 0.07 | 179 |
| 137 | 0.85 | 0.05 | 0.05 | 224 |
| 138 | 0.90 | 0.03 | 0.03 | 285 |

The compressive strength of the hydraulically settable mixtures increases as the amount of water is reduced. Comparison of the results obtained in Examples 109–138 demonstrates the close relationship between strength and the absolute level of water within the hydraulically settable mixture. This clearly demonstrates that in order to simultaneously achieve high strength and high workability in a given mixture, it is advantageous to increase the particle packing density rather than increase the level of water in order to increase the flowability of the mixture under pressure.

The next set of examples is substantially similar to Examples 109–138, except that the amount of portland cement is increased to 25% by weight of the dry mixtures. The purpose of these examples is to demonstrate that only modest increases of strength are attained by increasing the amount of hydraulically settable binder, while the most dramatic increases in strength are achieved by increasing the particle packing density and decreasing the amount of water within the mixtures.

EXAMPLES 139–144

Extrudable hydraulically settable mixtures are formed which have 2.0 kg portland cement and 6.0 kg sand. The particle sizes of the sand are varied in order to yield mixtures having particle packing densities which vary from 0.65 to 0.90 in increments of 0.05. In addition, the amount of water that is added is varied in order to yield a mixture having the desired level of water deficiency. In this first set of examples, the water deficiency is 50%.

| Example | Packing Density | Water | W/C Ratio | Strength |
|---|---|---|---|---|
| 139 | 0.65 | 0.79 | 0.40 | 52 |
| 140 | 0.70 | 0.63 | 0.32 | 69 |
| 141 | 0.75 | 0.49 | 0.25 | 90 |
| 142 | 0.80 | 0.37 | 0.18 | 120 |
| 143 | 0.85 | 0.26 | 0.13 | 160 |
| 144 | 0.90 | 0.16 | 0.08 | 215 |

The compressive strength of the hydraulically settable mixtures increases as the amount of water is reduced. Increasing the compressive strength by reducing the amount of water may be useful to offset any tendency of the filaments to decrease the compressive strength of the final hardened articles.

EXAMPLES 145–150

The compositions of Examples 138–139 are substantially repeated except that the amount of water is reduced in each example in order to yield a water deficiency of 60%.

| Example | Packing Density | Water | W/C Ratio | Strength |
|---|---|---|---|---|
| 145 | 0.65 | 0.63 | 0.32 | 65 |
| 146 | 0.70 | 0.50 | 0.25 | 83 |
| 147 | 0.75 | 0.39 | 0.20 | 107 |
| 148 | 0.80 | 0.29 | 0.15 | 138 |
| 149 | 0.85 | 0.21 | 0.10 | 179 |
| 150 | 0.90 | 0.13 | 0.07 | 234 |

The compressive strength of the hydraulically settable mixtures increases as the amount of water is reduced. Increasing the compressive strength by reducing the amount of water may be useful to offset any tendency of the filaments to decrease the compressive strength of the final hardened articles.

EXAMPLES 151–156

The compositions of Examples 138–139 are substantially repeated except that the amount of water is reduced in each example in order to yield a water deficiency of 70%.

| Example | Packing Density | Water | W/C Ratio | Strength |
|---|---|---|---|---|
| 151 | 0.65 | 0.48 | 0.24 | 82 |
| 152 | 0.70 | 0.38 | 0.19 | 103 |
| 153 | 0.75 | 0.29 | 0.15 | 129 |
| 154 | 0.80 | 0.22 | 0.11 | 162 |
| 155 | 0.85 | 0.16 | 0.08 | 203 |
| 156 | 0.90 | 0.10 | 0.05 | 255 |

The compressive strength of the hydraulically settable mixtures increases as the amount of water is reduced. Increasing the compressive strength by reducing the amount of water may be useful to offset any tendency of the filaments to decrease the compressive strength of the final hardened articles.

EXAMPLES 157–162

The compositions of Examples 138–139 are substantially repeated except that the amount of water is reduced in each example in order to yield a water deficiency of 80%.

| Example | Packing Density | Water | W/C Ratio | Strength |
|---|---|---|---|---|
| 157 | 0.65 | 0.32 | 0.16 | 109 |
| 158 | 0.70 | 0.25 | 0.13 | 132 |
| 159 | 0.75 | 0.20 | 0.10 | 159 |
| 160 | 0.80 | 0.15 | 0.07 | 192 |
| 161 | 0.85 | 0.10 | 0.05 | 231 |
| 162 | 0.90 | 0.07 | 0.03 | 279 |

The compressive strength of the hydraulically settable mixtures increases as the amount of water is reduced. Increasing the compressive strength by reducing the amount of water may be useful to offset any tendency of the filaments to decrease the compressive strength of the final hardened articles.

EXAMPLES 163–168

The compositions of Examples 138–139 are substantially repeated except that the amount of water is reduced in each example in order to yield a water deficiency of 90%.

| Example | Packing Density | Water | W/C Ratio | Strength |
|---|---|---|---|---|
| 163 | 0.65 | 0.16 | 0.08 | 150 |
| 164 | 0.70 | 0.13 | 0.06 | 173 |
| 165 | 0.75 | 0.10 | 0.05 | 200 |
| 166 | 0.80 | 0.07 | 0.04 | 231 |
| 167 | 0.85 | 0.05 | 0.03 | 267 |
| 168 | 0.90 | 0.03 | 0.02 | 308 |

The compressive strength of the hydraulically settable mixtures increases as the particle packing increases and as the amount of water is reduced. Examples 139–168 demonstrate the close relationship between strength and the absolute level of water within the hydraulically settable mixture. Although increasing the amount of portland cement within the mixtures of Examples 139–168 causes an increase in the overall strength of the mixtures, the increase is less dramatic than increasing the particle packing density and decreasing the level of water within the mixtures.

The next set of examples is substantially similar to Examples 139–168, except that the amount of portland cement is increased to 33% by weight of the dry mixtures.

EXAMPLES 169–174

Extrudable hydraulically settable mixtures are formed which have 3.0 kg portland cement and 6.0 kg sand. The particle sizes of the sand are varied in order to yield mixtures having particle packing densities which vary from 0.65 to 0.90 in increments of 0.05. In addition, the amount of water that is added is varied in order to yield a mixture having the desired level of water deficiency. In this first set of examples, the water deficiency is 50%.

| Example | Packing Density | Water | W/C Ratio | Strength |
|---|---|---|---|---|
| 169 | 0.65 | 0.88 | 0.29 | 74 |
| 170 | 0.70 | 0.70 | 0.23 | 94 |
| 171 | 0.75 | 0.54 | 0.18 | 118 |
| 172 | 0.80 | 0.41 | 0.14 | 150 |
| 173 | 0.85 | 0.29 | 0.10 | 189 |
| 174 | 0.90 | 0.18 | 0.06 | 240 |

The compressive strength of the hydraulically settable mixtures increases as the amount of water is reduced. Increasing the compressive strength by reducing the amount of water may be useful to offset any tendency of the filaments to decrease the compressive strength of the final hardened articles.

EXAMPLES 175–180

The compositions of Examples 169–174 are substantially repeated except that the amount of water is reduced in each example in order to yield a water deficiency of 60%.

| Example | Packing Density | Water | W/C Ratio | Strength |
|---|---|---|---|---|
| 175 | 0.65 | 0.70 | 0.23 | 89 |
| 176 | 0.70 | 0.56 | 0.19 | 111 |
| 177 | 0.75 | 0.43 | 0.14 | 137 |
| 178 | 0.80 | 0.33 | 0.11 | 169 |
| 179 | 0.85 | 0.23 | 0.08 | 208 |
| 180 | 0.90 | 0.14 | 0.05 | 256 |

The compressive strength of the hydraulically settable mixtures increases as the amount of water is reduced. Increasing the compressive strength by reducing the amount of water may be useful to offset any tendency of the filaments to decrease the compressive strength of the final hardened articles.

EXAMPLES 181–186

The compositions of Examples 169–174 are substantially repeated except that the amount of water is reduced in each example in order to yield a water deficiency of 70%.

| Example | Packing Density | Water | W/C Ratio | Strength |
|---|---|---|---|---|
| 181 | 0.65 | 0.53 | 0.18 | 109 |
| 182 | 0.70 | 0.42 | 0.14 | 133 |
| 183 | 0.75 | 0.33 | 0.11 | 160 |
| 184 | 0.80 | 0.24 | 0.08 | 192 |
| 185 | 0.85 | 0.17 | 0.06 | 229 |
| 186 | 0.90 | 0.11 | 0.04 | 274 |

The compressive strength of the hydraulically settable mixtures increases as the as the amount of water is reduced. Increasing the compressive strength by reducing the amount of water may be useful to offset any tendency of the filaments to decrease the compressive strength of the final hardened articles.

EXAMPLES 187–192

The compositions of Examples 169–174 are substantially repeated except that the amount of water is reduced in each example in order to yield a water deficiency of 80%.

| Example | Packing Density | Water | W/C Ratio | Strength |
|---|---|---|---|---|
| 187 | 0.65 | 0.35 | 0.12 | 138 |
| 188 | 0.70 | 0.28 | 0.09 | 162 |
| 189 | 0.75 | 0.22 | 0.07 | 189 |
| 190 | 0.80 | 0.16 | 0.05 | 220 |
| 191 | 0.85 | 0.12 | 0.04 | 254 |
| 192 | 0.90 | 0.07 | 0.02 | 294 |

The compressive strength of the hydraulically settable mixtures increases as the amount of water is reduced. Increasing the compressive strength by reducing the amount of water may be useful to offset any tendency of the filaments to decrease the compressive strength of the final hardened articles.

EXAMPLES 193–198

The compositions of Examples 169–174 are substantially repeated except that the amount of water is reduced in each example in order to yield a water deficiency of 90%.

| Example | Packing Density | Water | W/C Ratio | Strength |
|---|---|---|---|---|
| 193 | 0.65 | 0.18 | 0.06 | 180 |
| 194 | 0.70 | 0.14 | 0.05 | 203 |
| 195 | 0.75 | 0.11 | 0.04 | 227 |
| 196 | 0.80 | 0.08 | 0.03 | 254 |
| 197 | 0.85 | 0.06 | 0.02 | 283 |
| 198 | 0.90 | 0.04 | 0.01 | 316 |

Comparison of the strengths of the different compositions of Examples 169–198 as a function of particle packing demonstrates the close relationship between strength and the absolute level of water within the hydraulically settable mixture. Although increasing the amount of portland cement within the mixtures of Examples 169–198 causes an increase in the overall strength of the mixtures, the increase is less dramatic than increasing the particle packing density and decreasing the level of water within the mixtures.

The next set of examples is substantially similar to Examples 169–198, except that the amount of portland cement is increased to 40% by weight of the dry mixtures.

EXAMPLES 199–204

Extrudable hydraulically settable mixtures are formed which have 4.0 kg portland cement and 6.0 kg sand. The particle sizes of the sand are varied in order to yield mixtures having particle packing densities which vary from 0.65 to 0.90 in increments of 0.05. In addition, the amount of water that is added is varied in order to yield a mixture having the desired level of water deficiency. In this first set of examples, the water deficiency is 50%.

| Example | Packing Density | Water | W/C Ratio | Strength |
|---|---|---|---|---|
| 199 | 0.65 | 0.96 | 0.24 | 90 |
| 200 | 0.70 | 0.77 | 0.19 | 111 |

| Example | Packing Density | Water | W/C Ratio | Strength |
|---|---|---|---|---|
| 201 | 0.75 | 0.60 | 0.15 | 138 |
| 202 | 0.80 | 0.45 | 0.11 | 169 |
| 203 | 0.85 | 0.32 | 0.08 | 208 |
| 204 | 0.90 | 0.20 | 0.05 | 254 |

The compressive strength of the hydraulically settable mixtures increases as the particle packing increases and as the amount of water is reduced. Increasing the compressive strength by increasing the particle packing and reducing the amount of water may be useful to offset any tendency of the filaments to decrease the compressive strength of the final hardened articles.

EXAMPLES 205–210

The compositions of Examples 199–204 are substantially repeated except that the amount of water is reduced in each example in order to yield a water deficiency of 60%.

| Example | Packing Density | Water | W/C Ratio | Strength |
|---|---|---|---|---|
| 205 | 0.65 | 0.77 | 0.19 | 106 |
| 206 | 0.70 | 0.61 | 0.15 | 129 |
| 207 | 0.75 | 0.48 | 0.12 | 156 |
| 208 | 0.80 | 0.36 | 0.09 | 188 |
| 209 | 0.85 | 0.25 | 0.06 | 225 |
| 210 | 0.90 | 0.16 | 0.04 | 269 |

The compressive strength of the hydraulically settable mixtures increases as the particle packing increases and as the amount of water is reduced. Increasing the compressive strength by increasing the particle packing and reducing the amount of water may be useful to offset any tendency of the filaments to decrease the compressive strength of the final hardened articles.

EXAMPLES 211–216

The compositions of Examples 199–204 are substantially repeated except that the amount of water is reduced in each example in order to yield a water deficiency of 70%.

| Example | Packing Density | Water | W/C Ratio | Strength |
|---|---|---|---|---|
| 211 | 0.65 | 0.58 | 0.14 | 128 |
| 212 | 0.70 | 0.46 | 0.11 | 152 |
| 213 | 0.75 | 0.36 | 0.09 | 179 |
| 214 | 0.80 | 0.27 | 0.07 | 210 |
| 215 | 0.85 | 0.19 | 0.05 | 245 |
| 216 | 0.91 | 0.12 | 0.03 | 284 |

The compressive strength of the hydraulically settable mixtures increases as the particle packing increases and as the amount of water is reduced. Increasing the compressive strength by increasing the particle packing and reducing the amount of water may be useful to offset any tendency of the filaments to decrease the compressive strength of the final hardened articles.

EXAMPLES 217–222

The compositions of Examples 199–204 are substantially repeated except that the amount of water is reduced in each example in order to yield a water deficiency of 80%.

| Example | Packing Density | Water | W/C Ratio | Strength |
|---|---|---|---|---|
| 217 | 0.65 | 0.39 | 0.10 | 158 |
| 218 | 0.70 | 0.31 | 0.08 | 181 |
| 219 | 0.75 | 0.24 | 0.06 | 207 |
| 220 | 0.80 | 0.18 | 0.04 | 236 |
| 221 | 0.85 | 0.13 | 0.03 | 267 |
| 222 | 0.90 | 0.08 | 0.02 | 301 |

The compressive strength of the hydraulically settable mixtures increases as the particle packing increases and as the amount of water is reduced. Increasing the compressive strength by increasing the particle packing and reducing the amount of water may be useful to offset any tendency of the filaments to decrease the compressive strength of the final hardened articles.

EXAMPLES 223–228

The compositions of Examples 199–204 are substantially repeated except that the amount of water is reduced in each example in order to yield a water deficiency of 90%.

| Example | Packing Density | Water | W/C Ratio | Strength |
|---|---|---|---|---|
| 223 | 0.65 | 0.19 | 0.05 | 199 |
| 224 | 0.70 | 0.15 | 0.04 | 220 |
| 225 | 0.75 | 0.12 | 0.03 | 243 |
| 226 | 0.80 | 0.09 | 0.02 | 267 |
| 227 | 0.85 | 0.06 | 0.02 | 292 |
| 228 | 0.90 | 0.04 | 0.01 | 320 |

Comparison of the strengths of the different compositions of Examples 199–228 as a function of particle packing demonstrates the close relationship between strength and the absolute level of water within the hydraulically settable mixture. Although increasing the amount of portland cement within the mixtures of Examples 199–228 causes an increase in the overall strength of the mixtures, the increase is less dramatic than increasing the particle packing density and decreasing the level of water within the mixtures.

The next set of examples is substantially similar to Examples 199–228, except that the amount of portland cement is increased to 45.5% by weight of the dry mixtures.

EXAMPLES 229–234

Extrudable hydraulically settable mixtures are formed which have 5.0 kg portland cement and 6.0 kg sand. The particle sizes of the sand are varied in order to yield mixtures having particle packing densities which vary from 0.65 to 0.90 in increments of 0.05. In addition, the amount of water that is added is varied in order to yield a mixture having the desired level of water deficiency. In this first set of examples, the water deficiency is 50%.

| Example | Packing Density | Water | W/C Ratio | Strength |
|---|---|---|---|---|
| 229 | 0.65 | 0.05 | 0.21 | 102 |
| 230 | 0.70 | 0.83 | 0.17 | 125 |
| 231 | 0.75 | 0.65 | 0.13 | 152 |
| 232 | 0.80 | 0.49 | 0.10 | 183 |
| 233 | 0.85 | 0.34 | 0.07 | 220 |
| 234 | 0.90 | 0.22 | 0.04 | 263 |

The compressive strength of the hydraulically settable mixtures increases as the particle packing increases and as the amount of water is reduced. Increasing the compressive strength by increasing the particle packing and reducing the amount of water may be useful to offset any tendency of the filaments to decrease the compressive strength of the final hardened articles.

EXAMPLES 235–240

The compositions of Examples 229–234 are substantially repeated except that the amount of water is reduced in each example in order to yield a water deficiency of 60%.

| Example | Packing Density | Water | W/C Ratio | Strength |
|---|---|---|---|---|
| 235 | 0.65 | 0.84 | 0.17 | 120 |
| 236 | 0.70 | 0.67 | 0.13 | 143 |
| 237 | 0.75 | 0.52 | 0.10 | 170 |
| 238 | 0.80 | 0.39 | 0.08 | 201 |
| 239 | 0.85 | 0.27 | 0.05 | 236 |
| 240 | 0.90 | 0.17 | 0.03 | 276 |

The compressive strength of the hydraulically settable mixtures increases as the particle packing increases and as the amount of water is reduced. Increasing the compressive strength by increasing the particle packing and reducing the amount of water may be useful to offset any tendency of the filaments to decrease the compressive strength of the final hardened articles.

EXAMPLES 241–246

The compositions of Examples 229–234 are substantially repeated except that the amount of water is reduced in each example in order to yield a water deficiency of 70%.

| Example | Packing Density | Water | W/C Ratio | Strength |
|---|---|---|---|---|
| 241 | 0.65 | 0.63 | 0.13 | 142 |
| 242 | 0.70 | 0.50 | 0.10 | 166 |
| 243 | 0.75 | 0.39 | 0.08 | 193 |
| 244 | 0.80 | 0.29 | 0.06 | 222 |
| 245 | 0.85 | 0.21 | 0.04 | 254 |
| 246 | 0.90 | 0.13 | 0.03 | 291 |

The compressive strength of the hydraulically settable mixtures increases as the particle packing increases and as the amount of water is reduced. Increasing the compressive strength by increasing the particle packing and reducing the amount of water may be useful to offset any tendency of the filaments to decrease the compressive strength of the final hardened articles.

EXAMPLES 247–252

The compositions of Examples 229–234 are substantially repeated except that the amount of water is reduced in each example in order to yield a water deficiency of 80%.

| Example | Packing Density | Water | W/C Ratio | Strength |
|---|---|---|---|---|
| 247 | 0.65 | 0.42 | 0.08 | 172 |
| 248 | 0.70 | 0.33 | 0.07 | 195 |
| 249 | 0.75 | 0.26 | 0.05 | 220 |
| 250 | 0.80 | 0.19 | 0.04 | 246 |
| 251 | 0.85 | 0.14 | 0.03 | 275 |
| 252 | 0.90 | 0.09 | 0.02 | 306 |

The compressive strength of the hydraulically settable mixtures increases as the particle packing increases and as the amount of water is reduced. Increasing the compressive strength by increasing the particle packing and reducing the amount of water may be useful to offset any tendency of the filaments to decrease the compressive strength of the final hardened articles.

EXAMPLES 253–258

The compositions of Examples 229–234 are substantially repeated except that the amount of water is reduced in each example in order to yield a water deficiency of 90%.

| Example | Packing Density | Water | W/C Ratio | Strength |
|---|---|---|---|---|
| 253 | 0.65 | 0.21 | 0.04 | 211 |
| 254 | 0.70 | 0.17 | 0.03 | 232 |
| 255 | 0.75 | 0.13 | 0.03 | 253 |
| 256 | 0.80 | 0.10 | 0.02 | 275 |
| 257 | 0.85 | 0.07 | 0.01 | 298 |
| 258 | 0.90 | 0.04 | 0.01 | 322 |

Comparison of the strengths of the different compositions of Examples 229–258 as a function of particle packing demonstrates the close relationship between strength and the absolute level of water within the hydraulically settable mixture. Although increasing the amount of portland cement within the mixtures of Examples 229–258 causes an increase in the overall strength of the mixtures, the increase is less dramatic than increasing the particle packing density and decreasing the level of water within the mixtures.

The next set of examples is substantially similar to Examples 229–258, except that the amount of portland cement is increased to 50% by weight of the dry mixtures.

EXAMPLES 259–264

Extrudable hydraulically settable mixtures are formed which have 6.0 kg portland cement and 6.0 kg sand. The particle sizes of the sand are varied in order to yield mixtures having particle packing densities which vary from 0.65 to 0.90 in increments of 0.05. In addition, the amount of water that is added is varied in order to yield a mixture having the desired level of water deficiency. In this first set of examples, the water deficiency is 50%.

| Example | Packing Density | Water | W/C Ratio | Strength |
|---|---|---|---|---|
| 259 | 0.65 | 1.13 | 0.19 | 112 |
| 260 | 0.70 | 0.90 | 0.15 | 135 |
| 261 | 0.75 | 0.70 | 0.12 | 162 |
| 262 | 0.80 | 0.53 | 0.09 | 193 |
| 263 | 0.85 | 0.37 | 0.06 | 229 |
| 264 | 0.90 | 0.23 | 0.04 | 270 |

The compressive strength of the hydraulically settable mixtures increases as the particle packing increases and as the amount of water is reduced. Increasing the compressive strength by increasing the particle packing and reducing the amount of water may be useful to offset any tendency of the filaments to decrease the compressive strength of the final hardened articles.

EXAMPLES 265–270

The compositions of Examples 259–264 are substantially repeated except that the amount of water is reduced in each example in order to yield a water deficiency of 60%.

| Example | Packing Density | Water | W/C Ratio | Strength |
|---|---|---|---|---|
| 265 | 0.65 | 0.91 | 0.15 | 130 |
| 266 | 0.70 | 0.72 | 0.12 | 154 |
| 267 | 0.75 | 0.56 | 0.09 | 181 |
| 268 | 0.80 | 0.42 | 0.07 | 211 |
| 269 | 0.85 | 0.30 | 0.05 | 244 |
| 270 | 0.90 | 0.19 | 0.03 | 282 |

The compressive strength of the hydraulically settable mixtures increases as the particle packing increases and as the amount of water is reduced. Increasing the compressive strength by increasing the particle packing and reducing the amount of water may be useful to offset any tendency of the filaments to decrease the compressive strength of the final hardened articles.

EXAMPLES 271–276

The compositions of Examples 259–264 are substantially repeated except that the amount of water is reduced in each example in order to yield a water deficiency of 70%.

| Example | Packing Density | Water | W/C Ratio | Strength |
|---|---|---|---|---|
| 271 | 0.65 | 0.68 | 0.11 | 153 |
| 272 | 0.70 | 0.54 | 0.09 | 176 |
| 273 | 0.75 | 0.42 | 0.07 | 202 |
| 274 | 0.80 | 0.32 | 0.05 | 231 |
| 275 | 0.85 | 0.22 | 0.04 | 261 |
| 276 | 0.90 | 0.14 | 0.02 | 295 |

The compressive strength of the hydraulically settable mixtures increases as the particle packing increases and as the amount of water is reduced. Increasing the compressive strength by increasing the particle packing and reducing the amount of water may be useful to offset any tendency of the filaments to decrease the compressive strength of the final hardened articles.

EXAMPLES 277–282

The compositions of Examples 259–264 are substantially repeated except that the amount of water is reduced in each example in order to yield a water deficiency of 80%.

| Example | Packing Density | Water | W/C Ratio | Strength |
|---|---|---|---|---|
| 277 | 0.65 | 0.45 | 0.08 | 182 |
| 278 | 0.70 | 0.36 | 0.06 | 204 |
| 279 | 0.75 | 0.28 | 0.05 | 228 |
| 280 | 0.80 | 0.21 | 0.04 | 254 |
| 281 | 0.85 | 0.15 | 0.02 | 280 |
| 282 | 0.90 | 0.09 | 0.02 | 309 |

The compressive strength of the hydraulically settable mixtures increases as the particle packing increases and as the amount of water is reduced. Increasing the compressive strength by increasing the particle packing and reducing the amount of water may be useful to offset any tendency of the filaments to decrease the compressive strength of the final hardened articles.

EXAMPLES 283–288

The compositions of Examples 259–264 are substantially repeated except that the amount of water is reduced in each example in order to yield a water deficiency of 90%.

| Example | Packing Density | Water | W/C Ratio | Strength |
|---|---|---|---|---|
| 283 | 0.65 | 0.23 | 0.04 | 221 |
| 284 | 0.70 | 0.18 | 0.03 | 240 |
| 285 | 0.75 | 0.14 | 0.02 | 260 |
| 286 | 0.80 | 0.11 | 0.02 | 280 |
| 287 | 0.85 | 0.07 | 0.01 | 302 |
| 288 | 0.90 | 0.05 | 0.01 | 324 |

Comparison of the strengths of the different compositions of Examples 259–288 as a function of particle packing demonstrates the close relationship between strength and the absolute level of water within the hydraulically settable mixture. Although increasing the amount of portland cement within the mixtures of Examples 259–288 causes an increase in the overall strength of the mixtures, the increase is less dramatic than increasing the particle packing density and decreasing the level of water within the mixtures.

The next group of examples illustrates how the overall particle packing density of a two-component system (i.e., portland cement and sand) is affected by the natural packing densities of the sand component and the portland cement component. Using the information contained in these examples would allow one of ordinary skill in the art to design hydraulically settable mixtures having the particle packing densities of the compositions set forth above in Examples 109–288. As shown below, the resulting particle packing density is affected not only by the individual natural packing densities for the cement and sand components but also by the average particle diameter of the cement and sand components, respectively.

Note that different sand aggregates may have the same average diameter and yet have greatly varying packing densities. The natural packing density of an aggregate of a given average diameter will increase or decrease depending on the distribution of particle diameters away from the mean diameter. In general, the greater the size variation among the particles the greater the natural packing density of a given aggregate.

EXAMPLES 289–294

Hydraulically settable mixtures are formed which contain 1.0 kg portland cement and 6.0 kg sand, yielding mixtures having 14.3% cement and 85.7% sand aggregate by weight of the dry components. The portland cement has an average particle size of 15 microns and a natural packing density of 0.580. Five different types of sand aggregate categorized on the basis of average diameter are selected to yield the desired overall packing density of the dry mixture. The five different aggregates, which shall be referred to as "Aggregate 1", "Aggregate 2" and so on, have average particle diameters of 0.1 mm, 0.2 mm, 0.5 mm, 1.0 mm, and 1.25mm, respectively.

Each of the five types of sand aggregate is further distinguished on the basis of natural packing density, as set forth below. The following table illustrates the effect on the overall particle packing density of mixing the five different types of aggregates having varying particle packing densities with the portland cement described above. The term "Aggregate" is abbreviated as "Agg"; the overall packing density is abbreviated as "Density"; and the numbers below each of the Aggregate headings is the natural packing density for a given aggregate.

| Example | Density | Agg 1 | Agg 2 | Agg 3 | Agg 4 | Agg 5 |
|---------|---------|-------|-------|-------|-------|-------|
| 289 | 0.65 | 0.595 | 0.586 | 0.579 | 0.577 | 0.577 |
| 290 | 0.70 | 0.644 | 0.633 | 0.623 | 0.622 | 0.622 |
| 291 | 0.75 | 0.696 | 0.682 | 0.673 | 0.670 | 0.669 |
| 292 | 0.80 | 0.755 | 0.738 | 0.726 | 0.722 | 0.722 |
| 293 | 0.85 | 0.828 | 0.806 | 0.791 | 0.786 | 0.785 |
| 294 | 0.90 | N/A | 0.945 | 0.918 | 0.907 | 0.905 |

As illustrated by these examples, greater overall particle packing density can be achieved either by keeping the average diameter of the aggregate constant while increasing the natural packing density of the aggregate, or by keeping the natural packing density constant and increasing the average diameter of the aggregate. The increased packing effect using the latter method is caused by the increase in variance between the average aggregate particle size and cement particle size. However, varying the natural packing density of a given aggregate appears to yield the greater increase in overall packing density. The increased particle packing increases the frictional contact between the filaments and other components of the hydraulically settable structural matrix which increases the ability of the mixtures to pull the filaments and better anchors the filaments within the hydraulically settable structural matrix.

EXAMPLES 295–298

The compositions, methodologies, and assumptions set forth in Examples 289–294 are repeated in every way, except that the hydraulically settable mixtures contain 2.0 kg portland cement and 6.0 kg of sand aggregate, yielding mixtures having 25% cement and 75% sand aggregate by weight of the dry components. The average particle size of the portland cement and the five different sand aggregate types of the following examples are the same as in Examples 289–294.

| Example | Density | Agg 1 | Agg 2 | Agg 3 | Agg 4 | Agg 5 |
|---------|---------|-------|-------|-------|-------|-------|
| 295 | 0.65 | 0.554 | 0.536 | 0.524 | 0.521 | 0.520 |
| 296 | 0.70 | 0.612 | 0.589 | 0.575 | 0.570 | 0.569 |
| 297 | 0.75 | 0.683 | 0.654 | 0.635 | 0.628 | 0.627 |
| 298 | 0.80 | 0.785 | 0.745 | 0.718 | 0.708 | 0.707 |

As illustrated in these examples, as the quantity of portland cement is increased, the difficulty of creating mixtures from a two-component system which have high overall packing density also increases. This is because of the general uniformity of particle sizes of the portland cement compared to the sand aggregate. Greater particle uniformity generally decreases the ability to achieve higher particle packing densities.

EXAMPLES 299–302

The compositions, methodologies, and assumptions set forth in Examples 289–294 are repeated in every way, except that the hydraulically settable mixtures contain 3.0 kg portland cement and 6.0 kg of sand aggregate, yielding mixtures having 33.3% cement and 66.7% sand aggregate by weight of the dry components. The average particle size of the portland cement and the five different sand aggregate types of the following examples are the same as in Examples 289–294.

| Example | Density | Agg 1 | Agg 2 | Agg 3 | Agg 4 | Agg 5 |
|---------|---------|-------|-------|-------|-------|-------|
| 299 | 0.65 | 0.529 | 0.504 | 0.488 | 0.483 | 0.482 |
| 300 | 0.70 | 0.601 | 0.568 | 0.547 | 0.540 | 0.538 |
| 301 | 0.75 | 0.709 | 0.661 | 0.629 | 0.618 | 0.616 |
| 302 | 0.80 | 0.950 | 0.915 | 0.849 | 0.816 | 0.809 |

EXAMPLES 303–305

The compositions, methodologies, and assumptions set forth in Examples 289–294 are repeated in every way, except that the hydraulically settable mixtures contain 4.0 kg portland cement and 6.0 kg of sand aggregate, yielding mixtures having 40% cement and sand aggregate by weight of the dry components. The average particle size of the portland cement and the five different sand aggregate types of the following examples are the same as in Examples 289–294.

| Example | Density | Agg 1 | Agg 2 | Agg 3 | Agg 4 | Agg 5 |
|---------|---------|-------|-------|-------|-------|-------|
| 303 | 0.65 | 0.515 | 0.483 | 0.462 | 0.456 | 0.454 |
| 304 | 0.70 | 0.609 | 0.562 | 0.533 | 0.523 | 0.522 |
| 305 | 0.75 | 0.792 | 0.719 | 0.662 | 0.643 | 0.639 |

EXAMPLES 306–308

The compositions, methodologies, and assumptions set forth in Examples 289–294 are repeated in every way, except that the hydraulically settable mixtures contain 5.0 kg portland cement and 6.0 kg of sand aggregate, yielding mixtures having 45.5% cement and 54.5% sand aggregate by weight of the dry components. The average particle size of the portland cement and the five different sand aggregate types of the following examples are the same as in Examples 289–294.

| Example | Density | Agg 1 | Agg 2 | Agg 3 | Agg 4 | Agg 5 |
|---------|---------|-------|-------|-------|-------|-------|
| 306 | 0.65 | 0.508 | 0.468 | 0.444 | 0.435 | 0.434 |
| 307 | 0.70 | 0.634 | 0.571 | 0.531 | 0.518 | 0.515 |
| 308 | 0.75 | N/A | N/A | 0.894 | 0.835 | 0.819 |

EXAMPLES 309–310

The compositions, methodologies, and assumptions set forth in Examples 289–294 are repeated in every way, except that the hydraulically settable mixtures contain 6.0 kg portland cement and 6.0 kg of sand aggregate, yielding mixtures having 50% cement and 50% sand aggregate by weight of the dry components. The average particle size of the portland cement and the five different sand aggregate types of the following examples are the same as in Examples 289–294.

| Example | Density | Agg 1 | Agg 2 | Agg 3 | Agg 4 | Agg 5 |
|---------|---------|-------|-------|-------|-------|-------|
| 309 | 0.65 | 0.507 | 0.459 | 0.430 | 0.421 | 0.419 |
| 310 | 0.70 | 0.682 | 0.599 | 0.543 | 0.525 | 0.521 |

EXAMPLES 311–316

Hydraulically settable articles containing spiral wound filaments were produced using conventional methods of filament winding (i.e., a green hydraulically settable mixture was shaped in the form of a tube around a mandrel, after which filaments were wound around and through the interior of the mixture). The percentage of filaments wound around and into the hydraulically settable articles was incrementally increased, while the winding angle was held constant at 45° in order to measure the effect of filament concentration on the burst strength of the filament wound articles. As quantified below, the initial input of 3.0% filaments caused a dramatic increase in burst strength. Thereafter, the burst strength continued to increase, but less dramatically, as the percentage of filaments was further increased.

| Example | Filament | Burst Strength |
| --- | --- | --- |
| 311 | 0% | 7 N/mm$^2$ |
| 312 | 3.0% | 34 N/mm$^2$ |
| 313 | 4.5% | 37 N/mm$^2$ |
| 314 | 6.0% | 38 N/mm$^2$ |
| 315 | 7.5% | 44 N/mm$^2$ |
| 316 | 9.0% | 46 N/mm$^2$ |

Figure 30:
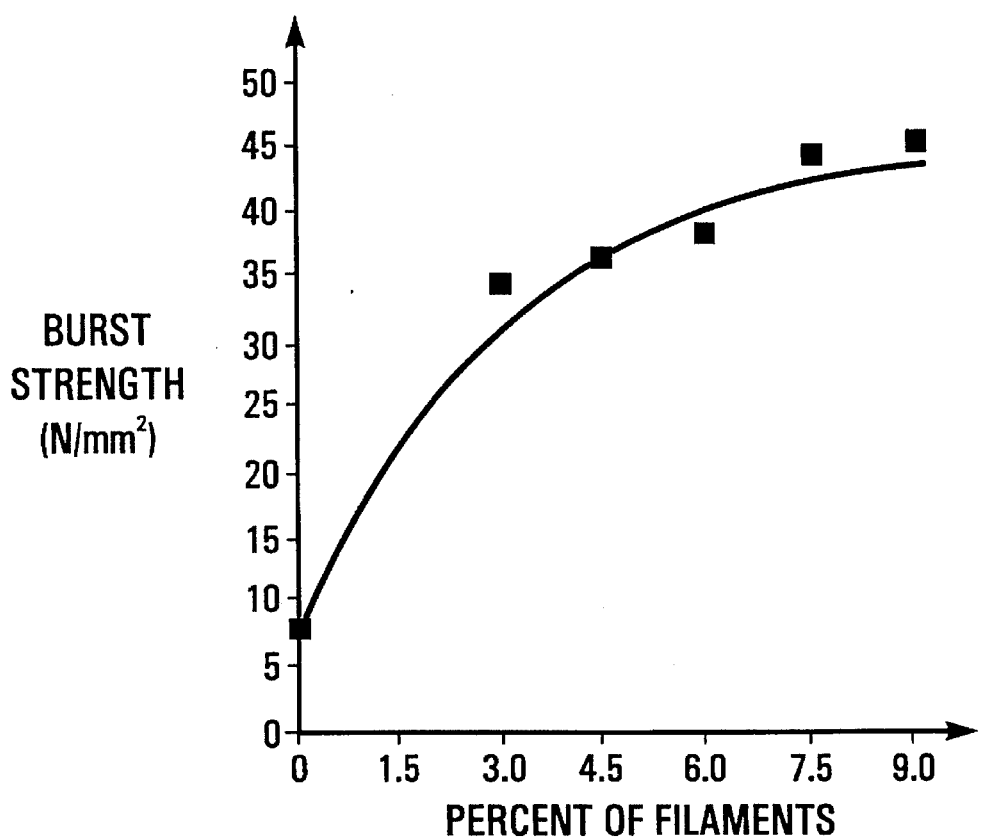
FIG. 30 is a graph illustrating the relationship between the burst strength of a hydraulically settable article containing spiral wound filaments which was produced using conventional methods and the percentage of filaments within the article.

The burst strength of each article as a function of the percentage of filament wound around and into each article is plotted and illustrated by the graph of FIG. 30.

Based on the foregoing, it would be expected that articles formed using the methods and apparatus of the present invention, together with a similar mix design and percentage of filaments, would have comparable or even greater burst strengths compared to the articles formed using conventional filament winding techniques. The burst strength of articles formed by the present invention would be expected to be greater because of the improved interface between the filaments and the hydraulically settable structural matrix resulting from superior compaction, consolidation, and lower porosity of the extruded mixture. Additionally, the articles would be expected to have much better surface qualities as a result of being extruded.

EXAMPLES 317–319

Hydraulically settable articles containing spiral wound filaments were produced using the conventional methods of filament winding set forth in Examples 311–316. However, the concentration of filaments was held constant at 3.0%, while the winding angle was varied at 35°, 45° and 65°, respectively, in order to determine the effect of the winding angle on the burst strength of the filament wound articles. As shown below, the burst strengths of the articles dramatically increased as the winding angle was increased.

| Example | Angle | Burst Strength |
| --- | --- | --- |
| 317 | 35° | 10 N/mm$^2$ |
| 318 | 45° | 30 N/mm$^2$ |
| 319 | 65° | 50 N/mm$^2$ |

Figure 31:
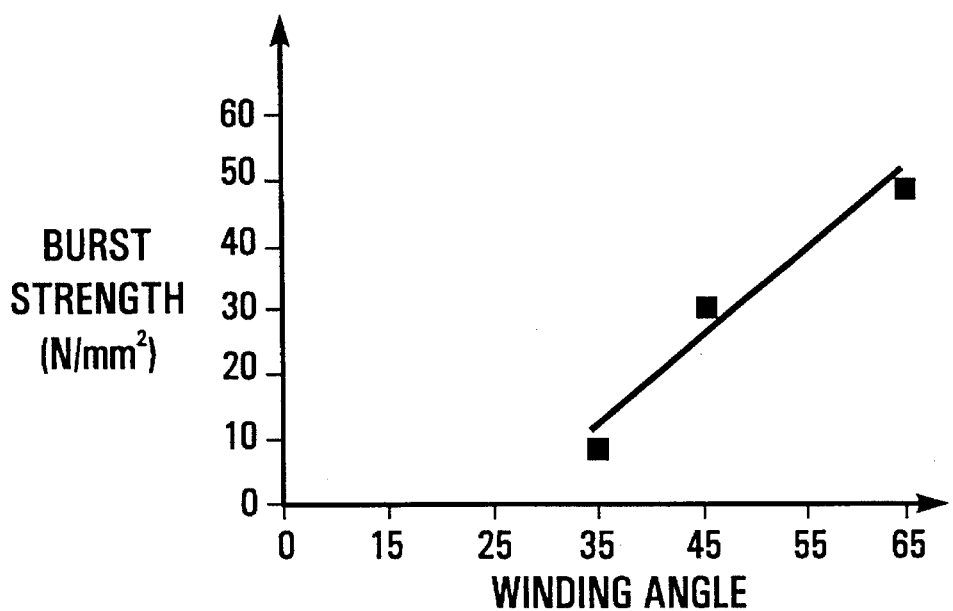
FIG. 31 is a graph illustrating the relationship between the burst strength of a hydraulically settable article containing spiral wound filaments which was produced using conventional methods and the winding angle of the filaments within the article.

The burst strengths of the articles as a function of the winding angle of the filaments around the hydraulically settable structural matrix are plotted and illustrated by the graph of FIG. 31.

Based on the foregoing, it would be expected that articles formed using the methods and apparatus of the present invention, together with a similar mix design and percentage of filaments, would have comparable or even greater burst strengths compared to the articles formed using conventional filament winding techniques. The burst strength of articles formed by the present invention would be expected to be greater because of the improved interface between the filaments and the hydraulically settable structural matrix resulting from superior compaction, consolidation, and lower porosity of the extruded mixture. Additionally, the articles would be expected to have much better surface qualities as a result of being extruded.

EXAMPLES 320–324

Hydraulically settable articles containing spiral wound filaments were produced using the conventional methods of filament winding set forth in Examples 311–316. The percentage of filaments wound around and into the hydraulically settable articles was incrementally increased, while the winding angle was held constant at 45° in order to measure the effect of filament concentration on the modulus of elasticity of the filament wound articles. As quantified below, the modulus of elasticity showed a significant and steady increase as the percentage of filaments was increased.

| Example | Filament | Modulus of elasticity |
| --- | --- | --- |
| 320 | 3.0% | 1000 N/mm$^2$ |
| 321 | 4.5% | 1300 N/mm$^2$ |
| 322 | 6.0% | 1600 N/mm$^2$ |
| 323 | 7.5% | 2200 N/mm$^2$ |
| 324 | 9.0% | 2500 N/mm$^2$ |

Figure 32:
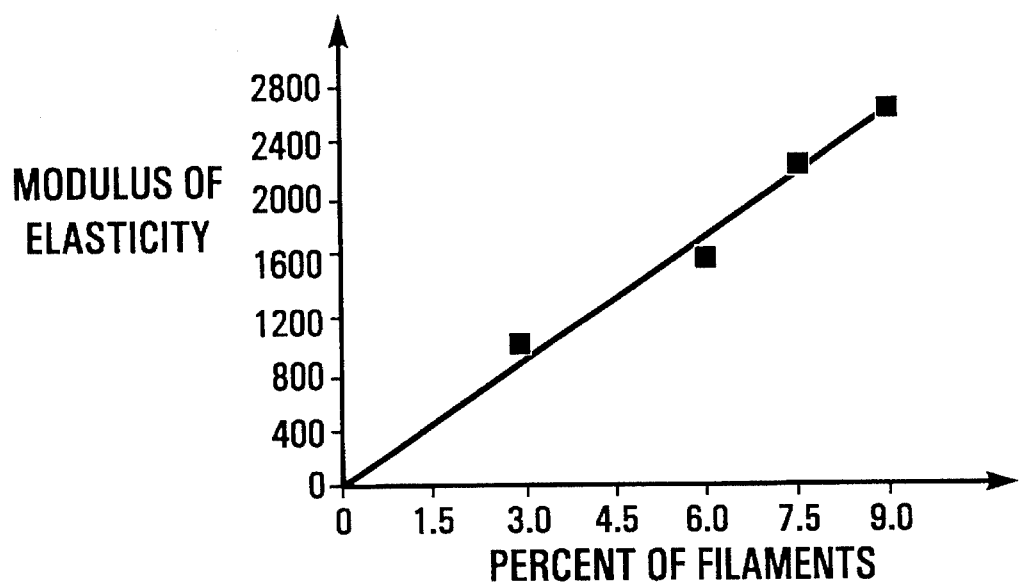
FIG. 32 is a graph illustrating the relationship between the modulus of elasticity of a hydraulically settable article containing spiral wound filaments which was produced using conventional methods and the percentage of filaments within the article.
Figure 33:
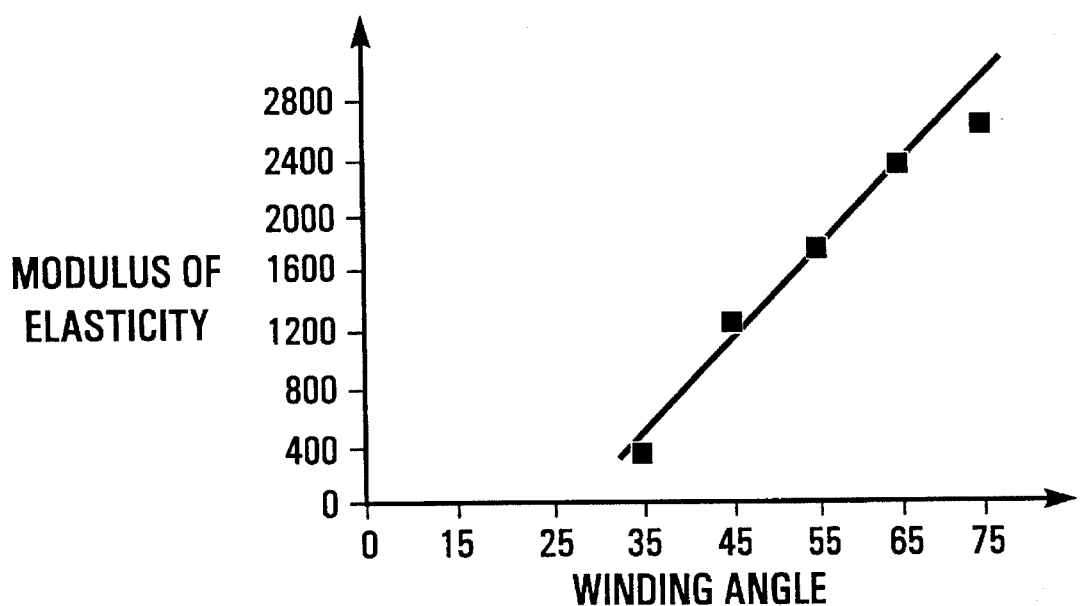
FIG. 33 is a graph illustrating the relationship between the modulus of elasticity of a hydraulically settable article containing spiral wound filaments which was produced using conventional methods and the winding angle of the filaments within the article.

Plotted and illustrated by the graph of FIG. 32 is the modulus of elasticity of each article as a function of the percentage of filament wound around and into the hydraulically settable structural matrix of each article.

Based on the foregoing, it would be expected that articles formed using the methods and apparatus of the present invention, together with a similar mix design and percentage of filaments, would have comparable or even greater modulus of elasticity compared to the articles formed using conventional filament winding techniques. The modulus of elasticity of articles formed by the present invention would be expected to be greater because of the improved interface between the filaments and the hydraulically settable structural matrix resulting from superior compaction, consolidation and lower porosity of the extruded mixture. Additionally, the articles would be expected to have much better surface qualities as a result of being extruded.

EXAMPLES 325–329

Hydraulically settable articles containing spiral wound filaments were produced using the conventional methods of filament winding set forth in Examples 311–316. However, the concentration of filaments was held constant at 3.0%, while the winding angle was varied at 35°, 45°, 55°, 65°, and 75°, respectively, in order to determine the effect of the winding angle on the modulus of elasticity of the filament wound articles. As quantified below, the modulus of elasticity of the articles dramatically increased as the winding angle was increased to about 65°, after which the increase was less dramatic but significant when the winding angle was increased to 75°.

| Example | Angle | Modulus of elasticity |
| --- | --- | --- |
| 325 | 35° | 400 N/mm$^2$ |
| 326 | 45° | 1200 N/mm$^2$ |
| 327 | 55° | 1700 N/mm$^2$ |
| 328 | 65° | 2300 N/mm$^2$ |
| 329 | 75° | 2600 N/mm$^2$ |

Plotted and illustrated by the graph of FIG. 32 is the modulus of elasticity of each article as a function of the winding angle of filament wound around and into the hydraulically settable structural matrix of each article.

Based on the foregoing, it would be expected that articles formed using the methods and apparatus of the present invention, together with a similar mix design and percentage of filaments, would have comparable or even greater modulus of elasticity compared to the articles formed using conventional filament winding techniques. The modulus of elasticity of articles formed by the present invention would be expected to be greater because of the improved interface between the filaments and the hydraulically settable structural matrix resulting from superior compaction, consolidation and lower porosity of the extruded mixture. Additionally, the articles would be expected to have much better surface qualities as a result of being extruded.

V. SUMMARY.

From the foregoing, it will be appreciated that the present invention provides compositions, methods, and apparatus that allow for the simultaneous placement of filaments during the extrusion of hydraulically settable materials into articles and shapes which have heretofore been impossible because of the inherent strength and moldability limitations of presently known hydraulically settable compositions.

In addition, the present invention provides compositions, methods, and apparatus for the extrusion of, and placement of filaments within, hydraulically settable articles having an increased tensile strength to compressive strength ratio compared to conventional hydraulically settable materials.

The present invention further provides compositions, methods, and apparatus which result in the ability to continuously extrude, and simultaneously place filaments within, a hydraulically settable mixture such that the extruded article or shape is immediately form stable (i.e., is strong enough to maintain its shape without external support) in the green state upon exiting the extruder die.

The present invention also provides composition, methods, and apparatus that allow for the continuous placement of filaments having a wide variety of concentrations within an extruding hydraulically settable mixture.

In addition, the present invention provides for the placement of continuous filaments within an extruding hydraulically settable mixture at a variety of different orientations or angles relative to the longitudinal axis of the extruded article.

The present invention further provides compositions, methods, and apparatus that yield extruded, form stable pipes and tubes having substantially increased hoop or burst strength.

The present invention also provides compositions, methods, and apparatus which result in the effective consolidation or compaction of the hydraulically settable mixture around and through the continuously placed filaments in order to minimize the amount and volume of internal voids or defects and thereby yield a hardened hydraulically settable structure matrix that is substantially uniform and of consistently high strength.

In addition, the present invention provides compositions, methods, and apparatus which yield extruded hydraulically settable articles into which filaments have been continuously placed having superior surface properties and greatly reduced surface defects compared to prior art methods for filament winding cementitious materials.

The present invention further provides compositions, methods, and apparatus that yield a variety of thin-walled hydraulically settable articles, including articles that require highly critical tolerances or dimensional preciseness.

The present invention also provides compositions, methods, and apparatus that can be used to extrude, and place continuous filaments within, hydraulically settable articles that can be substituted for articles presently manufactured from conventional materials such as plastic, clay, metal, or wood.

The present invention additionally provides hydraulically settable compositions that have a rheology and a plastic-like behavior similar to clay such that such compositions can be extruded using a clay extruder.

Finally, the present invention provides compositions, methods, and apparatus that can be used to continuously manufacture a large variety of hydraulically settable articles at a cost and at production rates (i.e., high volume or quantity) comparable or even superior to the cost of manufacturing such articles from plastic, clay, metal, or wood.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for continuously placing filaments within a hydraulically settable mixture being extruded into an article of manufacture having a cured hydraulically settable matrix, the method comprising the steps of:

combining together a hydraulically settable binder, an aggregate material, a rheology-modifying agent, and water in relative concentrations to form a hydraulically settable mixture that flows when extruded under pressure through a die and that is immediately form stable upon exiting the die;

extruding the hydraulically settable mixture under pressure through a die while continuously placing at least one filament within the hydraulically settable mixture as the mixture is extruded through the die to form an extruded article having a hydraulically settable matrix that is immediately form stable upon exiting the die and which includes at least one filament placed therein; and allowing the hydraulically settable matrix of the extruded article to cure to form the article of manufacture having the cured hydraulically settable matrix containing at least one filament.

2. A method for continuously placing filaments within a hydraulically settable mixture as defined in claim 1, wherein the at least one filament has a generally parallel orientation.

3. A method for continuously placing filaments within a hydraulically settable mixture as defined in claim 1, the die including a longitudinal axis and wherein the placing step includes winding at least one filament within the hydraulically settable mixture such that the filament has a winding angle greater than about 5° relative to the longitudinal axis of the die.

4. A method for continuously placing filaments within a hydraulically settable mixture as defined in claim 3, wherein the filament has a winding angle greater than about 20° relative to the longitudinal axis of the die.

5. A method for continuously placing filaments within a hydraulically settable mixture as defined in claim 3, wherein the filament has a winding angle greater than about 35° relative to the longitudinal axis of the die.

6. A method for continuously placing filaments within a hydraulically settable mixture as defined in claim 3, wherein the filament has a winding angle greater than about 50° relative to the longitudinal axis of the die.

7. A method for continuously placing filaments within a hydraulically settable mixture as defined in claim 3, wherein the filament has a winding angle greater than about 75° relative to the longitudinal axis of the die.

8. A method for continuously placing filaments within a hydraulically settable mixture as defined in claim 1, wherein the placing step yields an article including filaments having a criss-cross orientation.

9. A method for continuously placing filaments within a hydraulically settable mixture as defined in claim 1, the die including a longitudinal axis, wherein the placing step yields an article including a filament having a generally parallel orientation and another filament having a winding angle greater than about 5° relative to the longitudinal axis of the die.

10. A method for continuously placing filaments within a hydraulically settable mixture as defined in claim 1, wherein the filament is selected from the group consisting of glass fibers, polyaramide fibers, graphite fibers, carbon fibers, polyethylene fiber, mixtures of the foregoing, and derivatives of the foregoing.

11. A method for continuously placing filaments within a hydraulically settable mixture as defined in claim 1, wherein the hydraulically settable binder comprises portland cement.

12. A method for continuously placing filaments within a hydraulically settable mixture as defined in claim 1, wherein the hydraulically settable mixture has an initial deficiency of water.

13. A method for continuously placing filaments within a hydraulically settable mixture as defined in claim 1, wherein the hydraulically settable mixture includes a fibrous material.

14. A method for continuously placing filaments within a hydraulically settable mixture as defined in claim 1, wherein the hydraulically settable mixture includes a dispersant.

15. A method for continuously placing filaments within a hydraulically settable mixture as defined in claim 1, wherein the article has a cross-section selected from the group consisting of circular, rectangular, square, ellipsoidal, and triangular.

16. A method for continuously placing filaments within a hydraulically settable mixture as defined in claim 1, wherein the article comprises a window frame.

17. A method for continuously placing filaments within a hydraulically settable mixture as defined in claim 1, wherein the article comprises a tubular object.

18. A method for continuously placing filaments within a hydraulically settable mixture as defined in claim 1, wherein the article comprises a sheet.

19. A method for continuously placing filaments within a hydraulically settable mixture being extruded into an article of manufacture having a cured hydraulically settable matrix, the method comprising the steps of:

combining together a hydraulically settable binder, an aggregate material, and water in relative concentrations to form a hydraulically settable mixture that flows when extruded under pressure through a die and that is immediately form stable upon exiting the die;

extruding the hydraulically settable mixture under pressure through a die having a longitudinal axis and an interior portion through which the mixture passes during the extruding step while continuously placing at least one filament within the hydraulically settable mixture as the mixture is extruded through the interior portion of the die such that the at least one filament has a winding angle having a magnitude greater than about 5° relative to the longitudinal axis to form an extruded article having a hydraulically settable matrix that is immediately form stable upon exiting the die and which includes at least one filament placed therein; and allowing the hydraulically settable matrix of the extruded article to cure to form the article of manufacture having a longitudinal axis and comprising the cured hydraulically settable matrix including the filament with a winding angle having a magnitude greater than about 5 degrees relative to the longitudinal axis of the article of manufacture.

20. A method for continuously placing filaments within a hydraulically settable mixture as defined in claim 19, wherein the combining step is performed at least in part by means of a high shear mixer.

21. A method for continuously placing filaments within a hydraulically settable mixture as defined in claim 19, wherein the hydraulically settable binder and aggregate material comprise individual particles having a natural packing density in a range from about 0.65 to about 0.99.

22. A method for continuously placing filaments within a hydraulically settable mixture as defined in claim 19, wherein the hydraulically settable binder and aggregate material comprise individual particles having a natural packing density in a range from about 0.75 to about 0.9.

23. A method for continuously placing filaments within a hydraulically settable mixture as defined in claim 19, wherein the hydraulically settable binder comprises hydraulic cement.

24. A method for continuously placing filaments within a hydraulically settable mixture as defined in claim 23, wherein the hydraulic cement includes a portland cement.

25. A method for continuously placing filaments within a hydraulically settable mixture as defined in claim 23, wherein the hydraulic cement is selected from the group consisting of microfine cement, slag cement, calcium aluminate cement, plaster; silicate cement, gypsum cement, phosphate cement, white cement, high-alumina cement, magnesium oxychloride cement, aggregates coated with microfine cement particles, mixtures of the foregoing, and derivatives of the foregoing.

26. A method for continuously placing filaments within a hydraulically settable mixture as defined in claim 19, wherein the hydraulically settable binder comprises fly ash activated with a strong base.

27. A method for continuously placing filaments within a hydraulically settable mixture as defined in claim 19, wherein the combining step includes adding a fibrous material to the hydraulically settable mixture.

28. A method for extruding a hydraulically settable mixture as defined in claim 27, wherein the fibrous material comprises cellulosic fibers.

29. A method for continuously placing filaments within a hydraulically settable mixture as defined in claim 28, wherein the cellulosic fibers are selected from the group consisting of cotton, bagasse, hemp, abaca, sisal, wood, mixtures of the foregoing, and derivatives of the foregoing.

30. A method for continuously placing filaments within a hydraulically settable mixture as defined in claim 27, wherein the fibrous material comprises fibers selected from the group consisting of ceramic fibers, glass fibers, carbon fibers, metal fibers, mixtures of the foregoing, and derivatives of the foregoing.

31. A method for continuously placing filaments within a hydraulically settable mixture as defined in claim 27, wherein the fibrous material comprises organic polymer fibers.

32. A method for continuously placing filaments within a hydraulically settable mixture as defined in claim 27, wherein the fibrous material has a concentration in a range from about 0.5% to about 30% by volume of the hydraulically settable mixture.

33. A method for continuously placing filaments within a hydraulically settable mixture as defined in claim 27, wherein the fibrous material has a concentration in a range from about 1% to about 20% by volume of the hydraulically settable mixture.

34. A method for continuously placing filaments within a hydraulically settable mixture as defined in claim 19, wherein the combining step includes adding a rheology-modifying agent to the hydraulically settable mixture.

35. A method for continuously placing filaments within a hydraulically settable mixture as defined in claim 34, wherein the rheology-modifying agent is included in a range from about 0.1% to about 5% by weight of the hydraulically settable mixture exclusive of the water.

36. A method for continuously placing filaments within a hydraulically settable mixture as defined in claim 34, wherein the rheology-modifying agent is included in a range from about 0.5% to about 1% by weight of the hydraulically settable mixture exclusive of the water.

37. A method for continuously placing filaments within a hydraulically settable mixture as defined in claim 34, wherein the rheology-modifying agent comprises a cellulose-based material or a derivative thereof.

38. A method for continuously placing filaments within a hydraulically settable mixture as defined in claim 37, wherein the cellulose-based material is selected from the group consisting of methylhydroxyethylcellulose, hydroxymethylethylcellulose, carboxymethylcellulose, methylcellulose, ethylcellulose, hydroxyethylcellulose, hydroxypropylmethylcellulose, hydroxyethylpropylcellulose, mixtures of the foregoing, and derivatives of the foregoing.

39. A method for continuously placing filaments within a hydraulically settable mixture as defined in claim 34, wherein the rheology-modifying agent comprises a starch-based material or a derivative thereof.

40. A method for continuously placing filaments within a hydraulically settable mixture as defined in claim 30, wherein the starch-based material is selected from the group consisting of amylopectin, amylose, sea gel, starch acetates, starch hydroxyethyl ethers, ionic starches, long-chain alkylstarches, dextrins, amine starches, phosphate starches, dialdehyde starches, mixtures of the foregoing, and derivatives of the foregoing.

41. A method for continuously placing filaments within a hydraulically settable mixture as defined in claim 34, wherein the rheology-modifying agent comprises a protein-based material or a derivative thereof.

42. A method for continuously placing filaments within a hydraulically settable mixture as defined in claim 41, wherein the protein-based material is selected from the group consisting of prolamine, collagen derivatives, gelatin, glue, casein, mixtures of the foregoing, and derivatives of the foregoing.

43. A method for continuously placing filaments within a hydraulically settable mixture as defined in claim 34, wherein the rheology-modifying agent comprises a synthetic organic material.

44. A method for continuously placing filaments within a hydraulically settable mixture as defined in claim 43, wherein the synthetic organic material is selected from the group consisting of polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polylactic acid, polyacrylimides, ethylene oxide polymers, latex, mixtures of the foregoing, and derivatives of the foregoing.

45. A method for continuously placing filaments within a hydraulically settable mixture as defined in claim 34, wherein the rheology-modifying agent is selected from the group consisting of alginic acid, phycocolloids, agar, gum arabic, guar gum, locust bean gum, gum karaya, gum tragacanth, mixtures of the foregoing, and derivatives of the foregoing.

46. A method for continuously placing filaments within a hydraulically settable mixture as defined in claim 19, wherein the combining step includes adding a dispersant to the hydraulically settable mixture.

47. A method for continuously placing filaments within a hydraulically settable mixture as defined in claim 46, wherein the dispersant is selected from the group consisting of sulfonated naphthalene-formaldehyde condensate, sulfonated melamine-formaldehyde condensate, lignosulfonate, acrylic acid, salts of the foregoing, mixtures of the foregoing, and derivatives of the foregoing.

48. A method for continuously placing filaments within a hydraulically settable mixture as defined in claim 19, wherein the aggregate material includes a clay.

49. A method for continuously placing filaments within a hydraulically settable mixture as defined in claim 19, wherein the aggregate material is selected from the group consisting of gravel, sand, alumina, silica sand, fused silica, silica fume, fly ash, crushed limestone, crushed sandstone, crushed granite, crushed basalt, crushed bauxite, and mixtures of the foregoing.

50. A method for continuously placing filaments within a hydraulically settable mixture as defined in claim 19, wherein the aggregate material has a concentration in a range from about 3% to about 90% by weight of the hydraulically settable mixture.

51. A method for continuously placing filaments within a hydraulically settable mixture as defined in claim 19, wherein the aggregate material has a concentration in a range from about 20% to about 70% by weight of the hydraulically settable mixture.

52. A method for continuously placing filaments within a hydraulically settable mixture as defined in claim 19, wherein the hydraulically settable mixture has an initial net deficiency of water.

53. A method for continuously placing filaments within a hydraulically settable mixture as defined in claim 52, wherein the initial net deficiency of water is greater than about 10%.

54. A method for continuously placing filaments within a hydraulically settable mixture as defined in claim 52, wherein the initial net deficiency of water is greater than about 25%.

55. A method for continuously placing filaments within a hydraulically settable mixture as defined in claim 52, wherein the initial net deficiency of water is greater than about 50%.

56. A method for continuously placing filaments within a hydraulically settable mixture as defined in claim 19, wherein the extruding step is performed using an auger extruder.

57. A method for continuously placing filaments within a hydraulically settable mixture as defined in claim 19, wherein the extruding step is performed using a piston extruder.

58. A method for continuously placing filaments within a hydraulically settable mixture as defined in claim 19, wherein the extruding step includes applying a negative pressure to the hydraulically settable mixture in order to remove air from the mixture.

59. A method for continuously placing filaments within a hydraulically settable mixture as defined in claim 19, wherein the extrusion pressure is in a range from about 10 bars to about 7000 bars.

60. A method for continuously placing filaments within a hydraulically settable mixture as defined in claim 19, wherein the extrusion pressure is in a range from about 20 bars to about 3000 bars.

61. A method for continuously placing filaments within a hydraulically settable mixture as defined in claim 19, wherein the extrusion pressure is in a range from about 50 bars to about 200 bars.

62. A method for continuously placing filaments within a hydraulically settable mixture as defined in claim 19, wherein the extruding step includes extruding the hydraulically settable mixture into a hollow article.

63. A method for continuously placing filaments within a hydraulically settable mixture as defined in claim 62, wherein the die includes a hollow interior and a mandrel therein to form the hollow article.

64. A method for continuously placing filaments within a hydraulically settable mixture as defined in claim 62, wherein the hollow article has a bulk density up to about 1.5 g/cm$^3$.

65. A method for continuously placing filaments within a hydraulically settable mixture as defined in claim 62, wherein the hollow article has a bulk density up to about 0.3 g/cm$^3$.

66. A method for continuously placing filaments within a hydraulically settable mixture as defined in claim 62, wherein the cured hydraulically settable matrix of the hollow article of manufacture has a burst strength greater than about 10 N/mm$^2$.

67. A method for continuously placing filaments within a hydraulically settable mixture as defined in claim 62, wherein the cured hydraulically settable matrix of the hollow article of manufacture has a burst strength greater than about 30 N/mm$^2$.

68. A method for continuously placing filaments within a hydraulically settable mixture as defined in claim 62, wherein the cured hydraulically settable matrix of the hollow article of manufacture has a burst strength greater than about 50 N/mm$^2$.

69. A method for continuously placing filaments within a hydraulically settable mixture as defined in claim 19, wherein the placing step includes placing filaments in an amount in a range from about 0.5% to about 30% by volume of the hydraulically settable mixture.

70. A method for continuously placing filaments within a hydraulically settable mixture as defined in claim 19, wherein the placing step includes placing filaments in an amount in a range from about 1% to about 20% by volume of the hydraulically settable mixture.

71. A method for continuously placing filaments within a hydraulically settable mixture as defined in claim 19, wherein the placing step includes placing filaments in an amount in a range from about 2% to about 10% by volume of the hydraulically settable mixture.

72. A method for continuously placing filaments within a hydraulically settable mixture as defined in claim 19, wherein the filament is selected from the group consisting of glass fibers, polyaramide fibers, graphite fibers, carbon fibers, polyethylene fibers, mixtures of the foregoing, and derivatives of the foregoing.

73. A method for continuously placing filaments within a hydraulically settable mixture as defined in claim 19, wherein the filament comprises a plurality of individual fibers joined together.

74. A method for continuously placing filaments within a hydraulically settable mixture as defined in claim 19, wherein the placing step yields an article including a filament having a winding angle of a magnitude greater than about 20° relative to the longitudinal axis of the die.

75. A method for continuously placing filaments within a hydraulically settable mixture as defined in claim 19, wherein the placing step yields an article including a filament having a winding angle of a magnitude greater than about 45° relative to the longitudinal axis of the die.

76. A method for continuously placing filaments within a hydraulically settable mixture as defined in claim 19, wherein the placing step yields an article including a filament having a winding angle of a magnitude greater than about 65° relative to the longitudinal axis of the die.

77. A method for continuously placing filaments within a hydraulically settable mixture as defined in claim 19, wherein the placing step yields an article including a filament having a winding angle of a magnitude greater than about 85° relative to the longitudinal axis of the die.

78. A method for continuously placing filaments within a hydraulically settable mixture as defined in claim 19, wherein the placing step yields an article including at least one filament having a winding angle of a magnitude less than about 5° relative to the longitudinal axis of the die in addition to the at least one filament that has a winding angle having a magnitude greater than about 5° relative to the longitudinal axis of the die.

79. A method for continuously placing filaments within a hydraulically settable mixture as defined in claim 19, wherein the placing step yields an article including a filament having a generally parallel orientation.

80. A method for continuously placing filaments within a hydraulically settable mixture as defined in claim 19, wherein the placing step yields an article including at least two filaments having a criss-cross orientation.

81. A method for continuously placing filaments within a hydraulically settable mixture as defined in claim 19, wherein the placing step includes winding a filament at a predetermined rotational velocity to yield an article having a filament with a desired winding angle.

82. A method for continuously placing filaments within a hydraulically settable mixture as defined in claim 19, wherein the extruding step includes extruding the hydraulically settable mixture at a predetermined extrusion velocity to yield an article having a filament with a desired winding angle.

83. A method for continuously placing filaments within a hydraulically settable mixture as defined in claim 19, wherein the placing step includes placing a predetermined number of filaments within the hydraulically settable mixture to yield an article having a desired concentration of filaments.

84. A method for continuously placing filaments within a hydraulically settable mixture as defined in claim 83, wherein the article includes at least about 10 filaments.

85. A method for continuously placing filaments within a hydraulically settable mixture as defined in claim 83, wherein the article includes at least about 25 filaments.

86. A method for continuously placing filaments within a hydraulically settable mixture as defined in claim 83, wherein the article includes at least about 50 filaments.

87. A method for continuously placing filaments within a hydraulically settable mixture as defined in claim 83, wherein the article includes at least about 100 filaments.

88. A method for continuously placing filaments within a hydraulically settable mixture as defined in claim 19, wherein the placing step includes placing filaments having a predetermined angle within the hydraulically settable mixture to yield an article having a desired concentration of filaments.

89. A method for continuously placing filaments within a hydraulically settable mixture as defined in claim 19, wherein the placing step includes placing filaments having a plurality of predetermined angles within the hydraulically settable mixture to yield an article having desired strength properties.

90. A method for continuously placing filaments within a hydraulically settable mixture as defined in claim 19, wherein the placing step includes placing a filament at a predetermined depth within the hydraulically settable mixture.

91. A method for continuously placing filaments within a hydraulically settable mixture as defined in claim 19, wherein the hydraulically settable mixture has a viscosity sufficient to reliably draw the filament as the hydraulically settable mixture is extruded through the die.

92. A method for continuously placing filaments within a hydraulically settable mixture as defined in claim 19, wherein the at least one filament has a predetermined tension to aid in the placement of the filament.

93. A method for continuously placing filaments within a hydraulically settable mixture as defined in claim 92, wherein the predetermined tension of the filament winds the filament to a desired depth within the hydraulically settable mixture as the mixture is being extruded.

94. A method for continuously placing filaments within a hydraulically settable mixture as defined in claim 19, wherein the step of allowing the hydraulically settable matrix to cure includes autoclaving the extruded article of manufacture.

95. A method for continuously placing filaments within a hydraulically settable mixture as defined in claim 19, wherein the step of allowing the hydraulically settable matrix to cure includes placing the extruded article near a source of thermal energy.

96. A method for continuously placing filaments within a hydraulically settable mixture as defined in claim 19, wherein the cured hydraulically settable matrix of the article of manufacture has a tensile strength greater than about 15 MPa.

97. A method for continuously placing filaments within a hydraulically settable mixture as defined in claim 19, wherein the cured hydraulically settable matrix of the article of manufacture has a tensile strength greater than about 30 MPa.

98. A method for continuously placing filaments within a hydraulically settable mixture as defined in claim 19, wherein the cured hydraulically settable matrix of the article of manufacture has a tensile strength greater than about 50 MPa.

99. A method for continuously placing filaments within a hydraulically settable mixture as defined in claim 19, wherein the article comprises a pipe.

100. A method for continuously placing filaments within a hydraulically settable mixture being extruded into an article of manufacture comprising a cured hydraulically settable matrix, the method comprising the steps of:

combining together a hydraulically settable binder, an aggregate material, a rheology-modifying agent, and water in relative concentrations to form a hydraulically settable mixture that flows when extruded under pressure through a die and that is immediately form stable upon exiting the die;

extruding the hydraulically settable mixture under pressure through a die having a longitudinal axis and an interior portion through which the mixture passes during the extruding step while continuously placing at least one filament within the hydraulically settable mixture as the mixture is extruded through the interior portion of the die such that the at least one filament has a winding angle having a magnitude greater than about 5° relative to the longitudinal axis to form an extruded article having a hydraulically settable matrix that is immediately form stable upon exiting the die and which includes at least one filament placed therein; and allowing the hydraulically settable matrix of the extruded article to cure to form the cured hydraulically settable matrix of the article of manufacture comprising the at least one filament.

\* \* \* \* \*

UNITED STATES PATENT AND TRADEMARK OFFICE
CERTIFICATE OF CORRECTION

PATENT NO. : 5,545,297

DATED : August 13, 1996

INVENTOR(S) : Per Just Andersen, Ph.D. and Simon K. Hodson

Page 1 of 2

It is certified that error appears in the above-indentified patent and that said Letters Patent is hereby corrected as shown below:

At col. 1, line 59, before "properties" change "theological" to --rheological--.

At col. 10, line 62, change "Example" to --Examples--.

At col. 16, line 40, after "organic" change "theology" to --rheology--.

At col. 30, line 61, after "means that" change "them" to --their--.

At col. 37, line 3, after "fibers" insert --and--.

At col. 37, line 6, after "substantially" change "increases" to --increase--.

At col. 42, line 66, change "theology" to --rheology--.

At col. 43, line 10, after "discontinuous" change "theology" to --rheology--.

At col. 44, line 25, change "theology" to --rheology--.

Col. 50, line 25, after "controlled" change "theology" to --rheology--

At col. 50, line 35, before "properties" change "theological" to --rheological--.

At col. 56, line 36, before "defined" change "are" to --arc--.

Col. 56, line 42, after "This" delete ",".

At col. 57, line 35, after "chamber" insert --54--.

At col. 61, line 37, after "introduces the" change "Filament" to --filament--.

UNITED STATES PATENT AND TRADEMARK OFFICE
CERTIFICATE OF CORRECTION

PATENT NO. : 5,545,297
DATED : August 13, 1996
INVENTOR(S) : Per Just Andersen, Ph.D. and Simon K. Hodson It is certified that error appears in the above-indentified patent and that said Letters Patent is hereby corrected as shown below:

At col. 64, line 29, after "stationary" insert --.--.

At col. 65, line 3, after "26-29" change "illustrates" to --illustrate--.

At col. 88, line 15, before "sand" insert --60%--.

Signed and Sealed this

Second Day of December, 1997

Attest:

BRUCE LEHMAN

*Attesting Officer*     *Commissioner of Patents and Trademarks*